(12) United States Patent
Xue et al.

(10) Patent No.: US 11,929,802 B2
(45) Date of Patent: Mar. 12, 2024

(54) UNMANNED AERIAL VEHICLE COMMUNICATION

(71) Applicants: Feng Xue, Redwood City, CA (US); Mustafa Akdeniz, San Jose, CA (US); Seong-Youp John Suh, Portland, OR (US); Shu-Ping Yeh, Campbell, CA (US); Eduardo Alban, Hillsboro, OR (US); Philippe Auzas, Portland, OR (US); Jonathan Byrne, Ashbourne Meath (IE); Mark Davis, Carlsbad, CA (US); David Gomez Gutierrez, Jalisco (MX); Timo Huusari, Hillsboro, OR (US); Bradley Alan Jackson, Hillsboro, OR (US); Ranganadh Karella, San Diego, CA (US); Sreenivas Kasturi, Hillsboro, OR (US); Mengkun Ke, Beaverton, OR (US); Ching-Yu Liao, Hillsboro, OR (US); Tiefeng Shi, San Jose, CA (US); Daniel Tong, Beaverton, OR (US); Candy Yiu, Portland, OR (US)

(72) Inventors: Feng Xue, Redwood City, CA (US); Mustafa Akdeniz, San Jose, CA (US); Seong-Youp John Suh, Portland, OR (US); Jingwen Bai, San Jose, CA (US); Shu-Ping Yeh, Campbell, CA (US); Rodrigo Aldana Lopez, Jal (MX); Eduardo Alban, Hillsboro, OR (US); David Arditti Ilitzky, Jal (MX); Philippe Auzas, Portland, OR (US); Jonathan Byrne, Ashbourne Meath (IE); Leobardo Campos Macias, Jal (MX); Mark Davis, Carlsbad, CA (US); Rafael De La Guardia Gonzalez, Jal (MX); David Gomez Gutierrez, Jalisco (MX); Timo Huusari, Hillsboro, OR (US); Bradley Alan Jackson, Hillsboro, OR (US); Ranganadh Karella, San Diego, CA (US); Sreenivas Kasturi, Hillsboro, OR (US); Mengkun Ke, Beaverton, OR (US); Ching-Yu Liao, Hillsboro, OR (US); Tiefeng Shi, San Jose, CA (US); Shilpa Talwar, Cupertino, CA (US); Daniel Tong, Beaverton, OR (US); Candy Yiu, Portland, OR (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 17/297,828

(22) PCT Filed: Nov. 27, 2019

(86) PCT No.: PCT/US2019/063688
§ 371 (c)(1),
(2) Date: May 27, 2021

(87) PCT Pub. No.: WO2020/113062
PCT Pub. Date: Jun. 4, 2020

(65) Prior Publication Data
US 2022/0069876 A1 Mar. 3, 2022

Related U.S. Application Data

(60) Provisional application No. 62/772,182, filed on Nov. 28, 2018.

(51) Int. Cl.
*H04B 7/06* (2006.01)
*B64C 39/02* (2023.01)
(Continued)

(52) U.S. Cl.
CPC ......... *H04B 7/0617* (2013.01); *B64C 39/024* (2013.01); *H01Q 1/28* (2013.01);
(Continued)

(58) Field of Classification Search
CPC .... H04B 7/0617; H04B 7/26; H04B 7/18504; B64C 39/024; H01Q 1/28; H01Q 19/18;
(Continued)

(56) References Cited

U.S. PATENT DOCUMENTS

2017/0150373 A1 5/2017 Brennan et al.
2017/0277186 A1 9/2017 Ross et al.
(Continued)

OTHER PUBLICATIONS

"Study on Enhanced LTE Support for Aerial Vehicles", Release 15, 3GPP, TR 36.777, V15.0.0, Dec. 2017, 142 pgs.
(Continued)

*Primary Examiner* — Fitwi Y Hailegiorgis
(74) *Attorney, Agent, or Firm* — Kowert, Hood, Munyon, Rankin & Goetzel, P.C.

(57) ABSTRACT

An unmanned aerial vehicle can be configured to adjust a beam direction, provide path information, act as a base
(Continued)

station, act as a cluster head, include an improved directional antenna or array of directional antennas, communicate in a collaboration using belief propagation, receive communications from a serving station aiding in navigation or improved signal performance, or the like.

19 Claims, 35 Drawing Sheets

(51) Int. Cl.
    *H01Q 1/28*     (2006.01)
    *H01Q 19/18*     (2006.01)
    *H04B 7/26*     (2006.01)
    *B64U 10/00*     (2023.01)

(52) U.S. Cl.
    CPC ............... *H01Q 19/18* (2013.01); *H04B 7/26* (2013.01); *B64U 10/00* (2023.01)

(58) Field of Classification Search
    CPC .......... H01Q 3/36; H01Q 19/30; H01Q 21/06; B64U 10/00
    USPC ........................................................ 375/267
    See application file for complete search history.

(56) References Cited

U.S. PATENT DOCUMENTS

| | | |
|---|---|---|
| 2018/0097560 A1 | 4/2018 | Jalali |
| 2018/0115065 A1 | 4/2018 | Valdes Garcia et al. |
| 2019/0385057 A1* | 12/2019 | Litichever ............... H04L 63/14 |
| 2020/0037219 A1* | 1/2020 | Kumar .................. H04W 36/08 |

OTHER PUBLICATIONS

International Search Report and Written Opinion for International Application No. PCT/US2019/063688, dated May 6, 2020, 14 pgs.

\* cited by examiner

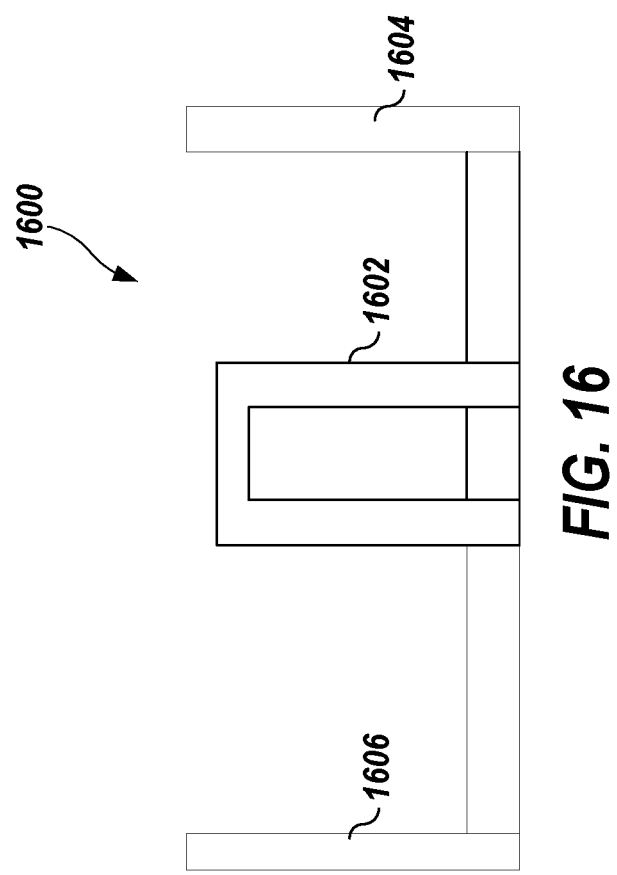

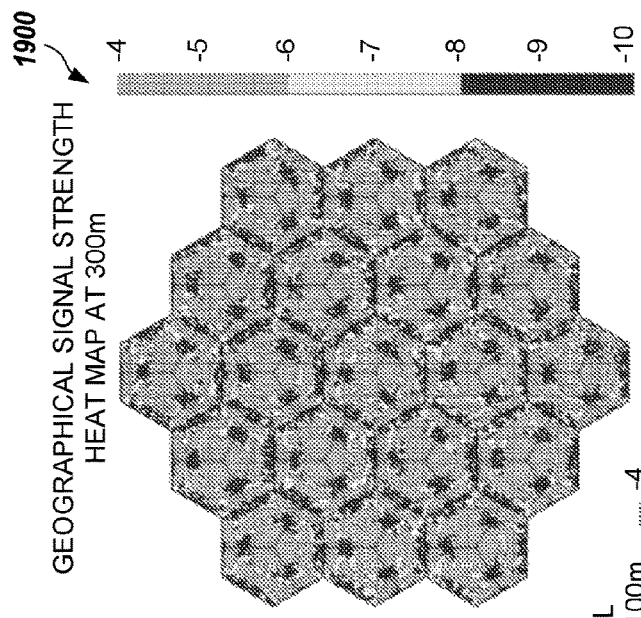
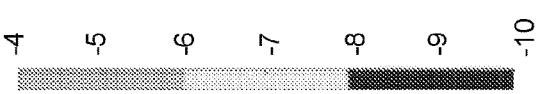
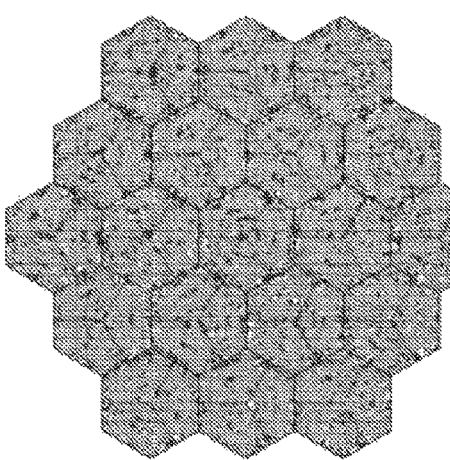
FIG. 19
FIG. 18
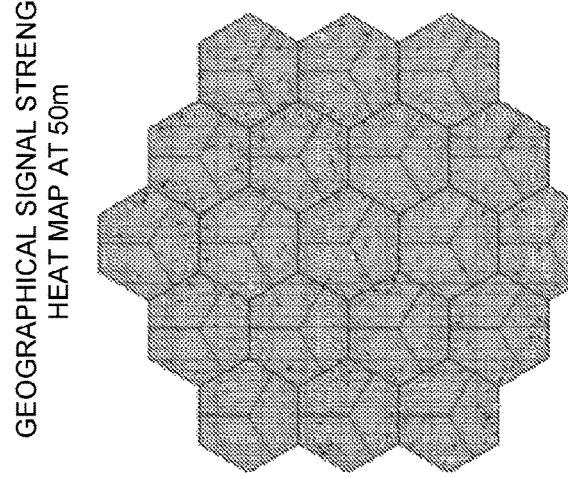
FIG. 17

UNMANNED AERIAL VEHICLE COMMUNICATION

CLAIM OF PRIORITY

This patent application is a U.S. National Stage filing of International Application No. PCT/US2019/063688, filed Nov. 27, 2019, which claims the benefit of priority to U.S. Application Ser. No. 62/772,182, filed Nov. 28, 2018, each of which is incorporated by reference herein in its entirety.

TECHNICAL FIELD

Aspects regard wireless communication systems. Some aspects regard antenna systems, packet configuration or information exchange, beamforming techniques, position control, and other aspects of unmanned aerial vehicles (UAVs).

BACKGROUND

Current remote control (RC) UAVs are controlled with a point-to-point radio link in line-of-sight range. This reduces, in many examples, the fly area to within about a few hundred meters of the controller. This limits the use cases of RC UAVs as the operation range is limited. In order to expand the use, a non-line-of-sight control mechanism can help. Omni-directional antennas currently present on UAVs do not work well in the sky as the UAVs are subject to signals from multiple base-stations causing strong interference.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

FIG. 16 illustrates, by way of example, a diagram of another aspect of a dual-band antenna.

FIGS. 17, 18, and 19 illustrate, by way of example, respective diagrams of aspects of signal strength heat maps at various heights.

DETAILED DESCRIPTION

UAVs can benefit from connecting, communicating, or sensing under dynamic movements in the sky. The current UAVs with an omni-directional antenna are limited in their usage and current cellular technology further limits UAV communication. For example, in the sky, UAVs are subjected to more signals from base stations than a ground user equipment (UE). The neighboring base stations emit unwanted interfering signals to the UAVs with the omni-directional pattern, which degrades the communication performance significantly. However, the omni-directional pattern is preferred while the UAV is near the ground.

With the current omni-directional antenna in the UAV, it is very challenging to mitigate the interfering signals for both uplink (UL) and downlink (DL) while the UAV is in the air. Aspects include a dynamic pattern reconfigurable directional antenna that can increase a signal to noise ratio (SNR), such as by redirecting the main beam to the base stations while minimizing the pattern and gain toward the direction of interference. On the ground, or other usage, an antenna of aspects can be reconfigured or switched to an omni-directional antenna dynamically. Significant system performance gain can be observed based on third generation partnership project (3GPP) study UAV work item (3GPP TR36.777) for 4G and 5G.

As previously discussed, UAVs introduce significant interference to ground cellular networks due to the antenna and channel properties. This is because omni-directional antenna is used in the UE and line-of-sight channel is typically between UAV and ground. Vice versa, UAVs also suffer from significant interference from so many ground base stations.

One solution to mitigate such interference is to apply beamforming using a special directional antenna or via a multiple-input, multiple output (MIMO) array. Current implementations rely on baseband signal processing to correctly form the beam. This introduces complexity and may cause the need for altering a governing standard.

These solutions, even though they can provide wanted beamforming/tracking, introduce unneeded complexity in implementation as they become part of the full chip/RF development process, which takes years to develop each generation. Many UAVs are not being designed with a modem/RF (cellular or other RF communication) currently available on the market.

Aspects can include an architecture which takes advantage of a special property of a spatial channel in the air. Aspects can implement beamforming and nulling that is transparent to the baseband. These aspects can operate with any existing modem/radio frequency (RF) chipset with almost no change.

Figure 2:
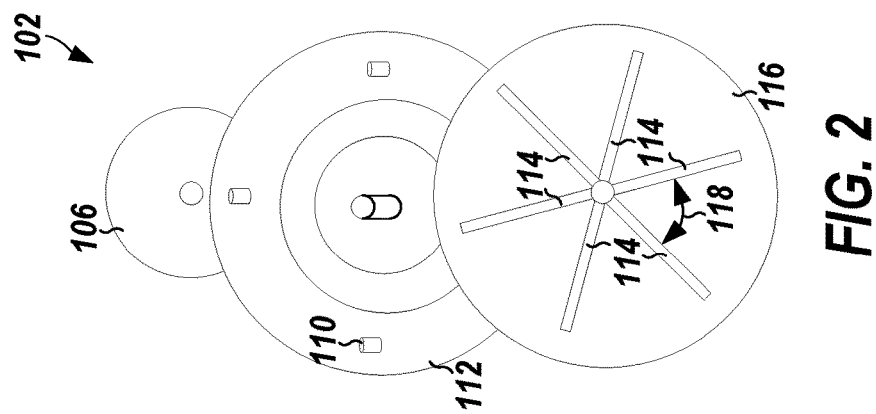
FIGS. 1 and 2 illustrate, by way of example, a diagram of an aspect of a UAV with a configurable antenna array in an antenna module.
Figure 1:
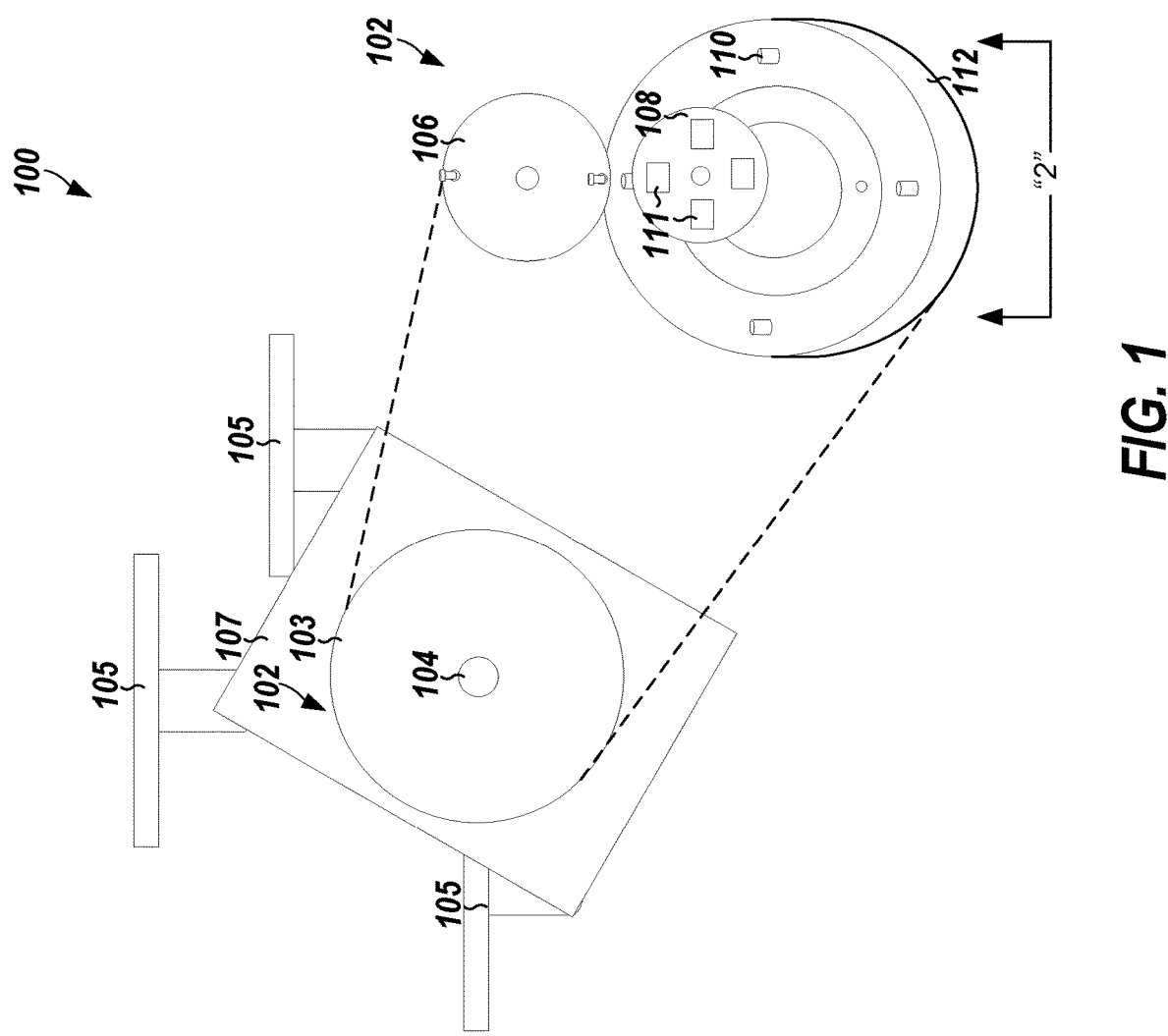

FIGS. 1 and 2 illustrate, by way of example, a diagram of an aspect of a UAV 100 with a configurable array of antennas 114 in an antenna module 102. The UAV 100 as illustrated includes the antenna module 102 and propellers 105 attached to a body 107.

The antenna module 102 includes a radome cover 103, a circuit board cover 106, a circuit board 108 with circuitry 111, a body attachment feature 110, a radome 112, antennas 114, and a ground plane 116. The propellers 105 rotate to provide lift to the UAV 100 to allow the UAV 100 to leave the ground and enter airspace. The propellers 105 can be controlled by the circuitry on the circuit board 108 or other circuitry in the body 107 of the UAV 100. The circuitry 111 on the circuit board 108 can include a first processor that governs operation of the UAV 100.

The circuit board cover 106 can provide physical protection to the circuit board 108. The circuit board cover 106 can provide interference protection to the circuitry on the circuit board 108. The circuit board cover 106 can be attached to the radome 112.

The circuit board 108 can include the UAV control circuitry radio circuitry, camera control circuitry, or other UAV circuitry 111. The UAV circuitry 111 can include one or more electrical or electronic components configured to perform operations of the UAV 100. The electrical or electronic components can be configured as processing circuitry, such as can include a processor, central processing unit (CPU), application specific integrated circuit (ASIC), field programmable gate array (FPGA), graphics processing unit (GPU), or the like. The electric or electronic components can include one or more transistors, resistors, capacitors, inductors, diodes, regulators, converters (analog to digital or digital to analog converters), oscillators, de/modulators, switches, logic gates (e.g., AND, OR, XOR, negate, buffer, or the like), multiplexers, inverters, amplifiers, or the like. The electric or electronic components can be configured as control circuitry for the antennas 114 (see FIG. 2), propellers 105, camera (not shown), or other operations of the UAV 100.

The radome 112 can include male or female attachment features 110 configured to attach the antenna module 102 to the body 107 of the UAV 100. The radome 112 can be made of a material or materials that do not interfere with signals transmitted by the antennas 114. The radome 112 can include a radome cover 103 that protects the antennas 114 from the surrounding environment. The radome 112 can be water resistant or waterproof, such as to help prevent the ingress of moisture.

The antennas 114 are configured in an array. The antennas 114 are electrically coupled to the control circuitry of the circuit board 108. The control circuitry can select one or more antennas 114 to transmit one or more directional or omnidirectional signals. The antennas 114 can include a monopole, PIFA, patch antenna, or SIW antenna, or the like. The antennas 114 can be situated about the ground plane 116 with an angular separation 118 between directly adjacent antennas 114. The angular separation 118 in FIG. 2 is about 60 degrees, since there are six antennas 114. However, the antennas 114 can include two or more antennas 114, such as three, four, five, or more than six antennas. The antennas 114 can be situated with about an equal (e.g., uniform) angular separation 118 between directly adjacent antennas or an irregular angular separation 118.

The antenna module 102 of aspects can help enable communications in no line-of-sight scenarios, such as with the help of a cellular or other communication system. The antennas 114 can include a directional switched array. In some aspects, the antennas can include several monopole Yagi-Uda antenna elements, a modified Yagi-Uda antenna element, a bent monopole, or an array of antennas.

Figure 3:
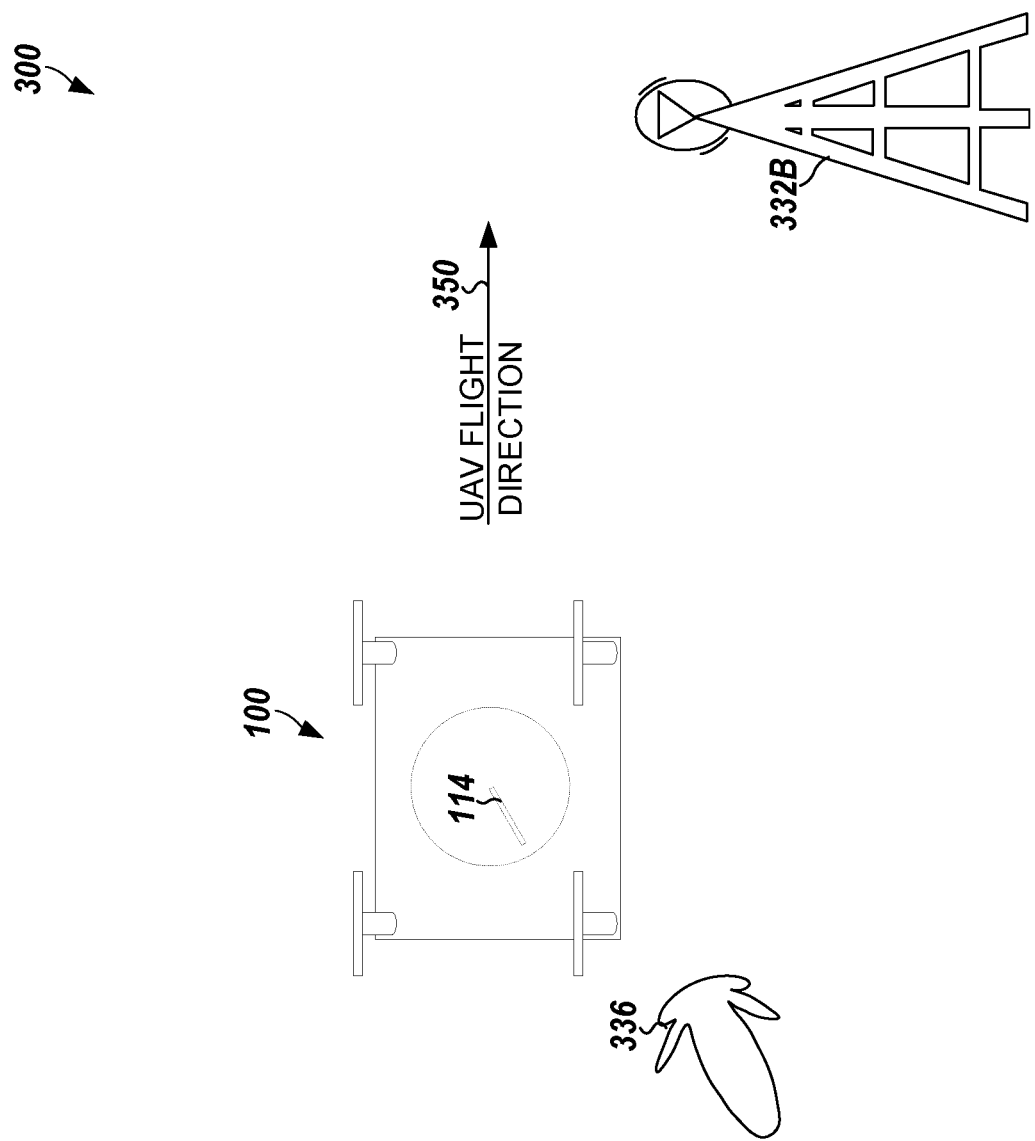
FIG. 3 illustrates, by way of example, a diagram of an aspect of a system that illustrates a problem with UAV beamforming.

FIG. 3 illustrates, by way of example, a diagram of an aspect of a system 300 that illustrates a problem with UAV beamforming. The system 300 as illustrated includes the UAV 100 communicating with a first base station 332A of a communications network and flying towards a second base station 332B of the communication network as indicated by the fly direction 350. As the UAV 100 gets closer to the base station 332B, it can be advantageous for the UAV 100 to direct the transmission pattern 336A of the antenna 114 towards the base station 332B. This can help ensure better signal quality for communications between the UAV 100 and the base station 332B. However, with the antenna 14 pointed away from the base station 332B, the UAV 100 will not be able to sense that the base station 332B is present or that the base station 332B provides a higher quality channel over which to communicate than the base station 332A.

As previously discussed, wireless carriers can desire to support UAVs on their networks, and 3GPP has a work item on enhancing UAV support. Study and measurements show that UAVs cause excessive interference to the ground base stations and suffer interference from BSs. Directional TX/RX has been shown to help mitigate the interference issues and can be potentially implemented as a solution without introducing new specification changes. The directional beam can be formed based on directional antenna or MIMO beamforming. Beamforming using an antenna array is sometimes referred to as multiple input multiple output (MIMO) beam forming.

Yet there are problems. Typically, a UE uses an omnidirectional antenna. Applying a directional pattern/beam emphasizes one particular direction while suppressing others. As a UAV moves through the network, it may benefit from steering its beam, mechanically or electrically (e.g., by adjusting a gain or phase applied to an antenna element or electrically selecting another antenna element), from one cell to another for best signal quality. Measurement on the baseband is impacted by the directional pattern and may create issues for cell quality measurement or hand-over. When the beam is not pointed correctly, the beam can enhance interference while suppressing useful signals. This is more pronounced when a UAV is equipped with one directional antenna that is mechanically tilted from one cell to another.

Figure 4:
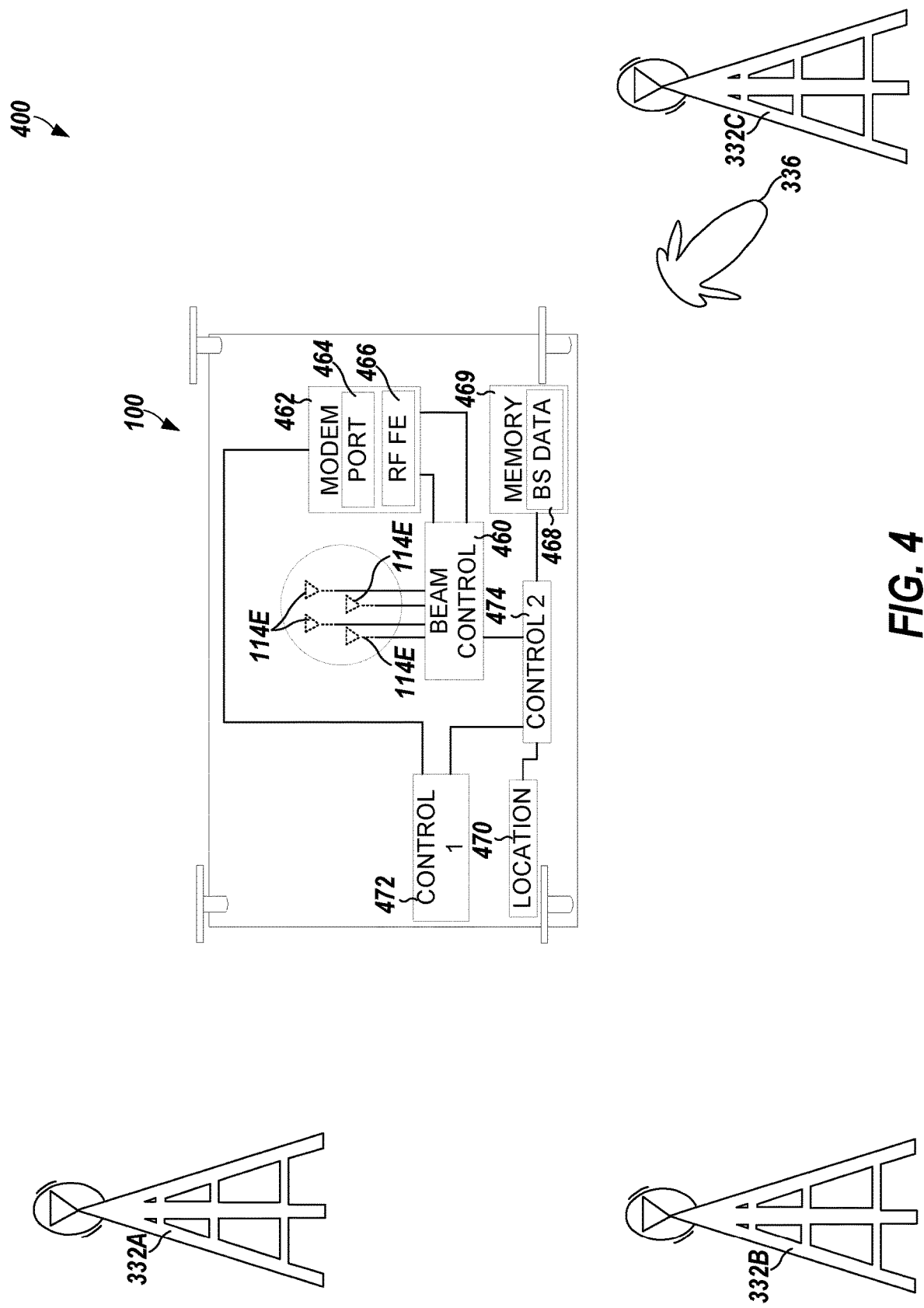
FIGS. 4 and 5 illustrate, by way of example, respective diagrams of aspects of systems and for UAV communication over a communications network.

FIG. 4 illustrates, by way of example, a diagram of an aspect of a system 400 for communication management. The system 400 can overcome one or more issues with prior beamforming techniques. The system 400 as illustrated includes first control circuitry 472 and second control circuitry 474 which can operate to control transmission pattern 336 directions. The first control circuitry 472 can connect signals to an antenna port 464 (via a modem 462) for transmission. The first control circuitry 472 can be connected to second control circuitry 474. The second control circuitry can perform operations of a technique for determining beamforming direction or tracking at given location (e.g., using a 3D location, such as a 3D global positioning system or Galileo location) as determined by the location circuitry 470.

The second control circuitry 474 can have access to data 468 indicating base station (BS) location, services available, operating parameters, or the like. The second control circuitry 474 can implement a beamforming strategy. The second control circuitry 474 can access location information of the UAV (from the location circuitry 470 and UAV orientation (from the location circuitry 470) as input to the beamforming direction technique. Circuity of the UAV can interact with a modem 462 of a RF front end (RF FE) 466 for beam direction or tracking. In some aspects, the modem can provide 'real-time' (near instantaneous) feedback to the second control circuitry 474 to inform the direction technique.

For overcoming one or more antenna limitation of MIMO, multiple directional antennas or an array of antennas 114E can be used. The directional antennas 114E can be switched on/off based on a particular direction needed to communicate to a base station. The direction can be based on knowledge of the network as stored in a memory.

These aspects provide benefits of directional TX/RX in mitigating interference, while avoiding issues in transition from one cell to another (e.g., wrong pointing, abrupt or slow beam transition, or the like). Aspects can operate with existing or future cellular networks without requiring a change to the standard. To support directional TX/RX, one the following aspects can be used.

Figure 5:
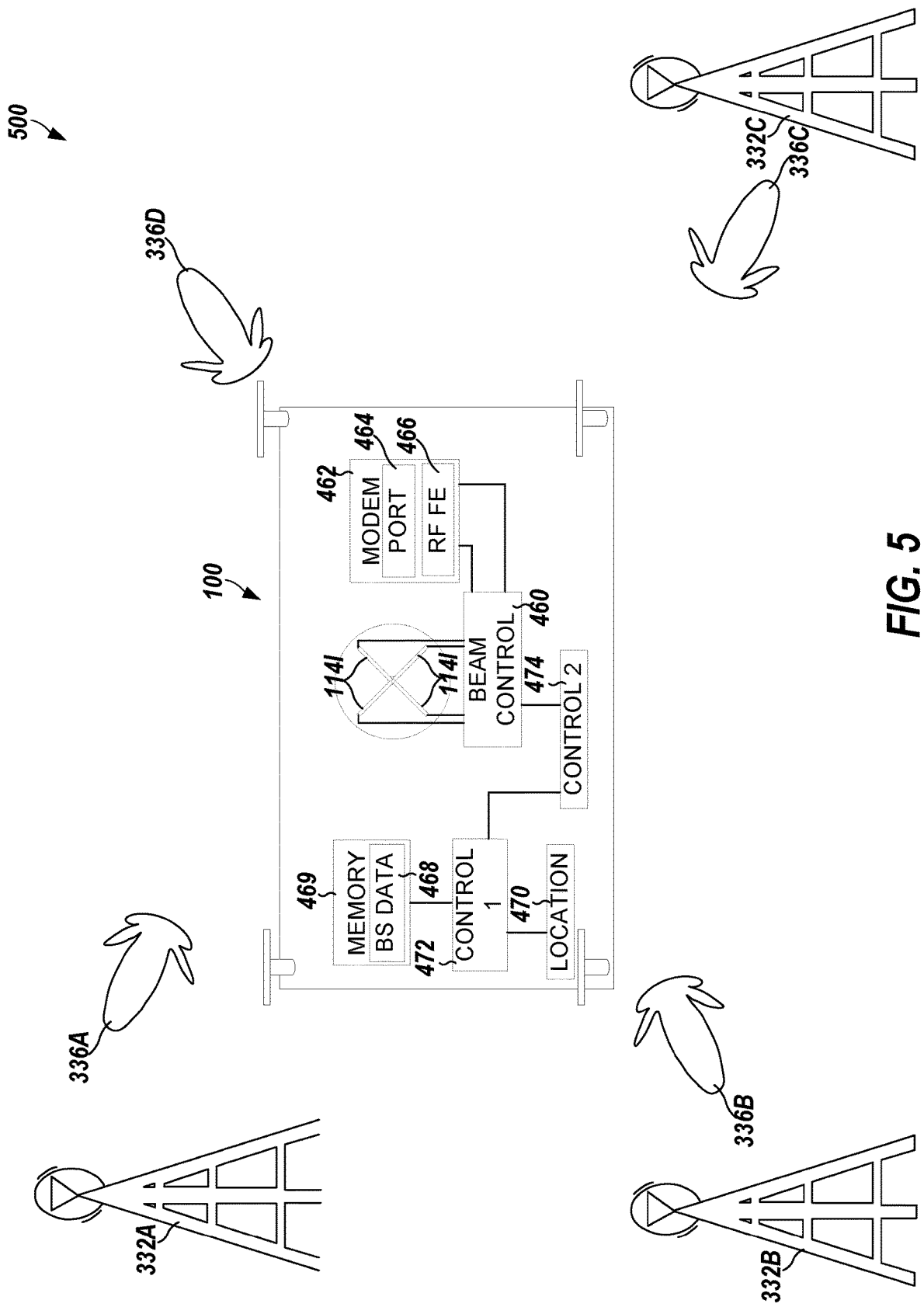

FIGS. 4 and 5 illustrate, by way of example, respective diagrams of aspects of systems 400 and 500 for UAV communication over a communications network. The systems 400 and 500 as illustrated include the UAV 100 and some base stations 632A, 632B, 632C. The UAV 100 of FIGS. 11 and 12 include a modem 462 with one or more antenna ports 464 beam control circuitry 460, memory 469 with base station (BS) data 468, location circuitry 470, and a control circuitry 472. The UAV 100 of FIG. 4 as illustrated includes some omnidirectional antennas 114E in an array. The UAV 100 of FIG. 5 as illustrated includes some directional antennas 114I. The directional antennas 114I can provide directed transmission patterns 336A-336D to provide transmissions that can be incident on the base station 332A-332C in any horizontal direction from the UAV 100, such as to have 360 degrees of coverage.

The modem 462 includes circuitry for transmitting and receiving signals from and by the antennas 114E, 114I. The modem 462 can include one or more modulators, demodulators, amplifiers, oscillators, phase shifters, time delay elements, mixers, power dividers, phase locked loops, or the like. The modem 462 as illustrated includes an RF front end (RF FE) 466.

The RF FE 466 includes the circuitry between the antenna and to (and including) the mixing stage. The RF FE 466 includes the components that process the signal at the received or transmitted frequency, such as before it is converted to an intermediate frequency. Common RF FE components include an RF filter to remove unwanted frequencies from the received signal, an RF amplifier to boost the received or transmitted signal, a mixer to combine the received or transmitted signal with an intermediate frequency signal, such as from an oscillator of the RF FE.

The ports 464 can be coupled to the beam control circuitry 460. The beam control circuitry 460 can control a phase, time, or the like of signals generated by the antennas 114E, 114I. The beam control circuitry 460 can consult the BS data 468 and determine, based on the BS data 468, a direction to which to direct a beam, such as by using the antennas 114E of an array or the directional antenna(s) 114I. Through this control, the beam control circuitry 460 can alter a direction of the transmission from the antennas 114E.

The BS data 468 can indicate base stations 332A-332C and their corresponding locations. The location circuitry 470 can indicate a current location of the UAV 100. The location circuitry 470 can operate using a global positioning system (GPS), Galileo system, triangulation, time of flight of a signal to/from a device at a known location, or the like. The location circuitry 470 can determine an orientation of the UAV 100. The orientation can be determined using an accelerometer, gyroscope, compass, or the like. The beam control circuitry 460 can determine an orientation of a directional antenna 114I that is movable, a direction to which to point an antenna array beam, or which directional antenna(s) 114I to power on to transmit signals to a nearest or best base station 332A-332C. The beam control circuitry 460 can make this determination based on the location provided by the location circuitry 470 and the BS data 468.

FIG. 4 illustrates an example transmission pattern 336 of the antennas 114E. Alternative to the antennas 114E organized in an array, the UAV 100 can include one or more directional antennas 114I, such as shown in FIG. 5.

The systems 400, 500 solve one or more of the problems with including a directional transmission (e.g., from a directional antenna or an antenna array) in a UAV. Whether the directional beam (from the directional antenna or MIMO) points correctly, wrong or is transitioning from one cell to another, control circuitry 472, 474 can compensate for at least some signal quality changes. For example, if the beam from the antenna(s) 114E, 114I on the port 464 are pointing to a wrong direction, then the wanted signal is suppressed while unwanted is boosted, leading to broken or weak link. With the control circuitry 474, diversity or maximal ratio combining (MRC)/MIMO operation can automatically compensate for loss.

The systems 400 and 500 can reduce interference between transmissions to/from the UAV 100 and other devices. The systems 400 and 500 can reduce the interference by using directional transmissions. The directional transmissions can be made narrower or more accurate by increased accuracy in the location determined by the location circuitry 470 and stored in the BS data 468. Further, the beam control circuitry 460 can change the beam direction quickly as informed by the second control circuitry 474.

With a specially designed panel antenna for narrow bandwidth, one can make the antenna 114 very small and cheap. Note that one can sacrifice antenna efficiency compared to a design for mobile phones. Compared to the rotors of the UAV 100 (the components that spin the propellers of the UAV 100), the communication subsystem consumes only a small portion of the total power. A typical commercial UAV can operate at 100-200 Watt for about 30 minutes. The communication subsystem (e.g., such as can include the antennas 114, modem 462, control circuitry 472, 474, location circuitry 470, beam control circuitry 460, or the memory 469) can consume only a small portion of that total power.

As shown, aspects can include a directional antenna 114I or MIMO array of antennas 114E. The second control circuitry 474 can control the transmission pattern 336 directions. The second control circuitry can provide signals to be transmitted by the antenna 114E, 114I to an antenna port 464. The second control circuitry 474 can implement a technique for determining a beamforming direction/tracking at a given location (3D (latitude, longitude, and altitude (or elevation)). The second control circuitry 474 can maintain the BS data 468 on the memory 469. The second control circuitry 474 can, additionally or alternatively, implement a precalculated beamforming strategy. The second control circuitry 474 can receive sensor information from the location circuitry 470 that indicates location or UAV orientation. The second control circuitry 474 can be coupled to the modem 462. The second control circuitry 474 can perform beam tracking with 'real-time' feedback from the modem 462.

Aspects provide a benefit of interference mitigation for UAVs without requiring complex modem/chip design. Aspects can operate with both future and existing modem/RF chipsets. In some aspects, aspects can be implemented in a package same package as the modem 462.

The directional antenna 114I or MIMO array antenna 114E can be connected to the beam control circuitry 460. The beam control circuitry 460 can be coupled to the modem 462. The beam control circuitry 460 can form a directional antenna pattern (transmission pattern 336) in a direction based on input from the second control circuitry 474. The input to the beam control circuitry 460 can be, for example, which direction to form a beam, which antenna 114I to turn on, or an antenna 114E gain and/or phase setting.

The system 400, 500 can create multiple simultaneous antenna beams. These beams can be used to find the direction of the beam with a best connectivity instead of using one narrow beam to cover the entire space. Simultaneous beams can help reduce a searching space and time needed to find the direction to point the beam.

As previously discussed, the system 500 includes switched directional antennas 114I. The antennas 114I can be arranged such that each antenna 114I is pointing in a particular direction relative to another antenna or other component of the UAV 100. Each antenna 114I can be switched on or off independently.

As previously discussed, the system 400 includes a MIMO array antenna 114E. In the MIMO array antenna 114E, multiple antennas are arranged in an array. The phase and/or power of each of the antennas 114E can be adjusted individually. Using either of the systems 400, 500 one or multiple simultaneous beams can be created.

The beam control circuitry 460 applies control signals to form/change an antenna beam. For example, the second control circuitry 474 can issue a command to the beam control circuitry 460 to power a specified antenna. The second control circuitry 472 can issue a message indicating a phase, gain, power, or other control parameters of each antenna 114E, 114I to the beam control circuitry 460. The beam control circuitry 460 can issue signals that alters the parameters of the antenna and apply the corresponding parameter to each antenna.

The second control circuitry 474 can implement the beamforming technique. The second control circuitry 474 can receive data from other circuitry (e.g., sensor) such as can be part of the location circuitry 470. The data can include the location or UAV orientation. The second control circuitry 474 can receive power measurements from one or more detectors that can be implemented using the antenna 114E, 114I.

The second control circuitry 474 can implement a beam forming technique to generate a beamforming command to the beam control circuitry 460. The beamforming command can include 1) an antenna identification indicating an antenna/beam to switch on/off, or 2) a gain/phase that each antenna 114E is to have applied thereto (in the MIMO antenna 114E). There are a variety of techniques that the second control circuitry 474 can use to determine the command provided to the beam control circuitry 460.

A beamforming technique can include reliance on the BS data 468. The second control circuitry 474 can maintain the following data in the memory 469. The data can include network information sometimes called BS data 468. The BS data 468 can include a base station identification, a location of a base station 332, a height of an antenna of the base station 332, an orientation of the antenna, a pattern of the antenna transmission, or other base station data. Table 1 illustrates an example of such BS data 468.

TABLE 1

Example Base Station data

| Cell Identification | Location | Height |
|---|---|---|
| Cell ID 1 | (x, y, z) | Height 1 |
| . . . | . . . | . . . |

In some aspects, a geographical area served by the base station can be divided into atomic regions. One or more serving base station identifications can be stored for each atomic region. The BS data 468 can further include rules (e.g., a heuristic) that a device can use to determine which BS to which to associate if there is more than one BS indicated or a signal power of the base station. Tables 2 and 3 illustrate example BS data in this format.

TABLE 2

Example BS data by atomic region indicated by (ak, bk, ck)

| Grid Point Index | Cell 1 | Cell 2 | Cell 3 | Cell 4 |
|---|---|---|---|---|
| (ak, bk, ck) | Cell ID 1 | Cell ID 2 | Cell ID 3 | Cell ID 4 |
| ... | ... | ... | ... | ... |

The BS data 468 can include information indicating one or more interference cells. This information can be combined with data in Table 2. The 3D space can be divided into atomic regions. Each cell, whether a serving station or an interfering station can include their base station identification along with an associated signal power. Table 3 illustrates example BS data in this format.

TABLE 3

Example BS data by atomic region indicated by (ak, bk, ck) and interfering cells following the serving cell identification

| Grid Point Index | Cell 1 | Cell 2 | Cell 3 | Cell 4 |
|---|---|---|---|---|
| (ak, bk, ck) | Cell ID 1, Power 1, Cell ID 2, Power 2 | Cell ID 2, Power 2, Cell ID 1, Power 1 | Cell ID 3, Power 3 | Cell ID 4, Power 4 |
| ... | ... | ... | ... | ... |

The power can, for example, be based on a particular reference signal from each cell (e.g., In LTE, the power can include RSRP (reference signal received power), and/or RSRQ (reference signal received quality)). The power can be, for example, quantized to a limited number of integer values (e.g., two, three, four, five, etc.). Such a quantization can help reduce a number of bits consumed by the power value. Since a signal strength is a real number with a large range (and there is fluctuation), the actual value of the power can consume a large number of bits. Only the quantized value can be stored, thus saving memory space. Table 4 is an example on how one can quantize the values. Each of the signal qualities (e.g., "Excellent", "Good", "Mid Cell", "Cell Edge", or the like) can be associated with a binary value (e.g., "00", "01", etc.).

TABLE 4

Example quantization of serving cell power data

| | RSRP (dBm) | RSRQ (dB) | SINR (dB) |
|---|---|---|---|
| Excellent | >=−80 | >=−10 | >=20 |
| Good | −80 to 90 | −10 to −15 | 13 to 20 |
| Mid Cell | −90 to −100 | −15 to −20 | 0 to 13 |
| Cell Edge | <=−100 | <=−20 | <=0 |

Given the above data, the second control circuitry 474 can determine a beamforming command can use one of the following techniques:

(a) The second control circuitry 474 can read the location circuitry 470 and determine a region (e.g., atomic region) it is in based on the BS data 468 indicating a location of the base station or the atomic region. The second control circuitry 474 can determine a relative angle to one or more of the cells by comparing the BS location to the location of the UAV 100 as determined by the location circuitry 470. The second control circuitry 474 can determine a beamforming direction that best transmits data to the base station 332. For the UAV of FIG. 5, the beamforming command can indicate the antenna(s) 114I over which to perform the transmission. For the UAV of FIG. 4, the beamforming command can indicate a phase and gain of each element of the array antenna 114E (e.g., an index to a codebook that indicates gain and phase of each element of the array antenna 114E). The command can be sent to the beam control circuitry 460 that can apply signals to the antenna 114E, 114I that cause the antenna 114E, 114I to transmit a beam towards the base station 332.

(b) The second control circuitry 474 can receive or retrieve location information and determine which atomic region it is in based on the BS data 468. The BS data 468 can indicate the location of the BS, the BS with the highest signal strength, and determine the interfering base stations. The second control circuitry 474 can determine the relative angles to the serving BS and the interfering BS. Based on its own location and orientation and the location of the BSs, the second control circuitry 474 can determine one BS to be a serving BS and one or more BSs to be 'canceling BSs'. The second control circuitry 474 can then determine a beamforming+nulling vector (suitable for the antenna 114E) so that a beam is pointed to the serving BS while nulls (or low power pattern regions) are pointing to the 'canceling BSs'. The corresponding antenna commend can be sent to the beam control circuitry 460 to apply the proper signals to achieve the beam (with or without nulling).

Figure 6:
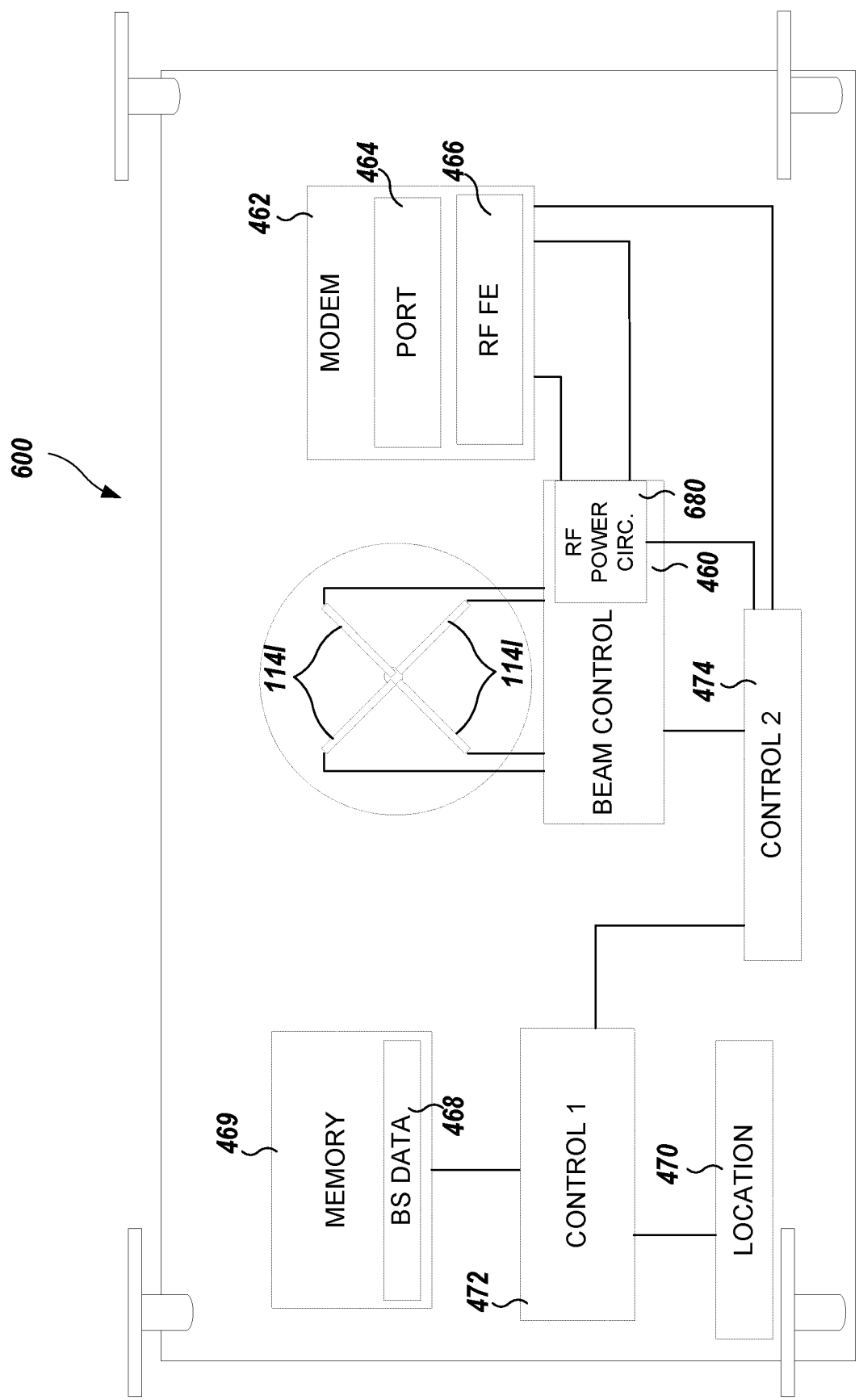
FIG. 6 illustrates, by way of example, a diagram of an aspect of a UAV configured for feedback.

(c) Tracking with feedback can be used (in addition to using database). one can also use feedback to adjust beams in real time. FIG. 6 illustrates, by way of example, a diagram of an aspect of a UAV 600 configured for feedback. The UAV 600 is similar to the UAV 100 with the UAV 600 including an RF power circuitry 680, and feedback from the modem 462 to the second control circuitry 474.

The data feedback can include RF received power at the antenna 114. The RF received power circuitry 680 can detect power from multiple directions. A comparator, or the like, can indicate which sector or direction at which the highest received power is from. Additionally, or alternatively, data can be fed back from the modem 462 to the second control circuitry 474. The modem 462 can provide a received reference signal power level to the second control circuitry 474. The modem 462 can maintain feedback of an RSRP/RSRQ value. Given this feedback, the second control circuitry 474 can provide signals to the beam control circuitry 460 to scan for a signal present in one or more directions or try out different phase/gain combinations. For each direction, the corresponding signal power can be fed back to the second control circuitry 474. Such a technique can help the second control circuitry 474 to identify a beam direction or beam design. Data from a such a process can be stored in the memory 469, such as for future reference.

Data Structure and Usage for Wireless Communication Between UAVs

Aerial vehicles, such as UAVs, fly in 3-dimensional (3D) spaces. Maintaining wireless connections to the UAVs can help enable safe and reliable UAV operations. Wireless cellular (e.g., long term evolution (LTE), third generation partnership project (3GPP), fifth generation (5G), fourth generation, or the like) can provide infrastructure for supporting UAV communications.

Wireless channels in the air are more stationary compared with a ground case where the latter is typically subject to more multipath effort. Channels in the air, in contrast, are typically line-of-sight (LoS) and affected by antenna pattern, height, power, among other factors, from nearby base stations. Sometimes a ground reflection path and major terrain features such as large buildings or hills may affect air channels. Yet these factors are most likely stationary. Thus, the in-air signal environment is mostly stationary, and a data may be used to characterize air channel properties. The data be of a standard structure. The data can indicate information that supports UAVs over cellular or other wireless networks.

Aspects can provide one or more improvement that can include maintaining a wireless connection, better UAV motion routes, and improving beamforming/interference mitigation/handover. Aspects can include several ways to construct such data for efficient maintenance and support of UAVs. In a traditional ground network analysis, a coverage map may be used to describe coverage quality in a 2-dimensional (2D) area. This coverage cannot be directly expanded to 3D to cover the UAV communication.

Traditional ground coverage investigation assumes a multi-path effort. Typically, the ground coverage map describes a particular area's signal strength or quality without much further information. Aspects herein devise several databases and structures to record 3D channels and signal properties that may be used to support UAV operations. Methods of generating the data are described along with updating and utilization of such data and data structures are described.

Wireless channels in the air are mainly determined by major terrain features. Such channels may be determined by the nearby BS properties, such as height of antenna, antenna tilt, antenna pattern, or the like. The wireless air channel (an air channel is one that is directed to a flying device) can be affected by ground reflection, large features such as hills, and high-rise buildings. In contrast with the ground channel, LoS channel from BSs, and one or more reflection paths determine major properties of the air channel. Yet a pure model based (e.g., ray-tracing based on BS antenna pattern) approach is not sufficient to determine quality of an air channel. A better approach can be to combine measurement and model prediction to establish a channel.

As previously discussed, a wireless environment in air differs from a wireless environment on the ground. One difference is that the wireless channels are different in heights. There are several ways to generate data to describe the wireless signal environment (e.g., channel, coverage, network information, or the like) efficiently. Such data can be used for better UAV support and network optimization. One particular use is to support directional transmission and reception with directional antennas on UAVs.

As previously discussed, the BS data 468 can include a geographic region split into atomic regions (e.g., on a grid of regularly or irregularly spaced cells). For each cell, one or more bits can be used to denote whether the signal strength from any nearby BS is above a pre-defined threshold P0 dBm, whether the signal-to-interference-plus-noise ratio (SINR) is above or below a threshold SINR0 dB.

The data can further include (e.g., for each cell or group of cells in the grid) K-bits (where K is an integer greater than or equal to one) used to denote the range of the BS transmission. The BS signal strength can be based on a nearby BSs reference signal powers. The range can be based on received signal power, such as RSRP, or received signal quality indicator (RSRQ).

Figure 7:
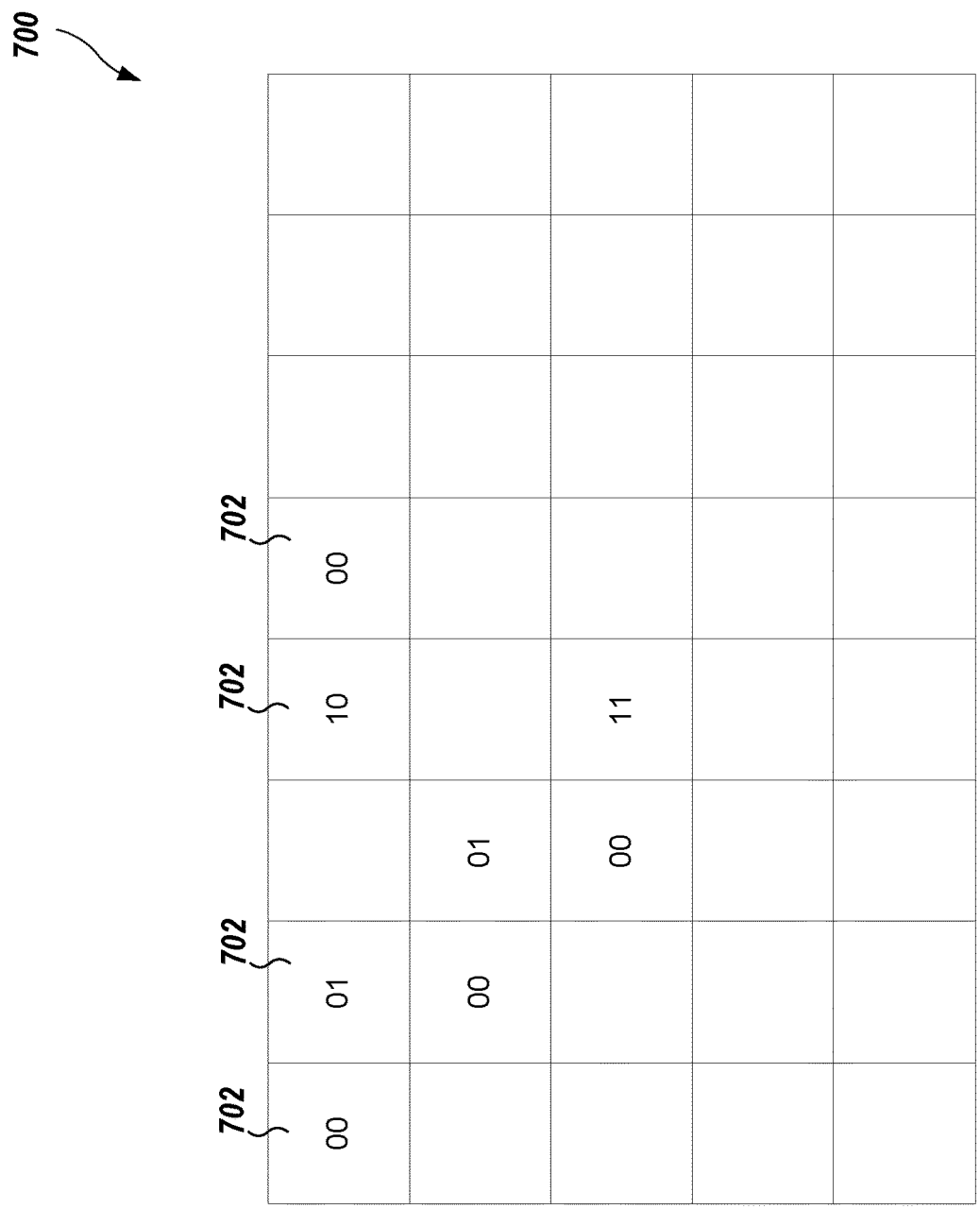
FIG. 7 illustrates, by way of example, a diagram of an aspect of a signal strength map.

In some aspects, the signal quality can be quantified and quantized. An example of quantized signal quality is provided in Table 4. A map can be generated based on the quantization indicating the signal quality in each geographic location. Each cell can include an associated quantization number to generate the signal strength map. FIG. 7 illustrates, by way of example, a diagram of an aspect of a signal strength map 700. Each cell 702 can include an associated location and optionally include data indicating extent. Each cell 702 can further include an associated number indicating signal strength. A cell that does not include signal strength information can be a cell associated with a region the UAV has not occupied, a region that is not served by a BS, or is a region for which the UAV was not otherwise able to discern the signal strength.

As previously discussed, the region can be divided into cells with certain sizes length, width, or height. For each cell, each BS with a signal strength above a threshold, P0 dBm within that cell can be recorded in the BS data 468. Further, each BS's location, cell ID, antenna orientation, or antenna properties can be recorded in the memory 469. The antenna properties can include antenna pattern information that can include an antenna gain at different angles (e.g., for vertical and horizontal). The BS data 468 can include relative angles (horizontal and vertical) to the BS. The BS data 468 can include distance from the cell 702 to the BS. The distance can be determined based on location information of the cell 702 and the BS.

The BS data 648 can include an identification of a preferred BS to be used for serving the cell 702. The BS data 648 can include the signal quality associated with the preferred BS or other BS (along with or in lieu of the signal strength).

The BS data 648 can include data indicating which BSs or cells interfere in uplink (UL) (from BS to UAV) and/or in downlink (DL) (from UAV to BS). A corresponding pathloss (the pathloss between the cell 702 and a particular BS) can be recorded in the BS data 468.

Figure 8:
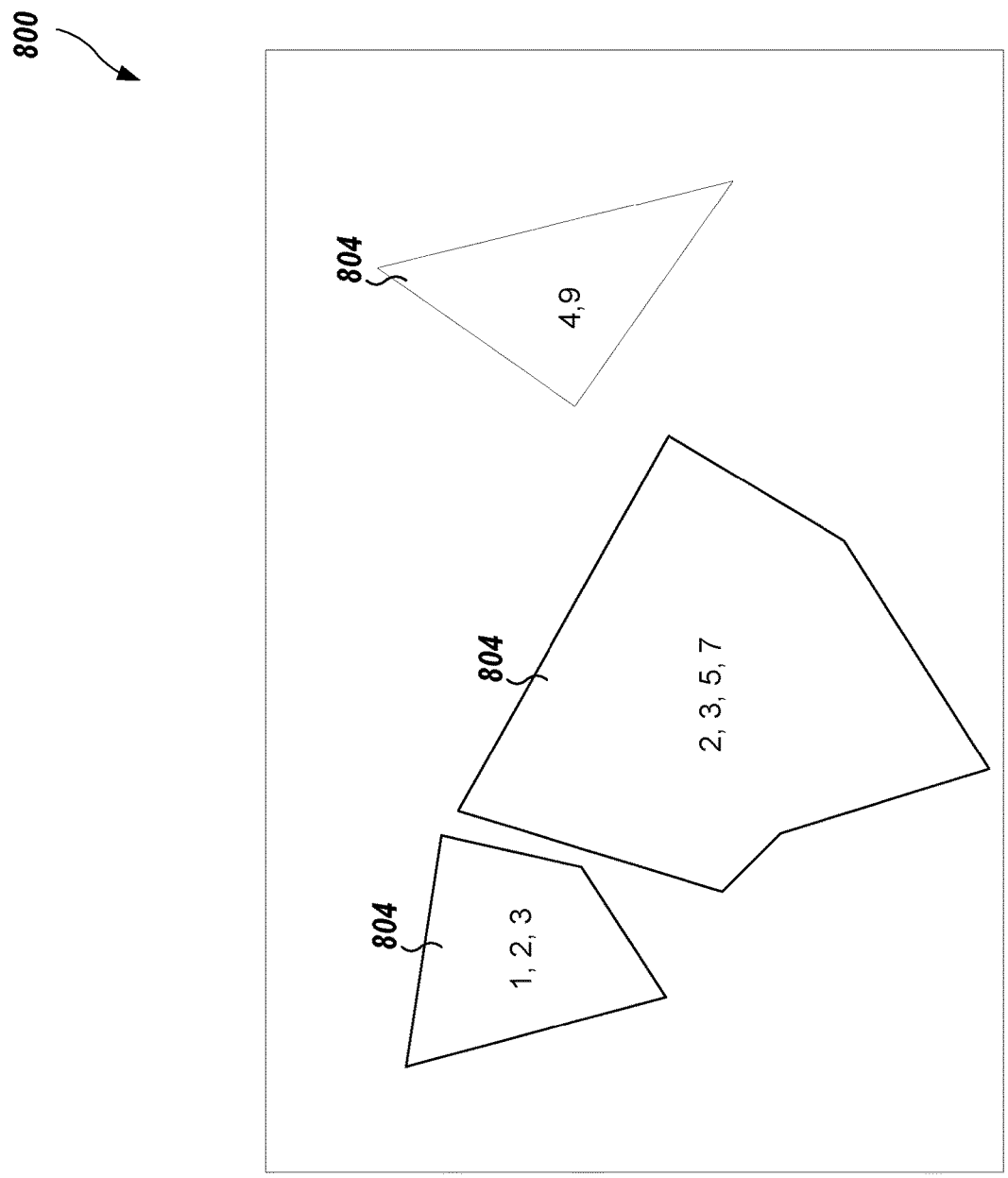
FIG. 8 illustrates, by way of example, a diagram of an aspect of a map that includes cells with extents based on signal strength or signal quality.

As previously mentioned, the geographical region (land area or airspace, such as 5 or more meters above the ground) can be divided into irregular cells (cells of varying size). For example, the region can be divided based on how signal quality. For example, one region can be determined, within which the same set of BSs all have strength over a threshold P0. FIG. 8 illustrates, by way of example, a diagram of an aspect of a map 800 that includes cells 804 with extents based on signal strength or signal quality.

Signal strength or signal quality from a BS 332 can fluctuate and complicate communication. This is due, at least in part, to some of the sidelobes of an antenna transmission being directed to the sky. In such cases a handover process can be improved by using a BS 332 with a more constant or smooth signal strength throughout their transmission area (e.g., the cell 804). The selection process can be aided by considering the quality or strength fluctuation of a signal from a BS 332 in the cell 804. The BS data 468 can include data indicating which BS(s) 332 include smoother (e.g., more constant) signal quality through their transmission area.

Figure 9:
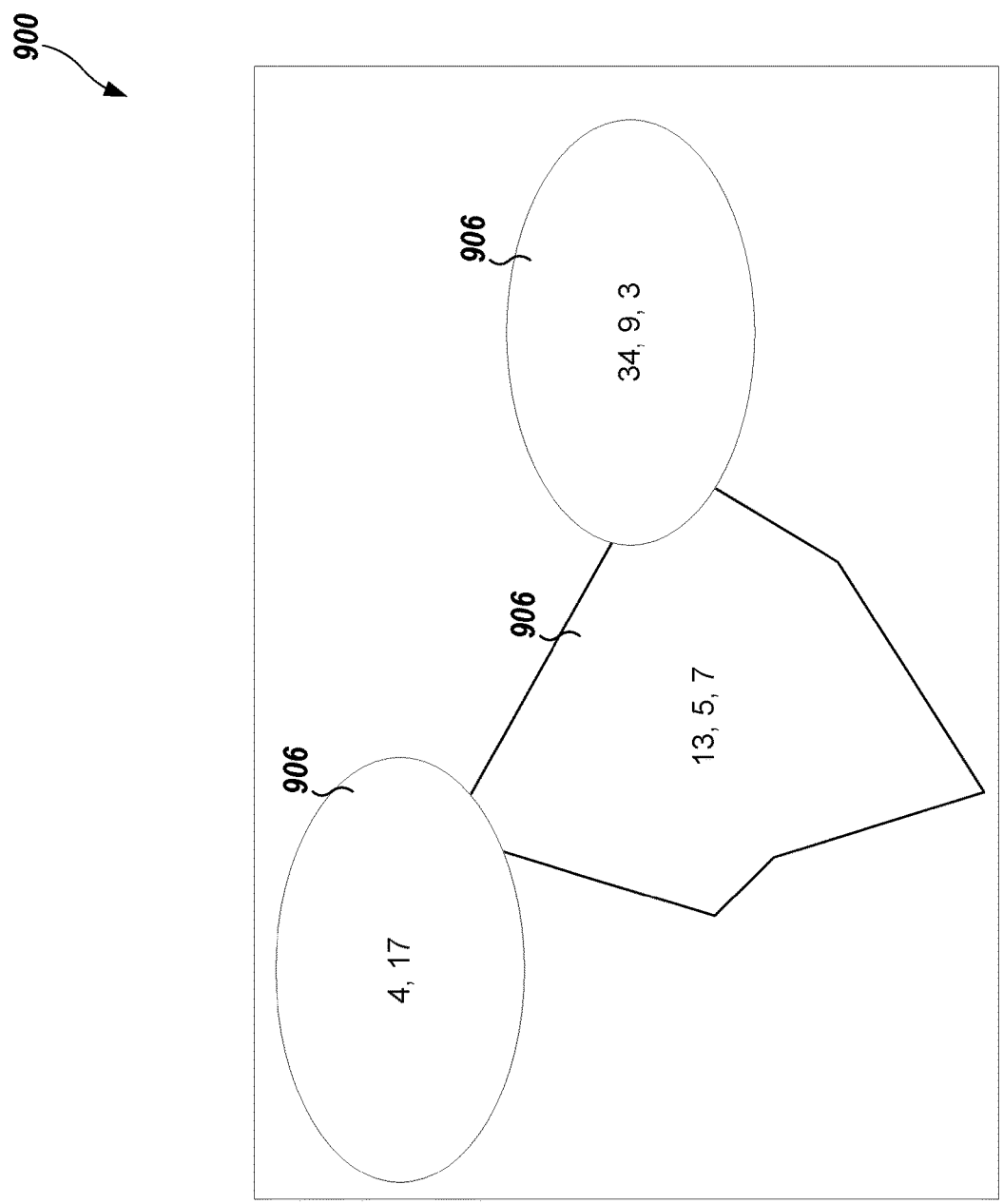
FIG. 9 illustrates, by way of example, a diagram of an aspect of a map that includes cells with extents based on BSs for HO.

In some aspects, a BS identification can be stored in the BS data 468 associated with a cell 804 along with one or more bits indicating whether the associated BS 332 is a candidate for a handover (HO) operation. The UAV 100, 600 can determine whether to use a BS for HO based on the associated HO data. In aspects, and to support mobility of UAVs, a network of BSs 332 and a UAV 100, 600 can use only BSs associated with data indicating the BS 332 is a good candidate for HO. FIG. 9 illustrates, by way of example, a diagram of an aspect of a map 900 that includes cells 906 with extents based on BSs for HO.

In aspects, information about on-demand wireless communication infrastructure, such as a UAV that can provide a communication to another device, a mobile or stationary BS on the ground, or the like can be stored in the BS data 468. A UAV can serve as an on-demand aerial access point (AP) or mobile servicing station. The UAV can serve a device in the air or on the ground, such as when needed to provide on-demand access. The UAVs in the air and other mobile or stationary stations can have location data and other data stored in the BS data 468. As the serving cell (the UAV 100, 600) moves, the data associated with the UAV 100, 600 can be updated, such as periodically (after a period of time has passed), after the UAV 100, 600 is determined to have moved a specified distance from the location recorded in the BS data 468, a combination thereof, or the like. The BS data 468 can include data indicating whether a serving cell (e.g., a BS 332 or UAV 100, 600) is on-demand or not. The BS data 468 can include data indicating a location, signal strength, duration (e.g., when the serving cell is available for serving a request), an antenna orientation, a servicing capacity (e.g., a bandwidth available at the serving cell or available throughput for UL or DL or the like).

The BS data 468 can be used to support UAVs and network optimization in a variety of ways. In practice, UAV antennas 114E, 114I are not perfectly isotropic (able to radiate equally in all directions). Thus, there is always a certain directionality to a transmission. Some UAVs may intentionally use directional antennas or beams for better connection quality or lower interference. As the UAVs travel through space, they can use the BS data 468 to help beamforming or otherwise point their antenna direction for best connection to a serving station. The beam direction can be based on the location, direction, signal strength, or a combination thereof of each BS 332. The UAV can use BS data 468 regarding an area that it may enter. Based on a fly plan, the knowledge of serving cell signal strengths, handover candidate cells, or a combination thereof, the second control circuitry 474 can determine the potential signal interference in the flight course and when/where to point its beam during its flight.

Figure 10:
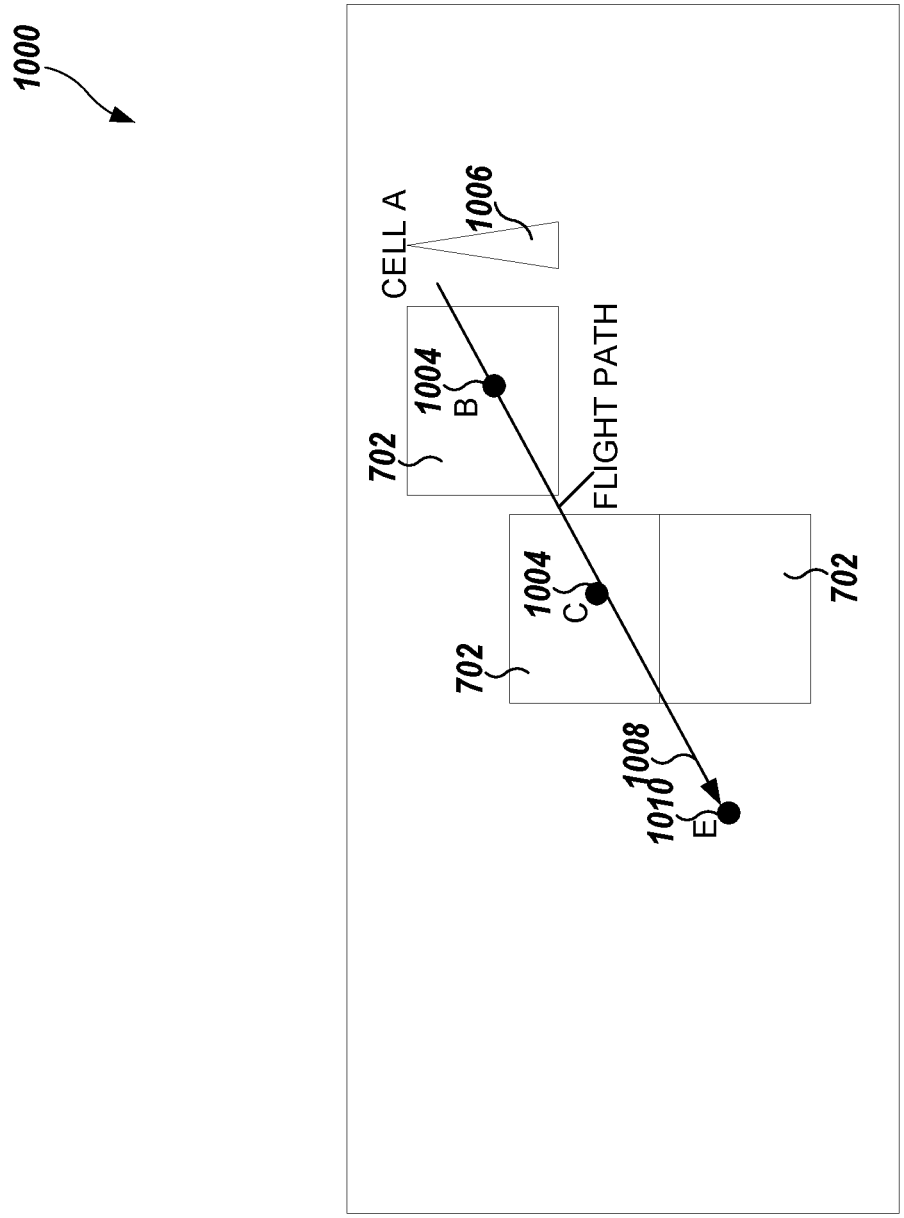
FIG. 10 illustrates, by way of example, a diagram of an aspect of a communications network.

The BS data 468 can help predict a BS 332 signal quality, such as in an unknown region, or a region in which a BS 332 is new to the UAV 100, 600. FIG. 10 illustrates, by way of example, a diagram of an aspect of a communications network 1000. The communications network 1000 as illustrated includes cells 702 and points 1004 along a flight path 1008 at which a signal strength of a serving cell 1006 is known. The signal strength at the point 1010 ("E") can be estimated based on the signal strength at points "B" and "C". An example estimation is provided:

$$P_B = P_0 - \alpha \log(d_{AB})$$

$$P_C = P_0 - \alpha \log(d_{AC})$$

$$P_E = P_0 - \alpha \log(d_{AE})$$

Given pathloss information (e.g., that can be derived as the UAV 100, 600 travels), distance to the point E, $P_B$, $P_C$, or a combination thereof, $P_0$ and a can be derived. The BS data 468 can thus be used for signal strength approximation.

AB7573 Dual-Band Directional Switched Beam Antenna Array

Aspects can include a dual-band directional switched beam antenna array in a low-profile small formfactor for UAV applications. Studies and measurements show that antenna beamforming with a directional pattern in UAVs can provide a system performance over an omni-directional antenna. The directional pattern can mitigate interference with a BS or another UAV.

Aspects can include an architecture of the beamforming and a directional antenna proposal which include beamforming methodologies (RF switched beam and MIMO beamforming) and a single band antenna proposal using a RF switched beam solution. However, it is highly demanding to include a dual/multi-band directional antenna/RF solution in a compact and low-profile formfactor. Further difficulty is realized when attempting to include consistent directional patterns at two different frequencies to support UL/DL simultaneously (e.g., in a frequency domain duplexing (FDD) domain).

Aspects can include a dual-band directional antenna architecture. The architecture can offer a consistent directional antenna patterns at two different frequencies in a sufficiently small form factor. Sufficient in this context means that it is light enough and small enough to include on a UAV.

Prior UAVs include an omni-directional antenna for all communication. There are standard directional antennas with various structures and performances such as Horn, Yagi-Uda, and Log-periodic antennas, among others. These antennas are large (have a prohibitively large footprint) and heavy (have a weight that prohibitively affects the energy expenditure in UAV motion) and are not suitable for a UAV platform (not sufficient for use on a UAV). Further, an omni-antenna for a standard UAV is suffering from interference from a BS or another UAV.

Aspects include a new antenna architecture that provides a consistent directional antenna pattern, at two different frequencies, and in a small, lightweight form factor that can be installed on a UAV. The antenna architecture can include a driver, one or more reflectors, and one or more directors on top of ground plane with a single feed for driving two elements simultaneously for dual bands.

Dual-band performance can be realized by placing the driver, one or more reflectors to one side of the driver, and one or more directors to an opposite side of the driver. The antenna can include a footprint that is same as a similar antenna for a low frequency operation but provide dual-band frequency operation without increasing the antenna footprint as compared to the single frequency operation. In this way, the antenna can be integrated in the UAV with a compact and small form factor. The dual-band antenna can help realize a switched beam array to provide an angular coverage over a 360-degree horizontal plane.

Thus, aspects can include a relatively small antenna offering directional antenna patterns at dual-band frequencies with a small footprint and a low-profile structure that can be installed in a UAV. The switched beam antenna array can include antenna elements that allow a seamless 360-degree azimuthal coverage with mitigated interference at the two different frequency bands of the dual-band frequencies.

Figure 11:
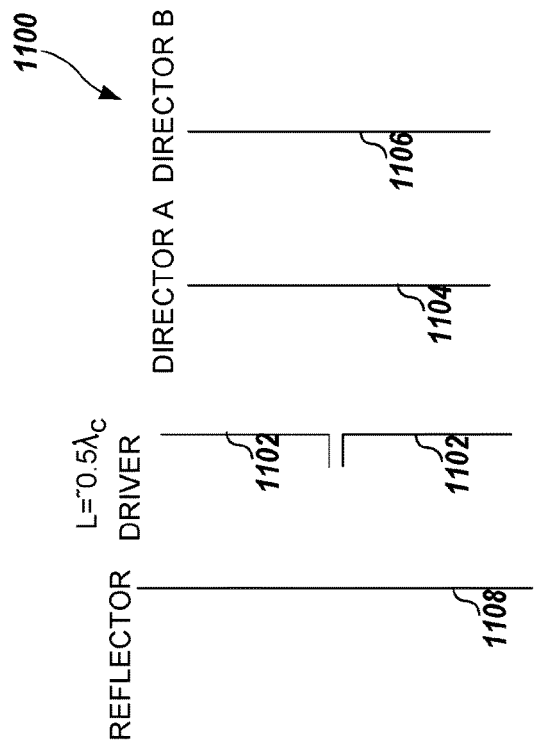
FIG. 11 illustrates, by way of example, a diagram of an aspect of a standard Yagi-Uda antenna.

FIG. 11 illustrates, by way of example, a diagram of an aspect of a standard Yagi-Uda antenna 1100. The antenna 1100 as illustrated, includes a driver 1102, a reflector 1108, and one or more directors 1104, 1106. The length of the driver 1102 and the director 1104, 1106, can be about half-wavelength at a center frequency. The reflector 1108 can be longer than the driver 1102, such as by a specified amount (e.g., 1%, 2%, 3%, 4%, 5%, etc. or some % greater, lesser, or therebetween). The greater the number of directors 1104, 1106 the greater the directivity of the antenna 1100. Also, the greater the number of directors 1104, 1106 the narrower the beam width produced by the antenna 1100. The antenna 1100 offers a single, continuous frequency bandwidth of operation.

Figure 12:
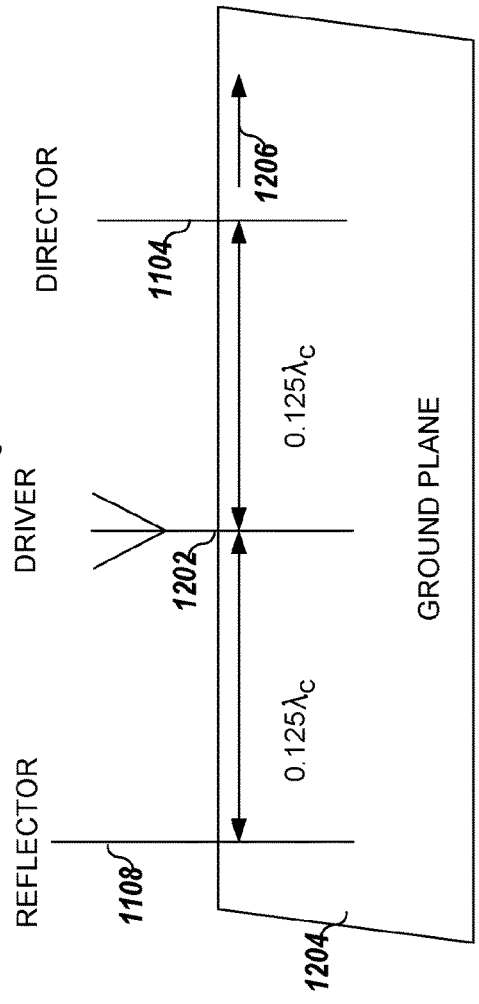
FIG. 12 illustrates, by way of example, a diagram an aspect of another Yagi-Uda type antenna.

FIG. 12 illustrates, by way of example, a diagram an aspect of another Yagi-Uda type antenna 1200. The driver 1102 of FIG. 11 is illustrated as a dipole. The dipole can be replaced with a monopole driver 1202 and a ground plane 1204. The monopole driver 1202 can include a length that is half the length of the driver 1102 (e.g., using the "antenna image concept"). The space between the elements of the antennas 1100 and 1200 remains the same.

The driver 1102, 1202 is the radiating element of the antenna 1100, 1200. The director 1104, 1106 serves to increase radiation in a given direction, such as by guiding radiation (or signals) in the direction. The reflector 1108 serves to redirect radiation towards the director 1104, 1106, effectively increasing a gain of the antenna 1100, 1200. The direction of transmission is indicated by arrow 1206.

The antennas 1100, 1200 only support one frequency band, since the monopole and dipole antennas are inherently narrowband. To create a dual/multi-band Yagi-Uda, two or multiple radiating elements, reflectors and directors can be used.

Figure 13:
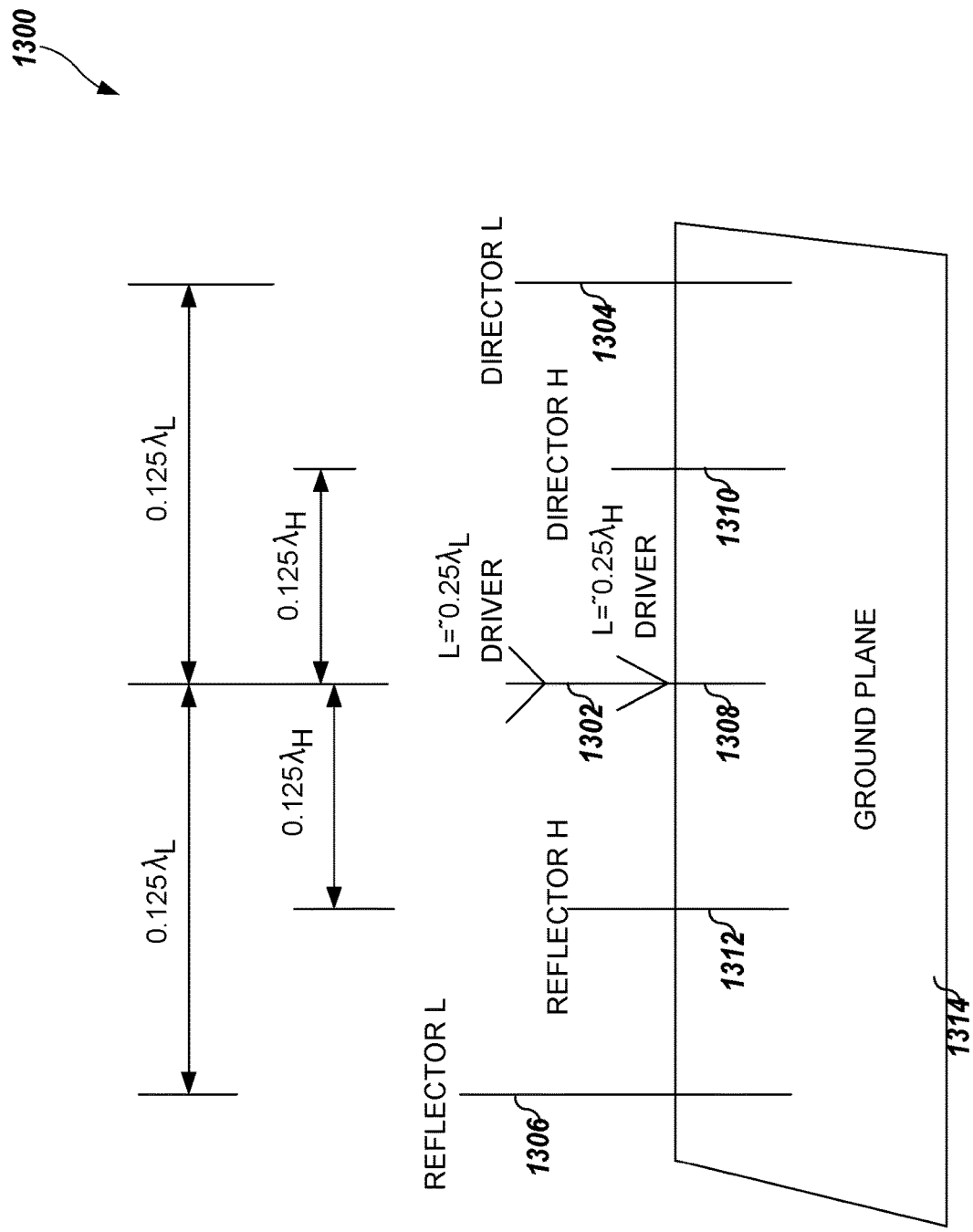
FIG. 13 illustrates, by way of example, a diagram of an aspect of a dual-band antenna.

FIG. 13 illustrates, by way of example, a diagram of an aspect of a dual-band antenna 1300. The dual-band antenna 1300 has two drivers 1302, 1308 to excite two different bands of interest. The two drivers 1302 can be coupled to share a common feed. Each frequency band can be supported by a respective reflector 1306, 1312, and a respective director 1304, 1310. The distance from the driver 1302, 1308 to a corresponding director 1304, 1310 can be based on a frequency at which the driver 1302, 1308 resonates. For example, the driver 1302 can be about ⅛ wavelength distance from the corresponding director 1304 and reflector 1306. The driver 1308 can be about ⅛ wavelength distance from the director 1310 and the reflector 1312. The distance can be different due to the different frequency.

An advantage of the antenna 1300 can include that the size (distance between the reflector 1306 and the director 1304) of the antenna 1300 is determined by the lowest frequency band of operation, as higher bands have lower wavelengths and can thus fit into smaller physical space. Using a high permittivity PCB material, this can be implemented to a lower profile form factor. An example of a high permittivity PCB material includes a Thermoset Microwave Material (TMM®), such as TMM® 13i from Rogers Corporation of Chandler, Arizona, United States.

Figure 14:
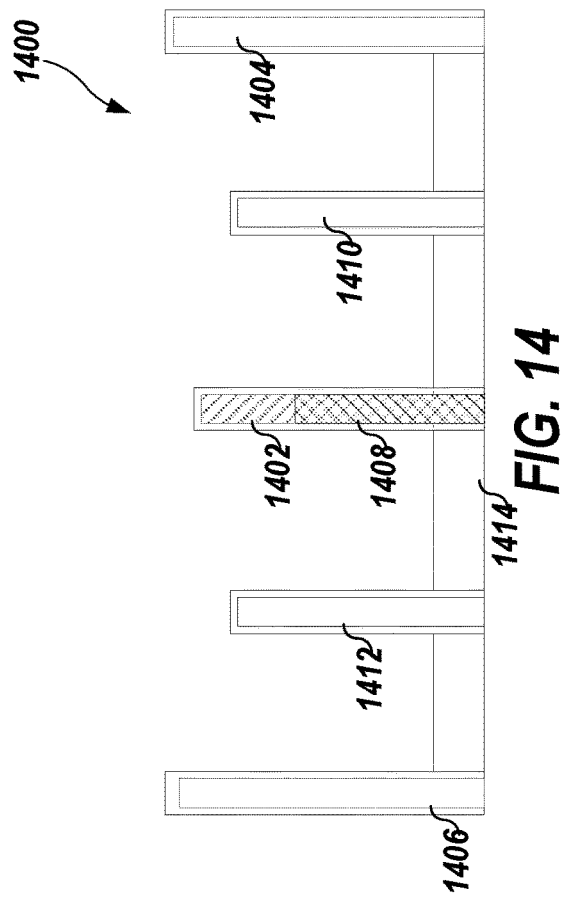
FIG. 14 illustrates, by way of example, a diagram of an aspect of a dual-band antenna.

FIG. 14 illustrates, by way of example, a diagram of an aspect of a dual-band antenna 1400. The elements of the antenna 1400 (e.g., the driver 1402, 1408, director 1404, 1410, and reflector 1406, 1412) can be printed on a high dielectric material 1414. The elements for one frequency can be printed on a first side of the dielectric material 1414 (the lower frequency driver 1402, director 1404, and reflector 1406 are illustrated as being printed on the side of the dielectric material 1414 that is facing away from the perspective shown in FIG. 14 as indicated by the dashed lines). The elements for the other frequency can be printed on a second side of the dielectric material 1414. The second side can be opposite the first side. The higher frequency elements of the antenna 1400 (the driver 1408, the director 1410, and the reflector 1412) are illustrated as Bing on the side facing the perspective FIG. 14 as indicated by a solid line.

Figure 15:
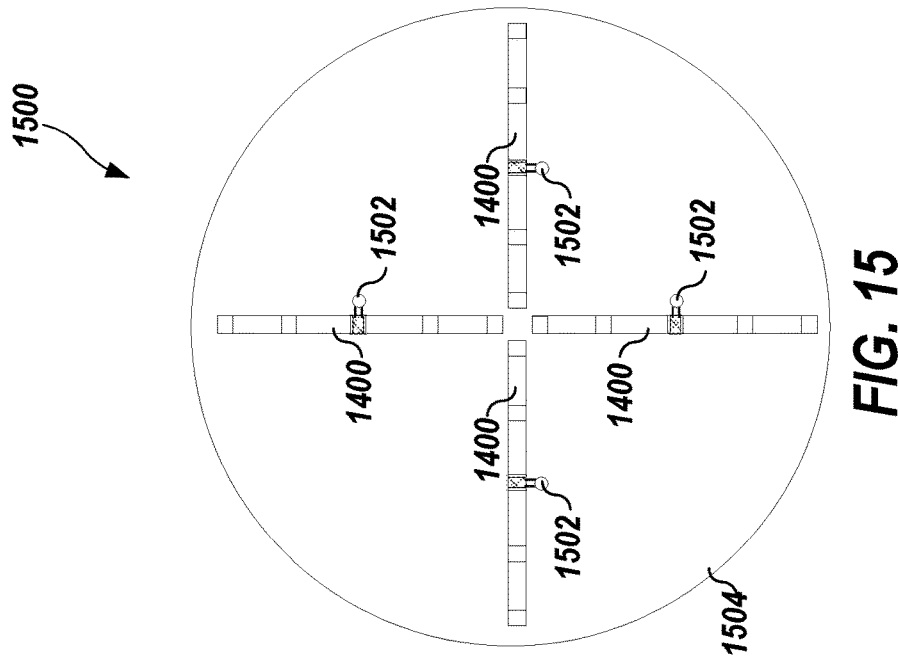
FIG. 15 illustrates, by way of example, a diagram of an aspect of an antenna array.

FIG. 15 illustrates, by way of example, a diagram of an aspect of an antenna array 1500. The antenna array 1500 includes four antennas 1400 oriented orthogonal to each other. The drivers 1402 and 1408 can be coupled to a common feed 1502 in some aspects. In other aspects, the feeds for each of the bands can be driven with electrically separate signals. The antennas 1400 of the array are configured to cover seamless azimuthal coverage. By driving one, two directly adjacent antennas, or all four antennas, the direction of the beam can be directional or omni-directional.

One of the frequency bands, such as the lower frequency band, can be used for UL, while the other frequency band, such as the higher frequency band, can be used for DL. An example lower frequency band can be centered at about 1730 Megahertz. An example higher frequency band can be centered at about 2130 Megahertz. The frequencies are the ones currently used in Advanced Wireless Services (AWS). Other dual-band frequencies are possible.

FIG. 16 illustrates, by way of example, a diagram of another aspect of a dual-band antenna 1600. The dual-band antenna 1600 is similar to other dual-band antennas but includes a folded monopole antenna 1602. The driver can be replaced with another type of antenna element, such as a folded monopole antenna 1602 as illustrated in FIG. 16. The antenna selection can alter performance of the antenna, for example, providing an improvement to impedance performance over the antenna 1400. For example, the folded monopole antenna 1602 can have four times higher impedance than the monopole antenna (e.g., the driver 1402, 1408), so the folded monopole antenna can provide better impedance performance over the monopole. An impedance matching network can be electrically coupled to the antenna 1600 to provide a dual-band impedance matching at the frequency bands of interest.

Interference Mitigation and Handover Enhancement for UAVs with Flight Path Information in Wireless Networks There is a desire to support UAVs over cellular networks, such as to help enable a wider range of deployment scenarios for UAVs. However, the existing cellular networks have been optimized to support ground users, and thus impose many challenges on the support of UAV wireless communication. For example, due to more favorable line-of-sight propagation conditions for UAVs, UAVs can experience more severe interference from neighboring BS in the DL or cause more interference to other cells in the UL. Typically, BS antennas are tilted downwards and thus UAVs are supported by the side lobes of a BS antenna transmission. BS to UAV link qualities can fluctuate significantly from side lobe to side lobe as the UAV travel in the sky. All the above-mentioned problems can cause poor link connection and high HO failure rate for UAV communication via cellular links.

Recently, 3GPP RAN2 101-bis meeting has agreed that the flight path information provided from UE to eNB through radio resource control (RRC) signaling will be supported. Aspects propose techniques that exploit flight path information to enhance interference mitigation or HO support of UAVs. Different levels of enhancement techniques are provided and can be based on the granularity of the given flight path information. Aspects can include new useful signaling paradigms. The flight path information can include a backup trajectory indicating a flight pattern that the UAV can take if a currently active flight path is not taken.

Only recently, in a 3GPP RAN2 meeting, was it agreed that flight path information from UAV to BS (e.g., eNodeB (eNB)) can be supported. However, how to utilize such information to enhance interference mitigation and mobility management for UAV is not specified or obvious.

Compared with existing ground network such as vehicular network, an aerial network has its own unique channel environment properties and challenges:

1. The channel propagation environment in aerial network is often line-of-sight, while a ground network experiences a mostly multi-path environment. Hence channel quality in aerial network is much more predictable than ground network.
2. The UAVs in aerial network are generally served by the side-lobes of base stations. The UAV thus experiences more frequent and different channel fluctuation and HO patterns than ground users.
3. In an aerial environment, the UEs (e.g., UAVs) have more height variation that creates different challenges compare to ground vehicular networks which is mostly 2D in movement.

Enhancing UAV wireless communication via cellular network is a new topic. Existing solutions on interference mitigation and HO are designed for terrestrial users and has poor support for UAVs without consideration of the BS antenna patterns serving aerial users and special channel properties.

Aspects can exploit flight path information to enhance interference mitigation or HO support of UAVs. Aspects include different levels of enhancement strategies based on the granularity of the given flight path information, such as by using new signaling methods.

Aspects can provide enhanced support for UAV mobility management and interference management, as a UAV can require a reliable control for non-line-of-sight operation and, sometimes, a high data rate as well.

FIGS. 17, 18, and 19 illustrate, by way of example, respective diagrams of aspects of signal strength heat maps at various heights. The FIGS. 17-19 help describe the unique situation and properties that UAVs have at various elevations. FIG. 17 illustrates the signal strength heat map at about 50 meters. FIG. 18 illustrates the signal strength heat map at 100 meters. FIG. 19 illustrates the signal strength heat map at 300 meters. The signal strength illustrated in the FIGS. 17-19 is the SINR.

At 50 meters, the SINRs in most places are reasonably good (e.g. >−8 dB) for maintaining a connection. When the height is 100 meters, as in FIG. 18 the signal quality in some regions have very poor signal quality, as indicated by darker shading. Note that, according to a 3GPP study, a UE cannot maintain connection if SINR<−8 dB. Regions where the UE cannot maintain a connection is called a 'dead zone'. More dead zones are realized when the UE is at 300 meters as compared to the lower elevations of FIGS. 17-18. Considering a mainly Line-of-Site (LoS) channel in the air and coming from side lobes of a BS, the SINR distribution (and dead zones) can be determined based on the 3D location, speed, ad orientation, of the UE. More handover failures and radio link failure can occur for UAVs as they fly faster as less time will be available for the UAV to connect, HO, or the like.

As an aerial channel is mostly LoS and predictable, an availability of aa UAV's flight path information (e.g., location, direction, orientation, speed, destination, one or more points of traversal between the location and the destination, time of arrival at the one or more points) can be used to help enhance interference mitigation and HO support. In a 3GPP RAN2 101-bis meeting, it was agreed that a UE will be able to provide flight path information to a BS through radio resource control (RRC) signaling. Aspects provide systems, devices, and techniques regarding how a BS or other network gateway can use the flight path information. The flight path information can be provided along with one or more historical UE measurement reports, such as to inform interference mitigation, enhanced mobility management, or a combination thereof for aerial UEs.

Figure 20:
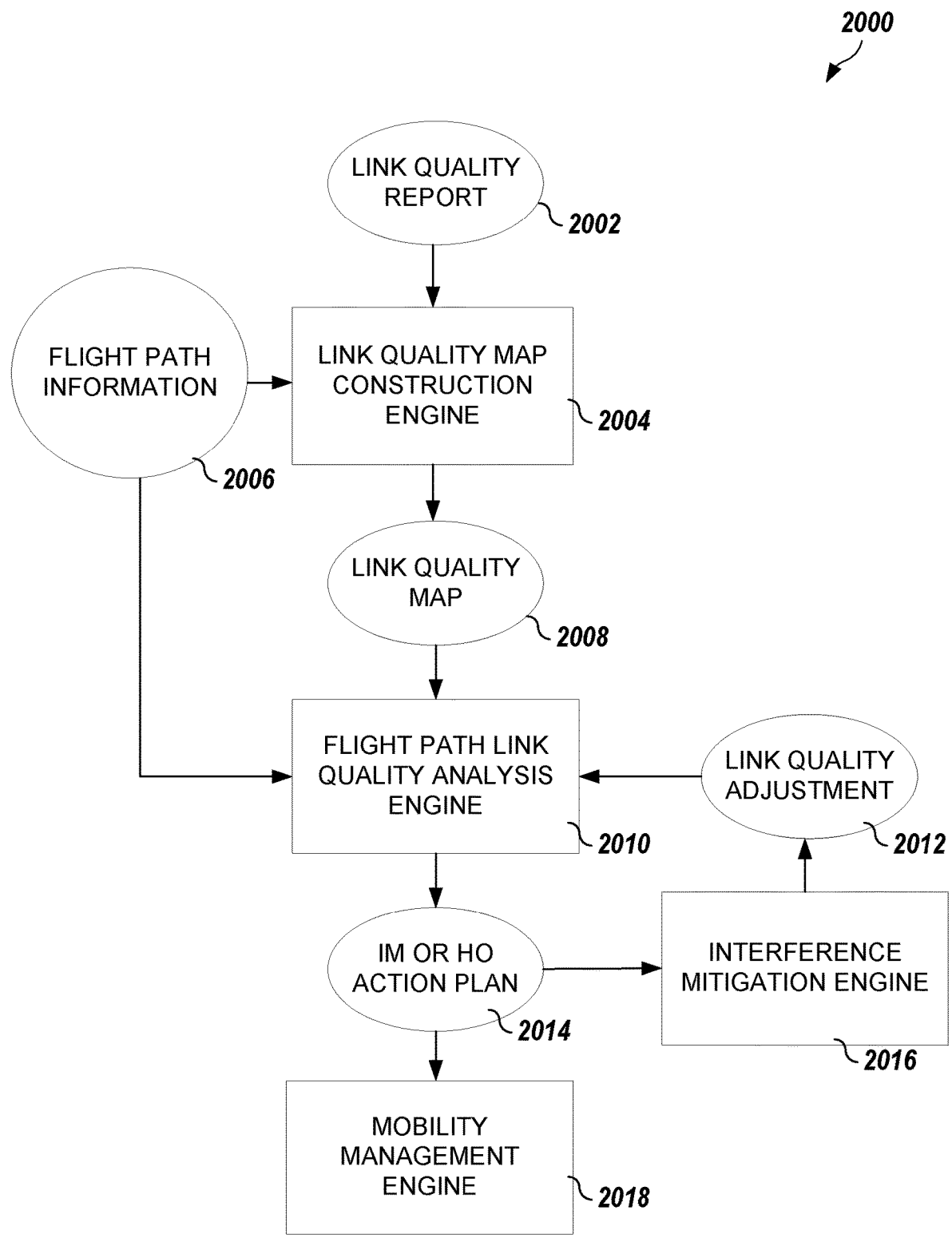
FIG. 20 illustrates, by way of example, a diagram of an aspect of a system for enhancing aerial UE communication with a BS.

FIG. 20 illustrates, by way of example, a diagram of an aspect of a system 2000 for enhancing aerial UE communication with a BS. The system 2000 as illustrated includes a link quality map construction engine 2004, a flight path link quality analysis engine 2010, an interference mitigation engine 2016, and a mobility management engine 2018. The link quality map construction engine 2004 is responsible for constructing or maintaining a link quality map 2008. The link quality map construction engine 2004 can provide the link quality map 2008 based on a link quality report 2002 and flight path information 2006.

The link quality report 2002 can include signal strength (estimated signal strength), SINK, estimated signal quality (e.g., RSRP, RSRQ, or the like), or other link quality information indexed by location, BS, or the like. The link quality report 2002 can be separated by UL and DL in some aspects. The link quality report 2002 can be generated based on information from aerial UEs.

The flight path information 2006 can include a position, velocity, expected future location(s), expected timing to arrive future location(s), or the like. The flight path information 2006 can be provided by an aerial UE associated with the flight path information.

The link quality map 2008 can be arranged by location, a grid of cells (e.g., a three-dimensional (3D) grid of cells) corresponding to a range of latitude, longitude, and elevation. A SINR, quantization of signal strength or signal quality, such as for UL, DL, or both, can be provided for each cell in the link quality map 2008. The cells in the link quality map 2008 can correspond to a current location of the UAV and expected future locations of the UAV.

The flight path link quality analysis engine 2010 can look up or receive the link quality map 2008 and the flight path information 2006. The look up can be based on the flight path information 2006, such as if the link quality map 2008 is indexed by location (e.g., 2D or 3D location). The flight path link quality analysis engine 2010 can provide an interference mitigation (IM) or HO action plan 2014.

The IM or HO action plan 2014 can include an operation to be performed by the aerial UE on the flight path to reduce interference or enhance HO. The IM of HO action plan 2014 can indicate a beam direction, time, location, BS to which to HO, a speed adjustment, a flight path adjustment, a null direction, or the like.

The interference mitigation engine 2016 can perform IM based on the IM or HO action plan 2014. The interference mitigation engine 2016 can determine a link quality adjustment 2012 after applying IM. The interference mitigation engine 2016 can provide a link quality adjustment to the flight path link quality analysis engine 2010. The flight path link quality analysis engine 2010 can update the IM or HO action plan 2014. The mobility management engine 2018 can perform a HO based on the IM or HO action plan 2014.

The link quality map 2008 can include a link quality for each range of locations for which the UAV link quality has been previously determined or can be estimated. Given the flight path information 2006, the link quality map 2008 can be used to estimate the link quality (e.g. RSRP/channel quality indicator (CQI)) along the flight path.

The link quality map 2008 can be constructed using one or more of: (a) path-loss models or other path-loss information; (b) BS antenna patterns; (c) UE antenna patterns; (d) UE measurement reports of link quality; (e) the flight path information 2006; (f) UE traces collected via minimum drive test or other trace collection technique.

The link quality report from a UE (e.g., UAV) can include one or more of: Channel State Information (CSI), such as CQI, rank indicator (RI), and precoding matrix indicator (PMI); a UE Measurement report containing serving cell and major interfering cells RSRP or RSRQ information; and the flight path information 2006, such as can be provided using UE RRC signaling.

The link quality map 2008 can allow information to be stored with different resolution. For example, for a poor coverage area that can benefit from an IM or HO adjustment, more bits can be used to indicate the link quality in the link quality map 2008 to store link quality information with higher resolution.

In some aspects, there can be both a long-term link quality map 2008, representing long-term wireless environment characteristics regardless of short-term factors, such as traffic loading, and short-term link quality map 2008, reflecting near-term wireless environment based on recent measurements. For both the long-term and short-term link quality map 2008, there can be associated valid time information indicating the last time the map was updated.

In addition to a general link quality map 2008, a per-UE link quality map can be constructed if there is extra information, such as recent measurements from the particular UE, UE capability, or antenna configurations, or the like.

The link quality map 2008 can be constructed either locally at a BS 332 or globally at a network gateway. An example format of a link quality map 2008 can include categorization of different regions as safe region (SINR>threshold1), intermediate region (threshold2<SINR<threshold1), dead zone region (SINR<threshold2), or the like. Each individual BS 332 can maintain a local link quality map 2008 that is a subset of a global link quality map. If BSs 332 can cooperate or if there is a network central controller, the entire link quality map 2008 during the flight path can be constructed.

The flight path link quality analysis engine 2010 can, given the flight path information 2006, check the link quality map 2008. The link quality map 2008 can provide an RSRP/CQI trace of different granularity. When only coarse link quality map information is available, the flight path link quality analysis engine 2010 can use an interpolation method, such as linear interpolation or more advanced numerical method, inference, machine learning technique, or the like, to predict the signal quality or signal strength along the flight path indicated by the flight path information 2006. Based on the signal quality or signal strength traces along the flight path, the flight path link quality analysis engine 2010 can determine the IM or HO action plan 2014. The flight path link quality analysis engine 2010 can account for the associated validity time information from the long-term or short-term link quality map 2008, such as when deciding on an IM and HO action plan 2014.

What follows are some example of possible IM or HO action plans 2014. The following techniques can be used to mitigate interference and enhance signal quality for UAVs. A serving BS 332 can use beamforming to direct a transmission to the UAV, such as can be based on the flight path information 2006. This is a proactive approach in which the serving BS 332 can prepare, in advance, the beamforming direction along the route. Using this technique, the signal received at the UAV can be enhanced during the flight. In aspects, the BS 332 can sample the space (e.g., request a measurement report (MR) to determine a direction, signal strength, signal quality, or the like, of transmissions from devices in the space), and generate beamforming patterns offline, such as analog or digital beamforming patterns, and stored them in a memory for future reference and user. During the flight, the BS 332 can beamform towards the UAV as it progresses along its flight path. Based on the UE measurement (e.g., RSRP traces) in certain region, the BS 332 can obtain an estimate of the geographal wireless signal environment via interpolation or other signal processing methods.

An analog antenna pattern is a composite beam pattern created by antenna elements connected to the same antenna port. Signals at different antenna ports can pass through separate RF/baseband chains and can be further combined in the digital domain (baseband signal) to create different digital beamforming patterns. The composite analog beam pattern is controlled by the coefficients applied to each antenna element. Unlike digital beam forming, usually the analog beam pattern cannot be changed frequently.

Figure 21:
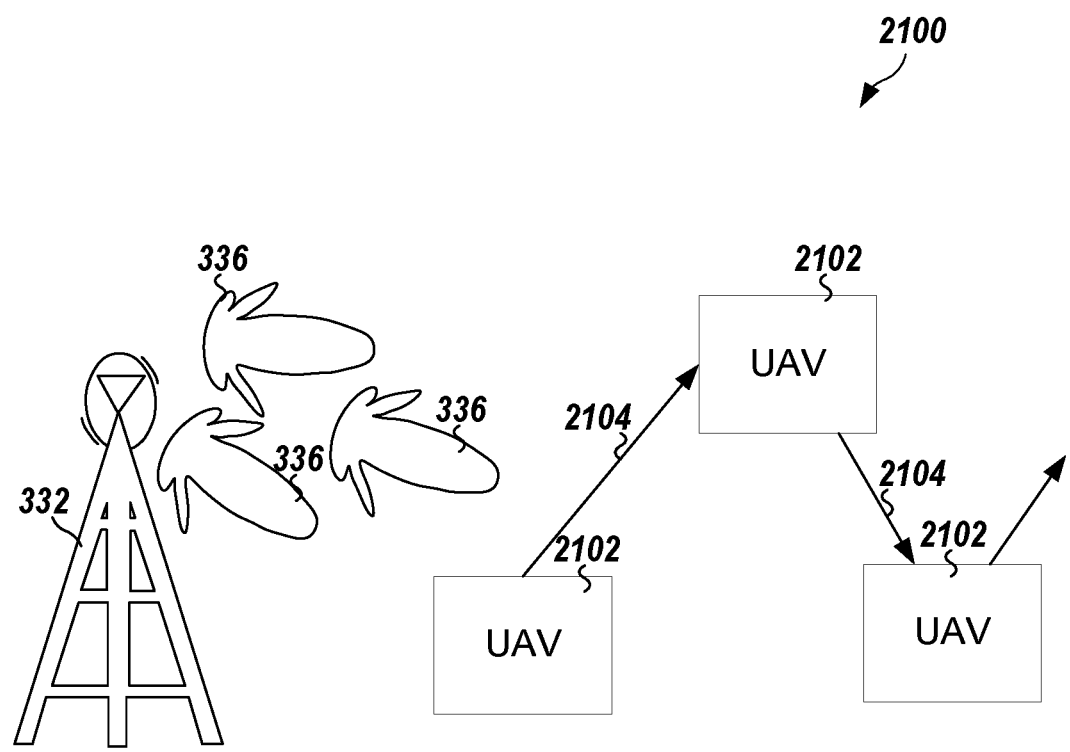
FIG. 21 illustrates, by way of example, a diagram of a system for BS beamforming transmissions based on the flight path information.

FIG. 21 illustrates, by way of example, a diagram of a system 2100 for BS 332 beamforming transmissions based on the flight path information 2006. The BS 332 can generate directed transmission patterns 336 towards an expected location of a UAV 2102. Arrows 2104 indicate UAV 2102 direction of travel. During the flight, the UAV 2102 can feedback CQI information (as in the existing cellular system) which can further refine the beamforming pattern such as digital beamforming pattern to serve the UAV 2102.

Another IM or HO action plan 2014 can include a more reactive approach than the proactive approach previously described. In the reactive IM or HO action plan 2014, the BS 332 can perform beamforming only in a dead zone region or some other region in which the signal strength is weak (below a specified threshold) based on the flight path information 2006 and the link quality map 2008. The beamforming can be based on channel reciprocity. The beamforming pattern can be inferred, by the BS 332, for the UE side. The BS 332 can trigger or schedule the UE to beamform towards the BS 332 along the flight path or in the dead zone region.

In some aspects, BSs 332 can coordinate with each other for enhanced or standard inter-cell interference coordination (eICIC/ICIC). In aspects BSs 332 can perform an ICIC/eICIC type of coordination to mitigate interference during the period of aerial UE traveling over the dead zone region. Given the link quality map 2008 BSs 332 can coordinate to mute or reduce transmission power during the period of UAV 2102 in the dead zone region, such as in a time-frequency resource block that can interfere with the UAV 2102.

The IM or HO action plan 2014 can include a BS 332 triggered HO. The BS 332 triggered HO has been traditionally used for traffic load balancing. In an aerial network, given the flight path information 2006, the BS 332 can trigger a HO to reduce HO failure, reduce a number of unnecessary HOs, or the like. What follows in a HO decision problem formulation followed by some HO techniques, such as can be used to generate the IM or HO action plan 2014. The problem formulation is presented with reference to FIG. 22.

Figure 22:
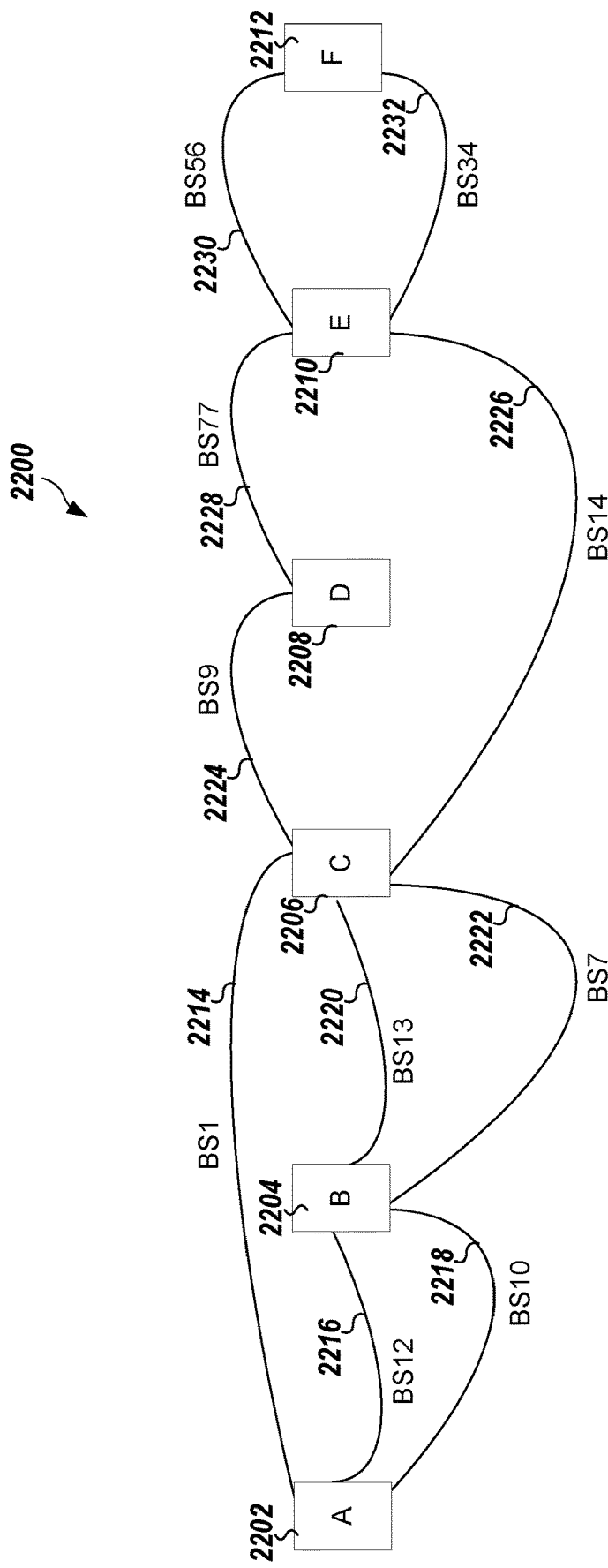
FIG. 22 illustrates, by way of example, a diagram of an aspect of a UAV flight path.

FIG. 22 illustrates, by way of example, a diagram of an aspect of a UAV flight path 2200. The flight path 2200 can include data from the flight path information 2006. The flight path 2200 as illustrated includes points 2202, 2204, 2206, 2208, 2210, and 2212 through which the UAV 2102 is expected to travel. The points 2202, 2204, 2206, 2208, 2210, and 2212 can include corresponding latitude, longitude, and elevation (or altitude). For each point 2202, 2204, 2206, 2208, 2210, 2212 a set of candidate BS 332 can be stored. Each BS 332 indicated can serve the UAV 2102 as it travels between the points 2202, 2204, 2206, 2208, 2210, and 2212 indicated. For example, consider a UAV 2102 travelling from the point 2202 to the point 2206. ABS set 2214 (BS1 in this example) can indicate which BSs can serve the UAV 2102 on its flight between those two points.

There are a variety of ways to form the candidate BS sets (e.g., BS set 2214, 2216, 2218, 2220, 2222, 2224, 2226, 2228, 2230, 2232). The BS sets can be formed based on data from the link quality map 2008. For any BS 332 whose signal quality or signal strength is above a pre-determined threshold (e.g., for a specified period of time) can be a candidate BS in the BS set. The BS sets indicate a 'feasible serving cell set'. A feasible cell can ensure that a duration of satisfactory signal quality is long enough to perform a HO, such as long enough for HO coordination between one or more BSs 332 and the UAV 2102.

As the UAV 2102 moves between the points 2202, 2204, 2206, 2208, 2210, and 2212, the feasible BS set can vary. Suppose the BS set changes at sample points B, C, D, E, and at no other points on the path. Then one can denote the sets as Set(A), Set(B), Set(E), where a BS in Set(A) are candidate BS for the UAV while it flies from point A to B, point A to point C. In the example of FIG. 22, Set(A)={BS1, BS10, BS12}, Set(B)={BS1, BS13, B57}, Set(C)={BS9, BS14}, Set(D)={BS14, BS77}, Set(E)={BS56, BS34}. A graph can be constructed (or defined in data) that indicates feasible set transition points as vertices and the candidate BS for traveling between two transition points as edges. The flight path 2200 provides an example of such a graph.

Based on the flight path, problems can be formulated (e.g., with different optimization objectives). What follows are some examples of possible HO handling techniques:

(a) trigger HO only when HO is necessary, and it is highly likely that HO can be successfully executed. Such a HO trigger condition can be energy efficient and impose less additional signaling overhead to the existing cellular system since it reduces unnecessary HO and HO failures. A necessary condition can indicate that the BS will trigger HO only when it can't serve the UAV any longer. The successful condition means that BS will trigger HO only when the chances of a successful HO is high (e.g., a probability for the current serving BS to successfully send the HO command and the UAV to successfully receive the HO completion command from the new serving BS is above a specified threshold (e.g., 60%, 70%, 75%, 80%, 85%, 90%, 95%, 97%, 98%, 99%, 100%, or some percentage therebetween).

(b) maximize the time duration with good link quality (e.g., SINR above certain threshold) for all selected BSs during HO transition period, such as to help ensure smooth and reliable handover.

(c) maximize time-to-stay for the new serving BS 332 after HO, such as to help ensure the new serving BS 332 can provide a longer period of service after the HO. procedure.

(d) minimize the number of HO along the flight path 2200 (e.g., finding a path with the smallest number of HOs to go from point A to point F in the example of FIG. 22).

(e) optimize some end-to-end metric along the flight path. For example, a weight can be assigned to each edge on the flight path 2200. A path with the minimum or maximum aggregated weight can then be determined. The weight on each edge can depend on a target end-to-end metric (e.g., the weight can be determined as a function of average SINR or data rate for each link). Problem formulation (d) can be viewed as a special case that minimizes sum of weight of an unweighted graph (all edges have the same weight).

What follows is a description of some possible HO techniques in which the BS 332 can trigger an HO. Assume, at the beginning (t=0), user (UE) is associated with the BS associated with a highest signal quality or signal strength and the BS can keep serving the UE (e.g., not attempting to trigger a UE to handover) if one or more of the following conditions are satisfied: BS to UE signal quality link is above certain threshold, (e.g., 1 dB better than the in-sync SINR condition); or 2) BS to UE link becomes worse than a certain threshold (e.g., 1 dB lower than the out-of-sync SINR condition), but the link quality is restored within a certain time window (e.g., becomes 1 dB better than in-sync again within a specified timer elapsing, such as 100 milliseconds, or more or less time). In aspects the in-sync and out-of-sync radio link indications can be the same as those specified in 3GPP TS 36.213 and TS 36.133. The definition of a T310 timer can be found in 3GPP TS 36.331. After timer expires, a radio link failure (RLF) can be declared.

In response to the BS 332 estimating that, with certain probability, the UE will experience radio link failure (becomes out-of-sync until the timer expires), the BS 332 can perform the following: (a) Initiate HO (only) if a probability of HO success is above a specified threshold. The specified threshold can indicate that the chance for current serving BS 332 to successfully send HO command to the UE and the UE to successfully receive HO completion command from the new serving BS is sufficiently likely; otherwise (b) Do nothing and the UE remains out-of-sync until the timer expires and then attempts to associate with the best BS 332 and re-establish the link.

Different techniques, such as depth-first (prioritizing a BS 332 that can serve the UE longer) search technique, can be used to find a best HO strategy based on HO key performance indicators (KPIs). Examples of HO KPIs include HO failure rate, RLF rate, number of HO attempts, duration of time the signal quality is below a threshold, number of ping-pong (HO back to a past serving BS while the last time being served by the same BS is shorter than certain duration apart), or the like.

Figure 23:
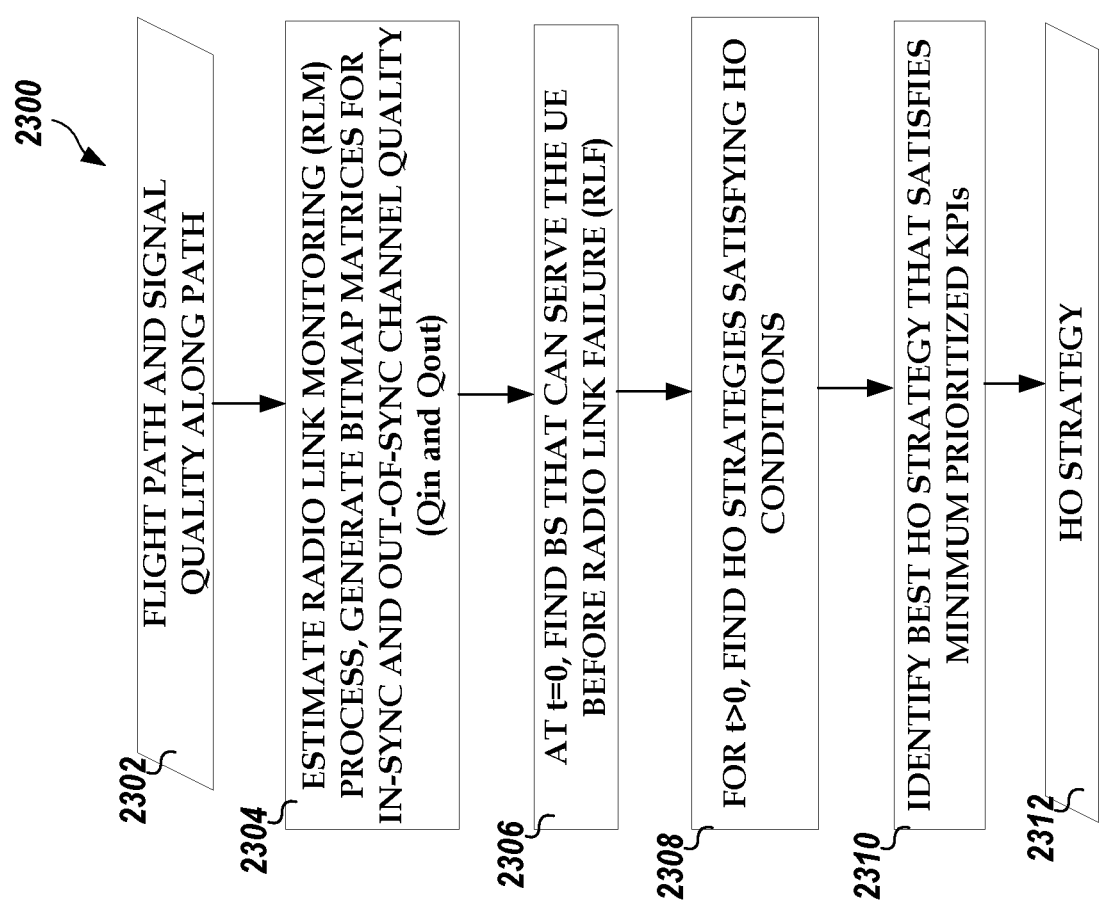
FIG. 23 illustrates, by way of example, a diagram of an aspect of a technique for identifying a best feasible HO strategy.

FIG. 23 illustrates, by way of example, a diagram of an aspect of a technique 2300 for identifying a best feasible HO strategy. The technique 2300 as illustrated includes receiving or retrieving flight path information and signal quality or signal strength data along a flight path, at operation 2302; estimating the observed signal quality of a radio link measurement (RLM) process (the process to monitor whether radio condition is in-sync or out-of-sync) over the flight path, generating bitmap matrices for in-sync and out-of-sync CQ, at operation 2304; find a BS that can serve the UE before RLF, at operation 2306; use a technique (e.g., greedy depth first search, or the like) to identify one or more IM or HO plans 2014 that satisfy HO KPIs, at operation 2308; identify, among identified IM or HO plans 2014, which satisfies the KPIs best, at operation 2310; and providing the identified IM or HO plan 2014 to the BS 332 or the UE, at operation 2312.

In some aspects, a greedy technique can be used to find a serving BS which has a longest time overlap with a current serving BS and still has sufficient link quality (SINR above certain threshold) during a minimal HO transition period. In some aspects, the greedy technique can be used to identify the new serving BS 332 that can provide the longest time-to-stay with sufficient link quality (SINR above certain threshold) after (successful) HO procedure. In some aspects, a technique, such as Dijkstra's algorithm, can be used to find out the best HO strategy. Dijkstra's algorithm is a shortest path first technique for finding the shortest path between nodes of a graph (as defined by the flight path information 2006 in the context of this application).

Tables 5 and 6 demonstrate the significant HO performance improvement using a route aware BS-triggered HO compared to a legacy event-triggered HO with different flight speed and height. Using a route-aware BS-triggered HO technique, HO failure can be eliminated and RLF rate can be reduced.

TABLE 5

Legacy Event Triggered HO

| RLF(#/UE/s) | 50 m | 100 m | 300 m |
|---|---|---|---|
| 3 km/h | 0.066 | 0.1 | 0.138 |
| 30 km/h | 0.18 | 0.191 | 0.2275 |
| 60 km/h | 0.192 | 0.1975 | 0.2695 |
| 160 km/h | 0.2435 | 0.2575 | 0.366 |

TABLE 6

Route-Aware BS-Triggered HO

| RLF(#/UE/s) | 50 m | 100 m | 300 m |
|---|---|---|---|
| 3 km/h | 0.0025 | 0.0225 | 0.02 |
| 30 km/h | 0.0105 | 0.1155 | 0.142 |
| 60 km/h | 0.0075 | 0.0875 | 0.199 |
| 160 km/h | 0.004 | 0.078 | 0.2765 |

In the current LTE and next generation 5G networks, HO is triggered by different network events. A HO can be triggered given the flight path. In a different flight region, the network can scale legacy event-triggered HO parameters such as time-to-trigger (TTT) and A3 (measurement reporting event) threshold for the UAV 2102 in different height and location. In aspects, a UE can perform a measurement report (MR) during an event-triggered HO. The MR can be based on an optimized white-list/black-list set for different flight regions. Given the flight path information 2006, the UE can be instructed for additional MR. For example, before entering a dead zone region (according to the link quality map 2008), the BS 332 can instruct the UE to send an MR that can help improve mobility management. The BS 332 can send a pre-configure report request to a UE specifying a signal-strength-based or 3D-position-based report trigger condition.

In aspects, the BS 332 can instruct the aerial UE to extend a timer when there is no critical message to the UE traveling in a poor coverage region. This can help avoid triggering radio link failure recovery. In aspects, the BS 332 can provide better guidance to an aerial UE (e.g., configure MeasObj(s) with a frequency and BS list based on route information).

Figure 24:
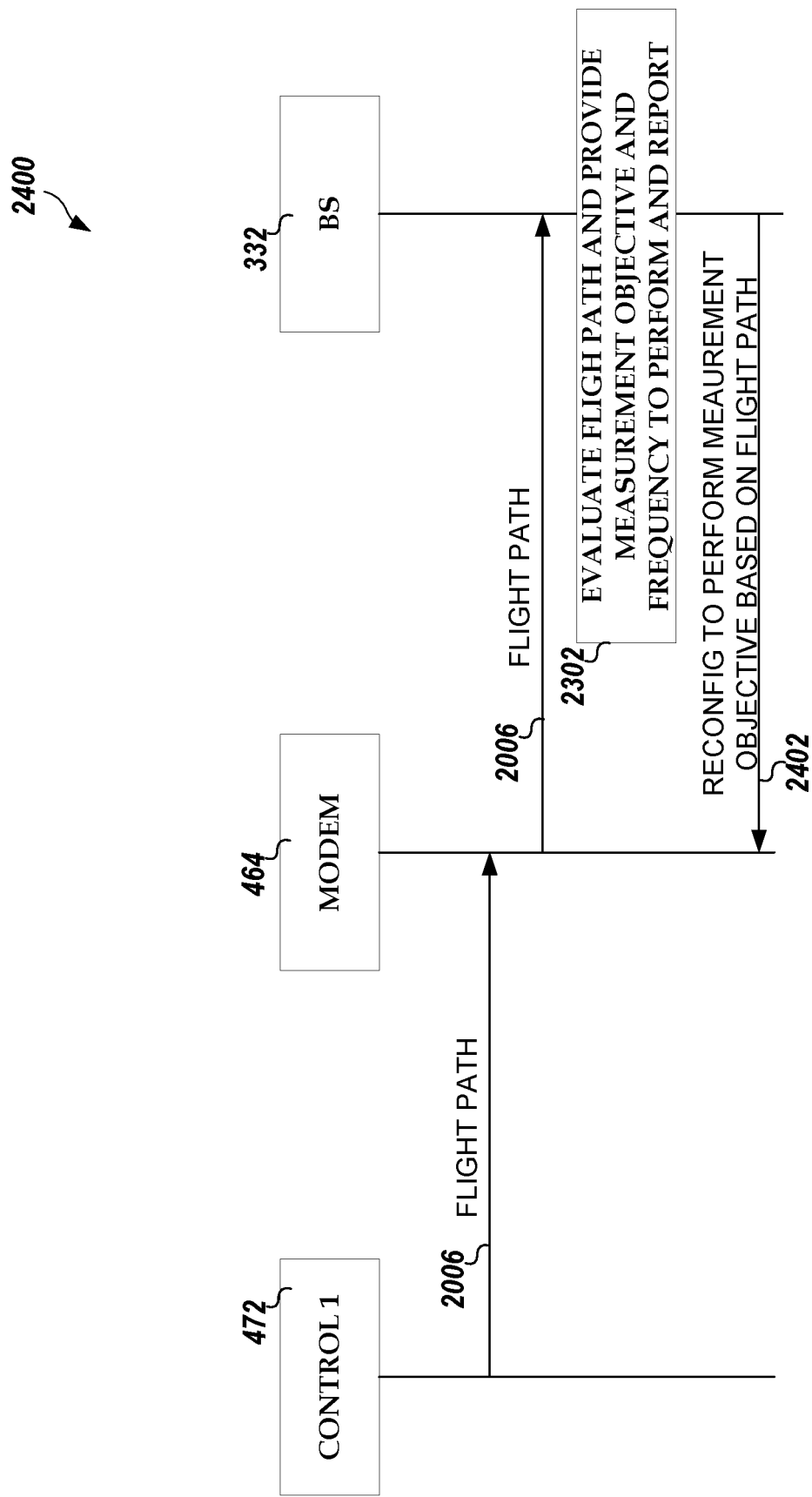
FIG. 24 illustrates, by way of example, a diagram of an aspect of a technique for providing improved guidance to the UE using measurement objectives.

FIG. 24 illustrates, by way of example, a diagram of an aspect of a technique 2400 for providing improved guidance to the UE using measurement objectives (MeasObj(s)). In FIG. 24, the first control circuitry 472, the modem 462, and the BS 332 communicate to improve HO or interference mitigation using measurement objectives. The first control circuitry 472 provides the flight path information 2006 to the modem 462 which forwards the flight path information 2006 to the BS 332. The BS evaluates the flight path information 2006 and provides a measurement objective and a corresponding frequency at which to perform the measurement objective, at operation 2302. The BS 332 provides a communication 2402 indicating a reconfiguration of a measurement objective or flight path based on the flight path information 2006. A reconfiguration of the measurement objective can include the frequency bands to be monitored, the MR triggering event and thresholds, the number of BS that should simultaneously satisfy the MR triggering conditions, etc.

In aspects, the flight path information 2006 can be user to configure conditional HO. In a conditional HO, the BS 332 can preconfigure an early MR triggering condition (with a lower relative threshold) based on the flight path information. The UE can transmit the MR to the BS 332 if the MR triggering condition is met. After receiving MR from the UE, the flight path information 2006 can help the BS 332 configure a conditional HO command (with a higher relative threshold). The flight path information 2006 can help the BS 332 better select the target BS to which the UE should HO. After receiving the conditional HO command, the UE can monitor the triggering condition with the higher threshold and perform HO directly to the target BS after the condition specified in conditional HO command is met.

In addition, or alternative, to HO enhancement, the flight path information 2006 can be used to enhance beam management. In aspects, the BS 332 can pre-configure a synchronization signal (SS)/physical broadcast channel (PBCH) block or a channel state information reference signal (CSI-RS) direction. The BS 332 can configure a transmission configuration indicator (TCI) state for beam management based on the flight path information 2006.

The IM and HO enhancements can be provided jointly. In these techniques, after applying IM, the interference mitigation engine 2016 can determine the link quality and send the link quality adjustment 2012 to the flight path link quality analysis engine 2010.

In aspects, to obtain the link quality update, the BS 332 can request the UE feedback CQI after IM enhancement. In aspects, the BS 332 can estimate the RSRP/CQI after applying IM enhancement such as ICIC/eICIC and beamforming. For example, the BS 332 can subtract interference from other cells if ICIC/eICIC is used or by applying the beamforming pattern to obtain the RSRP/CQI estimate. The link quality adjustment 2012 information can be sent to the link quality map construction engine 2004, such as to update the per-UE link quality map 2008. With the link quality adjustment 2012, the flight path link quality analysis engine 2010 can compute an updated IM or HO action plan 2014, either BS triggered HO or legacy event-triggered HO with optimized parameter selection as described.

Distributed UAV Navigation

Each unit in a UAV swarm can perform a decision procedure to position itself in air depending on the problem the swarm wants to solve together. This requires information exchange between UAVs. Even though each UAV producer can have its proprietary commanding format, the communication between UAVs from different producers has to be defined in order them to solve a problem together.

Aspects in this section regard efficient ways to exchange information among UAVs to decide on a location (relative to other UAVs). The techniques can include optimizing a general problem in a distributed and scalable manner under the assumption that problems can be factorized as functions of positions of a few UAVs in the system. A belief propagation approach is proposed to solve the joint problem along with example use cases in wireless communication. The communication overhead for each UAV is on the order of number of neighbor UAVs.

Aspects can reduce communication overhead required for collaboration of multiple UAVs. Aspects can make collaboration a matter of computation power.

Belief propagation has been empirically proven to be a robust way to solve optimization problems that can be factorized into smaller problems with fewer optimization parameters independent of the problem itself.

Let+ represent any associative and commutative binary operation with identity element. Let $-\alpha$ represent the inverse of $\alpha$ with respect to this operation. Let $\Sigma$ represent an n-ary version of this operation. Let max($\cdot$) denote either maximization or minimization. Let $x_i$ represent the location of UAVi$\in \{1, \ldots, N\}$. The optimization problem can take the form, $$\max_{x_1, \ldots, x_N} F(x_1, \ldots, x_N),$$

The optimization problem can also be written as $$\max_{x_1, \ldots, x_N} F(x_1, \ldots, x_N) = \max_{x_1, \ldots, x_N} \left( f_1(x_{i \in \Phi_1}) + f_2(x_{i \in \Phi_2}) + \ldots + f_K(x_{i \in \Phi_K}) \right)$$

where $\Phi_K \subseteq \{1, \ldots, N\} \forall k \in \{1, \ldots, K\}$.

Belief propagation can be applied to the problem by exchanging information between only UAVi and UAVj where i,j$\in \Phi_k \in \{1, \ldots K\}$ $\forall$(i,j). Note that, in the worst case, if $\exists \Phi_k = \{1, \ldots, N\}$, then the number of information exchange required is the order of the one required for a centralized approach.

Belief Propagation Summary

Figure 25:
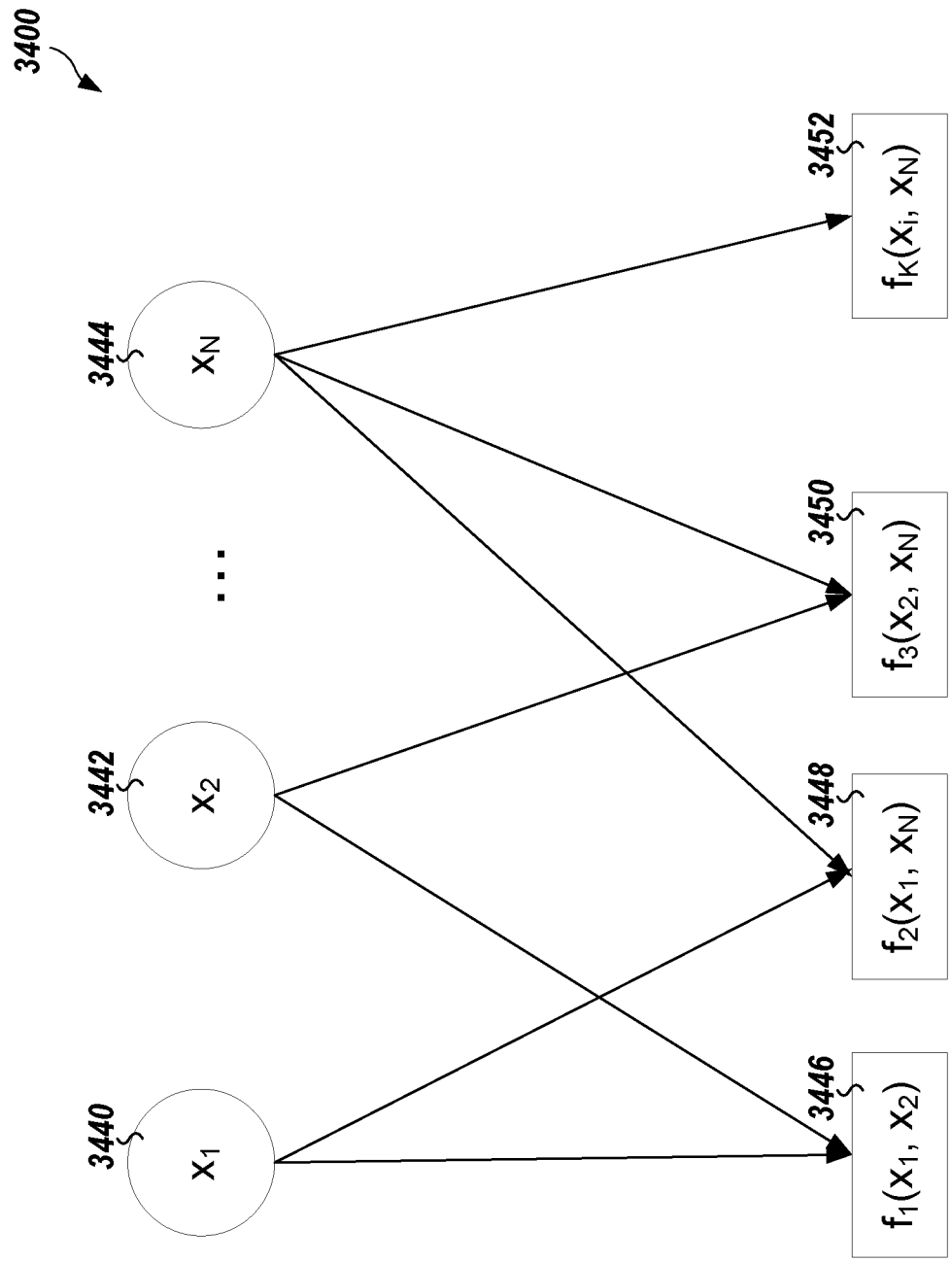
FIG. 25 illustrates, by way of example, a diagram of an aspect of a factor graph.

FIG. 25 illustrates, by way of example, a diagram of an aspect of a factor graph 3400. After factors and their parameters are determined, the factor graph 3400 can be formed. The factor graph 3400 as illustrated includes UAV positions 3440, 3442, 3444 and factors 3446, 3448, 3450, 3452.

Belief propagation can include determining a candidate set of positions for each UAV: $X_i = \{x_i^1, x_i^2, \ldots, x_i^{P_i}\}$ Belief propagation can include initializing variable messages, $\mu_{i \rightarrow k}^{t=0}(x_i^p)$, to identity element of the operation + for all p, for all k, and for all i$\in \Phi_k$.

Until convergence or maximum number of iterations:
(a) Update factor messages for iteration t:

$$\mu_{i \leftarrow k}^t(x_i^p) = \max_{x_{j \in \Phi_k \setminus \{i\}}} \left[ f_k(x_i^p, x_{j \in \Phi_k \setminus \{i\}}) + \sum_{j \in \Phi_k \setminus \{i\}} \mu_{j \rightarrow k}^{t-1}(x_j) \right]$$

(b) Update variable messages for iteration t:

$$\mu_{i \rightarrow k}^t(x_i) = \sum_{l: i \in \Phi_l, l \neq k} \mu_{i \leftarrow l}^t(x_i)$$

(c) Then find the positions locally:

$$\hat{x}_i = \operatorname*{argmax}_{x_i} \sum_{k: i \in \Phi_k} \mu_{i \leftarrow k}^t(x_i)$$

The following discussion regards an efficient information exchange protocol that can be used in some aspects. The efficient information exchange protocol can include a message update for each UAV, combining messages to send, and absorbing element handling. An absorbing element, when combined with any element of a set using an operation (e.g., +), returns the absorbing element. One simple example of an absorbing element is zero for an OR or multiplication operation.

Figure 26:
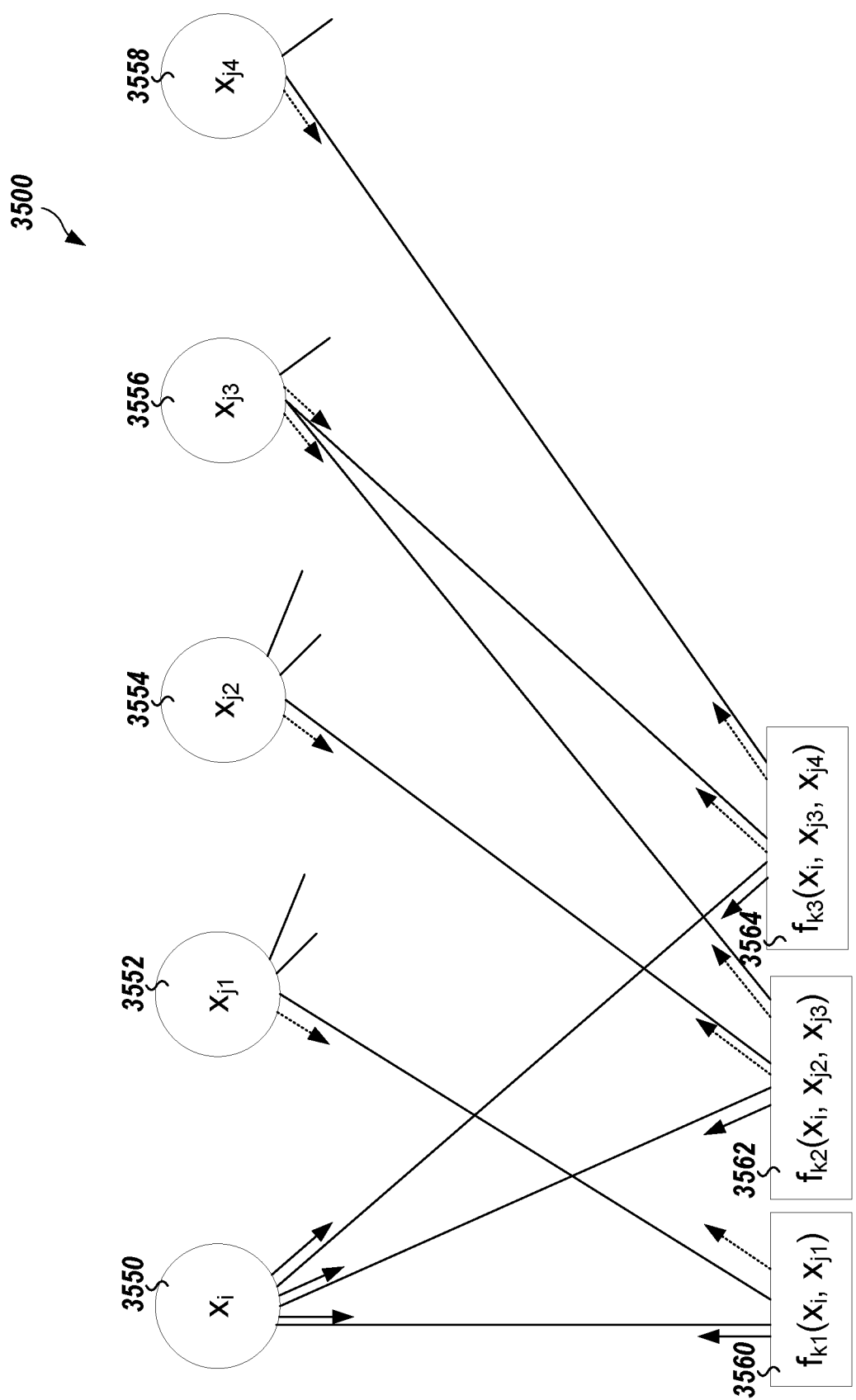
FIG. 26 illustrates, by way of example, a diagram of an aspect of a technique for a message update in a belief propagation-based message exchange.

FIG. 26 illustrates, by way of example, a diagram of an aspect of a technique 3500 for a message update in a belief propagation-based message exchange. The technique 3500 as illustrated includes UAV locations 3550, 3552, 3554, 3556, 3558, and factor messages 3560, 3562, 3564. The solid arrows originating at the UAV locations 3550, 3552, 3554, 3556, 3558 indicate variable messages calculated at the UAV corresponding to the location at a previous time. The dashed arrows originating at the UAV locations 3550, 3552, 3554, 3556, 3558 indicate variable messages received at the UAV corresponding to the location at a previous time. The solid arrows originating at the factor messages 3560, 3562, 3564 indicate factor messages that will be calculated at time t. The dashed arrows originating at the factor messages 3560, 3562, 3564 indicate factor messages that can be calculated at time t. The message update can be performed for each UAV in a swarm or other group.

Each UAV can provide its variable messages to other UAVs in a form explained below. At iteration t, UAVi can have access to $\mu_{j \rightarrow k}^{t-1}(x_j)$, $=j \in \Phi_k$, $\forall k: i \in \Phi_k$. Each UAV will calculate and store the factors $f_k(x_i, x_{j \in \Phi_k \setminus \{i\}})$, $\forall k: i \in \Phi_k$. Then they will be able to perform a single iteration of the technique described above.

In the second part of iteration t, instead of calculating and sending variable messages individually, UAVi can broadcast or multicast a single combined message given as $$\mu_i^t(x_i) = \sum_{k: i \in \Phi_k} \mu_{i \leftarrow k}^t(x_i)$$

Then in the next iteration, t+1, since UAVi will have the corresponding factor messages from previous iteration, $\mu_{j \leftarrow k}^t(x_j)$, along with received combined message from UAVj, $\mu_j^t(x_j)$, the UAVi can calculate an individual variable message from other UAVs as $$\mu_{j \rightarrow k}^t(x_j) = \mu_j^t(x_j) - \mu_{j \leftarrow k}^t(x_j)$$

The communication overhead will, therefore, not be determined by how many different factors there are in the graph but how many neighboring UAVs with which each UAV needs to exchange messages.

Absorbing Element Handling

In some cases, when certain UAVs have information about the environment, such as a "no-go zone" sometimes called a dead zone, the UAVs can use an absorbing element with respect to the operation +. In this case, however, the combined messages described above will be absorbed by this UAV and it will be hard to infer some variable messages. Therefore, when sending the combined message, a smaller portion of bits can be dedicated to the absorbing element indicator, meaning that there will be a few bits telling if the combined message has been absorbed or not by one of the factor messages. Then in the remaining bits the value of combined message will be sent if it is not absorbed. If it is absorbed, then the remaining bits will be dedicated to a new combined message when a single absorbing term is excluded from n-ary operation, so that all variable messages will be absorbed when there is more than one absorbing factor message. When there is a single absorbing factor message, a corresponding variable message can be unaffected by its factor message.

Consider the following implementation scenario summary. Let UAVi sense a need for information exchange and send UAVj($\forall j \in \Phi_k$) an initiation signal that contains the feasible set of future positions it wants to decide to go ($\{x_i^1, x_i^2, \ldots, x_i^{P_i}\}$) along with any other required information such as factor ID (k), all other UAV IDs for this factor ($\Phi_k$), factor function, and factor combining operation. Other UAVs in $\Phi_k$ can perform the same procedure. A fully connected subgraph can be formed for this factor. When a UAV has candidate positions for all UAVs related to this factor, that UAV can pre-calculate the factor function values.

Then the UAV can initialize a first variable message supposed to come from other UAVs without any further communication. The UAV can run the first iteration of the technique as described previously.

The UAV can form a combined message and broadcast or multicast it. After reception of each combined message the UAVs can infer the variable messages needed for the next iteration as described previously.

The UAVs can perform further iterations until a maximum number is reached or the messages converge. For example, each UAV can send "as previous" signal instead of combined messages when all individual factor messages are the same as the previous iteration. At any iteration, a UAV can choose to go to the corresponding position or wait for the technique to end.

Distributed UAV Navigation—Message Passing Initiation and Update

Unmanned aerial vehicles (UAV), or UAVs, can be part of a future for making the world a better place. The UAVs can help people in various tasks such as wireless relaying, image generation or processing, sensing, or the like. UAVs of lower-power and usually smaller-size can benefit from performing operations in a distributed manner across multiple UAVs. This distributed solution of UAVs can help solve bigger problems and sometimes they are more desirable compared to small number of larger UAVs. For example, a denser deployment of UAVs as access points (APs) increases the coverage for higher frequencies. However, controlling multiple UAVs involves challenges when the fleet is solving a common problem. This compounded when the size of the fleet is relatively larger and the area it is spread over is also relatively large. In this case, the problems that the fleet is trying to solve are usually a collection of multiple problems, each depending on a position of a subset of UAVs. However, there cannot always be a subgroup leader to decide on position of each UAV in the subgroup. This is due, at least in part, because one UAV can be part of multiple subgroups focusing on multiple problems at the same time. For that reason, an enabling framework for a decentralized decision process solving a common problem is desired. Further, the UAVs in the fleet can come from different manufacturers and operate on various communication protocols. A universal protocol can help these UAVs to initiate a collaboration effort.

This section describes communication protocols to initiate and update collaboration between UAVs in a decentralized manner. A well-studied technique that works on sparsely connected networks is belief propagation which is discussed previously. The protocol described, therefore, can include the initial information exchange for a message passing technique to run and update order of this information. The protocols assume that a need for collaboration can be sensed by any of the UAVs or by an external device (any device that will not collaborate) in the network. The protocols further assume that there is an end-to-end connection between each pair of UAVs in the subgroup either in the form of device-to-device (D2D) links, via a multi-hop relay chain, or via the network of UAVs.

A centralized approach does not scale well with the number of UAVs in the system. The complexity can be exponential as UAVs are added.

This disclosure describes the protocol needed to initiate and update the collaboration between UAVs in decentralized manner, such as to optimize a common problem to be solved by multiple UAVs. It is assumed that the problem can be factorized as functions of positions of a few UAVs in the system as previously discussed. Further, it is assumed that a belief propagation technique can solve the joint problem. The communication overhead is in the order of number of neighboring UAVs of each UAV.

The protocols described will not only improve steering of UAVs but also provide a common ground for UAV manufacturers to join the environment without disturbing the performance of existing devices. The protocol can reduce communication overhead required for collaboration of multiple UAVs and it will make collaboration a matter of computation power.

A UAV steering problem can be challenging when the location choice of the UAV affects multiple factors (other UAVs performing their assigned operations, interference with other operations, or the like) in the system. For example, when a UAV is serving as a wireless relay node for multiple mobile UEs, it might need to readjust its position to give opportunity to both UEs to get a reliable connection by changing its position. When multiple UAVs are serving as wireless relay nodes for multiple mobile UEs, then it is harder to solve the problem jointly in a central node because the communication overhead (in the order of total number of UAVs) might not be feasible and even computation complexity might grow exponentially with number of UAVs depending on the solution.

However, belief propagation has been empirically proven to be a robust way to solve optimization problems given that the joint problem can be factorized into smaller problems with fewer optimization parameters independent of the problem itself. Belief propagation requires local message exchange (message exchange with UAVs in communication range). The protocol provides a handshake protocol to form a factor among collaborating UAVs. It also describes a general framework for a belief propagation technique to operate.

Figure 27:
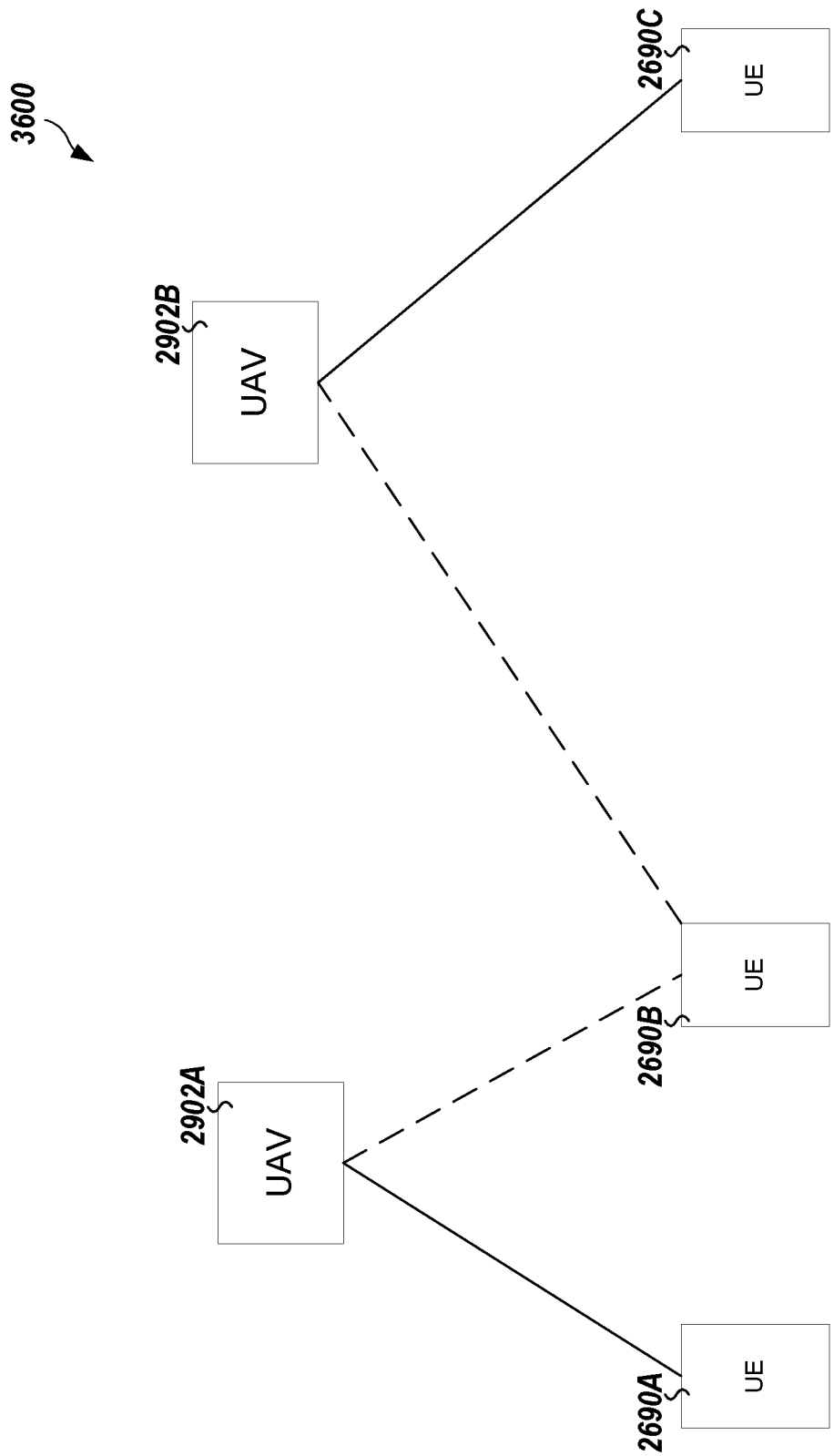
FIG. 27 illustrates, by way of example, a diagram of an aspect of a system for UAVs as APs.

FIG. 27 illustrates, by way of example, a diagram of an aspect of a system 3600 for UAVs as APs. The system 3600 as illustrated includes multiple UAVs 2902A, 2902B and UEs 2690A, 2690B, 2690C. Assume that the UAVs 2902A, 2902B position themselves in a way that DL data rates as a sum of all users is to be maximized. Further assume that the UE 2690A is served by the UAV 2902A and the UE 2690C is served by the UAV 2902B. However, the association of the UE 2690B to any of the UAVs 2902A, 2902B is a part of the optimization problem.

Ignoring the interference, the weighted-sum utility function in this example can be given as:

$$U = \sum_{i \in \{A,B,C\}} U_i = \sum_{i \in \{A,B,C\}} w_i \log_2(1 + SNR_i)$$

where $U_i$ is the utility, $w_i$, is the weight, and $SNR_i$, is the SNR of useri, which can be modelled as:

$$SNR_A = \frac{P_1 \times c \times d_{1A}^2}{N_A}$$

$$SNR_B = \frac{c}{N_B} \max(P_1 \times d_{1B}^2, P_2 \times d_{2B}^2)$$

$$SNR_C = \frac{P_2 \times c \times d_{2C}^2}{N_C}$$

where $P_j$ is the transmit power of UAVj, $N_i$ is the noise power at useri, $d_{ji}$ is the distance between UAVj and useri, and c is a constant. The utility functions are the factors the network is attempting to optimize. As seen in the utility functions, utility of the UE 2690A depends on a location of the UAV 2902A only and utility of the UE 2690C depends on a location of the UAV 2902B only. However, the utility of the UE 2690B depends on a location of both UAVs 2902A, 2902B.

The UAV 2902A and UAV 2902B can determine a set of locations to which they can respectively move and share this set of location points with each other. After sharing these, the UAV 2902A can calculate a utility of the UEs 2690A and 2690B, and the UAV 2902B can calculate utility of the UEs 2690B and 2690C as functions of locations of the UAVs 2902A, 2902B. Then, instead of sharing the unknown utilities (of UE 2690A and UE 2690C) with each other. The UAVs can share the summation of utilities ($U_A + U_B$ and $U_B + U_C$, respectively) with each other. Since the UAVs 2902A, 2902B both know the utility of the UE 2690B, the individual utilities can be determined. The communication overhead does not change whether they share the utilities of individual UEs 2690A, 2690B or the summation in this example; however, the overhead of sharing the summation will not increase as the number of UEs 2690 increases.

For this example, to work, both UAVs 2902A, 2902B understand that a user whose utility depends on locations of both UAVs 2902A, 2902B. With a random access scheme or with the help of a nearby infrastructure, one of the UAVs 2902A, 2902B can initiate factor information sharing with the other UAV 2902B, 2902A. Assume a BS assigned the UAV 2902A service of the UE 2690B, in response to the UE 2690B being detected by a sensor, discovery UAV, the UAV 2902A was the first UAV to notice the UE 2690B, or the UAV 2902A has acted earlier than the UAV 2902B in initiating an information exchange with the UE 2690B. Then the UAV 2902A can assign a factor ID for the UE 2690B and send this factor ID along with its own network ID and the network ID of the UAV 2902V to the UAV 2902B. The UAV 2902A can further send the list of locations it can support. The UAV 2902B can respond to the UAV 2902A with its own locations that it can support. Note that the UAV 2902B can use the network ID of the UAV 2902A and the factor ID assigned by the UAV 2902A to uniquely identify this factor.

In a case of more than two UAVs collaborating on a factor (sharing serving duties of a UE), then the order of responding can follow a list of UAVs determined by the first UAV initiating this procedure.

In addition to the information described, the UAVs 2902A, 2902B can also exchange their measurements (if any, such as signal strength, signal quality, SINR, or the like) about the UE 2690B in order to improve their estimation of channel quality in near future.

What is described next is the factor initiation (sharing which UEs 2690 the UAVs 2902 have in common) and factor update (informing other UAVs 2902 when there is a new UE 2690 for which servicing will be shared or an older UE 2690 for which serving is no longer shared) between UAVs 2902. The factor update can be determined using a belief propagation technique described above and summarized again below.

A summary of a belief propagation technique is described for convenient reference. Let+ represent any associative and commutative binary operation with identity element. Let $-\alpha$ represent the inverse of $\alpha$ with respect to this operation. Let $\Sigma$ represent n-ary version of this operation. Let max($\cdot$) donate either maximization or minimization. Let $x_i$ represent the location of UAVi$\in \{1, \ldots, N\}$. Let the optimization problem be given in the form $$\max_{x_1, \ldots, x_N} F(x_1, \ldots, x_N).$$

This optimization problem can also be written as $$\max_{x_1, \ldots, x_N} F(x_1, \ldots, x_N) = \max_{x_1, \ldots, x_N} \left( f_1(x_{i \in \Phi_1}) + f_2(x_{i \in \Phi_2}) + \ldots + f_K(x_{i \in \Phi_K}) \right)$$

where $\Phi k \subseteq \{1, \ldots, N\} \forall k \in \{1, \ldots, K\}$, then a belief propagation technique can be applied to the problem by exchanging information between only UAVi and UAVj where i,j$\in \Phi_k \exists k \in \{1, \ldots, K\}$, $\forall (i,j)$. Note that, in the worst case, if $\exists \Phi_k = \{1, \ldots, N\}$, then the number of information exchange required is the order of that required for a centralized approach.

Since there does not have to be a centralized controller, not all factors need to be known by any of the UAVs 2902. It is enough for UAVs 2902 to know which factors they are affecting by choice of their locations. A handshake protocol between UAVs 2902 who are affecting the same factor can be performed so that they can pass messages about their beliefs for best positions by combining the feedback they receive from other factors. Aspects can focus on a handshaking protocol in which UAVs 2902 exchange parameters. Aspects also indicate how to update these parameters to keep the belief propagation technique operating accurately or consistently.

The handshake protocol can include a peer-to-peer (P2P) connection check. Either periodically or an on-demand basis, a UAV 2902 can initiate a P2P connection between pairs of any set of UAVs in the network. The initiator UAV, UAV0, can broadcasts (or unicasts individually based on the nature of the link) a list of IDs of this specific set of UAVs, and in the order of this list, UAVs can answer back with another broadcast (or unicasts) message containing the connection status of the link between the UAVs that had already sent its message. An illustration of this protocol can be found in FIG. 28.

Figure 28:
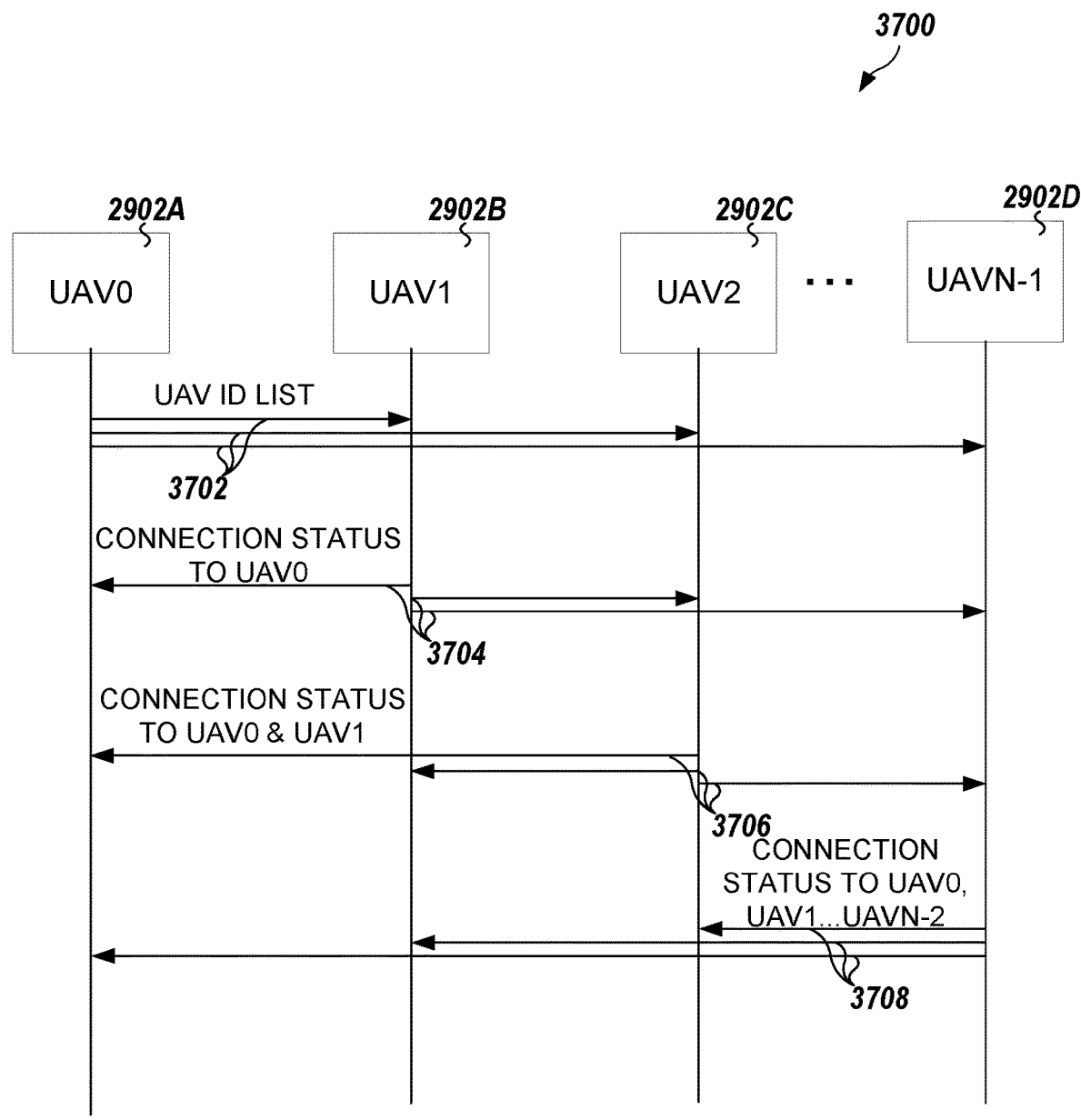
FIG. 28 illustrates, by way of example, a diagram of an aspect of an initiation technique for collaboration among UAVs.

FIG. 28 illustrates, by way of example, a diagram of an aspect of an initiation technique 3700 for collaboration among UAVs 2902. The technique as illustrated includes an initiating UAV 2902A broadcasting or unicasting a UAV ID list 3702 to each of the UAVs in the list (besides the initiating UAV 2902A). In the example of FIG. 28, the UAVs 2902B, 2902C, 2902D are assumed to be on the UAV ID list 3702 and in order. Then UAV1 2902B can broadcast or unicast its connection status to UAV0 2902A to other UAVs in the collaboration, in a connection status communication 3704. Then UAV2 2902C can broadcast or unicast its connection status to UAV0 2902A and UAV1 2902B to other UAVs in the collaboration, in a connection status communication 3706. The process can continue until the last UAVN-1 2902D broadcasts or unicasts its connection status to all other UAVs in the collaboration to all other UAVs in the collaboration, in a connection status communication 3708.

Factor formation can depend on capabilities of UAVs in the collaboration. The factor formation can be either local or network assisted.

Figure 29:
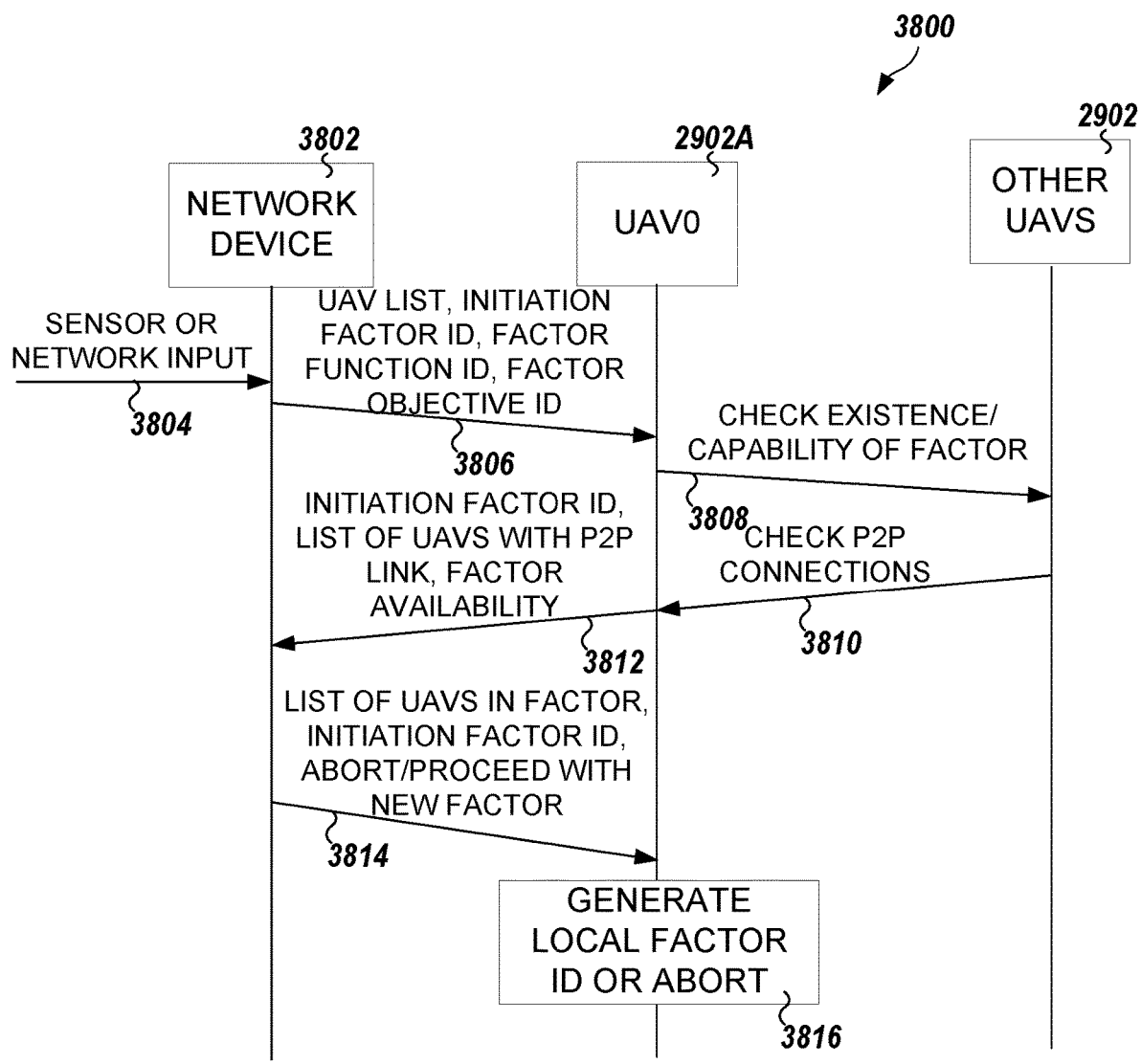
FIG. 29 illustrates, by way of example, a diagram of an aspect of a technique for collaboration initiation among UAVs.

In a network-assisted case, a device in the network can sense or take command from the network a need for factor formation. Then device can transmit a packet to one of the UAVs 2902 that are expected to collaborate. The packet can include a list of UAVs that are expected to collaborate (in the form of an internet protocol (IP) address, medium access control (MAC), or another value that can uniquely identify the UAVs), an initiator factor ID (an ID unique for the initiator network device), and a symbolic representation of the factor as a function of positions of the UAVs collaborating, along with a list of local measurements that can affect the factor. The packet can include a factor objective ID field that can globally describe the objective of the factor formation that can be used to check for the existence of such a factor. At this point the factor is identifiable to a candidate UAV0 2902A using an ID associated with the initiator, such as a MAC, IP address, or radio link control (RLC) ID. Then the UAV0 2902A can make sure that it has P2P connections with the UAVs in the list by either initiating a P2P connection check protocol or based on recent connection checks. If the UAV0 2902A cannot form a connection with any of the UAVs, then it can provide the initiator device with a list indicating UAVs to which it can or cannot connect. The UAV0 can inform the initiator device whether it can or cannot carry out the factor optimization requested. If the UAV0 2902A is already in a collaboration with other UAVs on a factor. In that case, the UAV0 2902A can inform the initiator network device with the availability of the factor and the list of collaborating UAVs. If the UAV0 2902A sends an updated list, then the initiator will either send an updated factor or cancel the factor formation. If UAV0 2902A indicates that there is an existing factor with a list of UAV participants, then the initiator device can either abort and form a new factor or ask to form the factor with a new set of UAVs. If the initiator device indicates to move forward with the factor formation, and there was no existing factor, then the UAV 2902A can create another ID that makes the factor identifiable to itself. This ID can inform other UAVs, so that connection between initiator and UAV and the connection between UAV and other UAVs can be carried out on different layers of the network. The UAV 2902A can also form the UAV ID list 3702 by putting itself in the beginning of the list so that a factor will be identifiable with the ID of UAV0 2902A and local factor ID decided by UAV0 2902A. If the initiator device indicates to move forward with the factor formation and there was an existing UAV factor, then the UAV0 2902A can initiate a factor update depending on its role in that factor collaboration. This protocol is depicted in FIG. 29. In case that the initiator cannot get a positive response from the UAV or it does not like the new set of UAVs that can collaborate, then it can initiate factor formation with another UAV.

FIG. 29 illustrates, by way of example, a diagram of an aspect of a technique 3800 for collaboration initiation among UAVs. The technique 3800 as illustrated includes communications received at, or produced by, a network device 3802, the UAV0 2902A, and other UAVs 2902 of the collaboration. The network device 3802 can include a BS 332, a network gateway, or the like. The network device 3802 can receive a sensor or network input 3804. The input 3804 can be a request to form a factor, a sensor measurement, or the like. The network device 3802 can issue a communication 3806 to the UAV0 2902A to perform the factor formation. The communication 3806 can include a UAV list of UAV IDs to be used in the factor, an initiation factor ID, a factor function ID, and a factor objective ID.

The UAV0 2902A can issue a communication 3808 to other UAVs 2902 to check for existence of a factor or capabilities of the factor. The other UAVs 2902 to be used in the factor can issue a communication 3810 to the UAV0 2902A (or vice versa) to check a P2P connection between the UAVs. The UAV0 2902A can tabulate results of the P2P connection check and provide the results in a communication 3812 to the network device 3802. The communication 3812 can indicate the initiation factor ID (from the communication 3806), the list of UAVs with or without sufficient P2P link, and factor availability. The network device 3802 can then issue a communication 3814 either indicating to proceed with the factor formation or abort the factor formation. The communication can indicate the initiation factor ID and a list of UAVs to be used in the factor. The UAV0 2902A can then generate a local factor ID or abort the factor accordingly at operation 3816.

Figure 30:
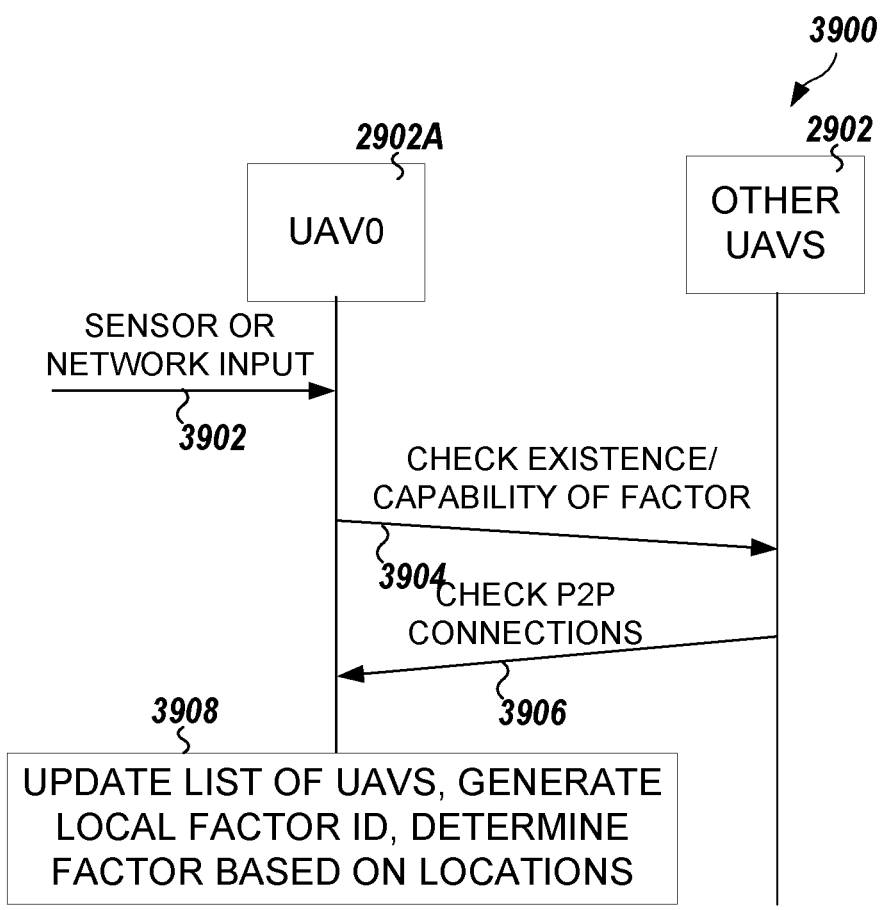
FIG. 30 illustrates, by way of example, a diagram of an aspect of a technique for collaboration initiation among UAVs without the network device.

FIG. 30 illustrates, by way of example, a diagram of an aspect of a technique 3900 for collaboration initiation among UAVs without the network device 3802. The UAV0 2902A can receive a sensor or network input 3902. The input 3902 can be a request to form a factor, a sensor measurement, or the like. The UAV0 2902A can issue a communication 3904 to other UAVs 2902 to check for existence of a factor or capabilities of the factor. The other UAVs 2902 to be used in the factor can issue a communication 3906 to the UAV0 2902A (or vice versa) to check a P2P connection between the UAVs. If the UAV0 2902A has the capability to sense and form a factor locally, then the UAV0 2902A can indicating list of UAVs, local factor ID, and symbolic representation of the factor in a communication at operation 3908.

After a UAV has the information required for factor formation, the UAV 2902 can either broadcast or multicast to the UAVs which are expected to collaborate, or it can unicast separately depending on the nature of communication. The UAV can provide a list of candidate locations it can move towards. Then based on the order in the list provided, each UAV can broadcast, multicast, or unicast a list of UAVs they can communicate with, list of locations they can move to, an indication for capability of translating symbolic factor representation to function values, or updated measurements relevant to the factor.

Note that broadcasting provides communication overhead in the order of number of UAVs in the subgroup, whereas separate unicasting can increase the order to the square of number of UAVs in the subgroup. However, unicasting can provide a capability of operating on different layers. Then UAV0 2902A can finalize the collaboration decision given the connectivity of the UAVs either internally or with the help of the initiator network device 3802. The UAV0 2902A can then provide a finalized list of UAVs along with updated factor function and an optional hash value (e.g., CRC)

generated by calculation of factor function at the list of candidate locations in order to validate all UAVs have calculated the same values for the factor function. If there are any UAVs that need calculated function values, the UAV0 can broadcast this information separately.

Figure 31:
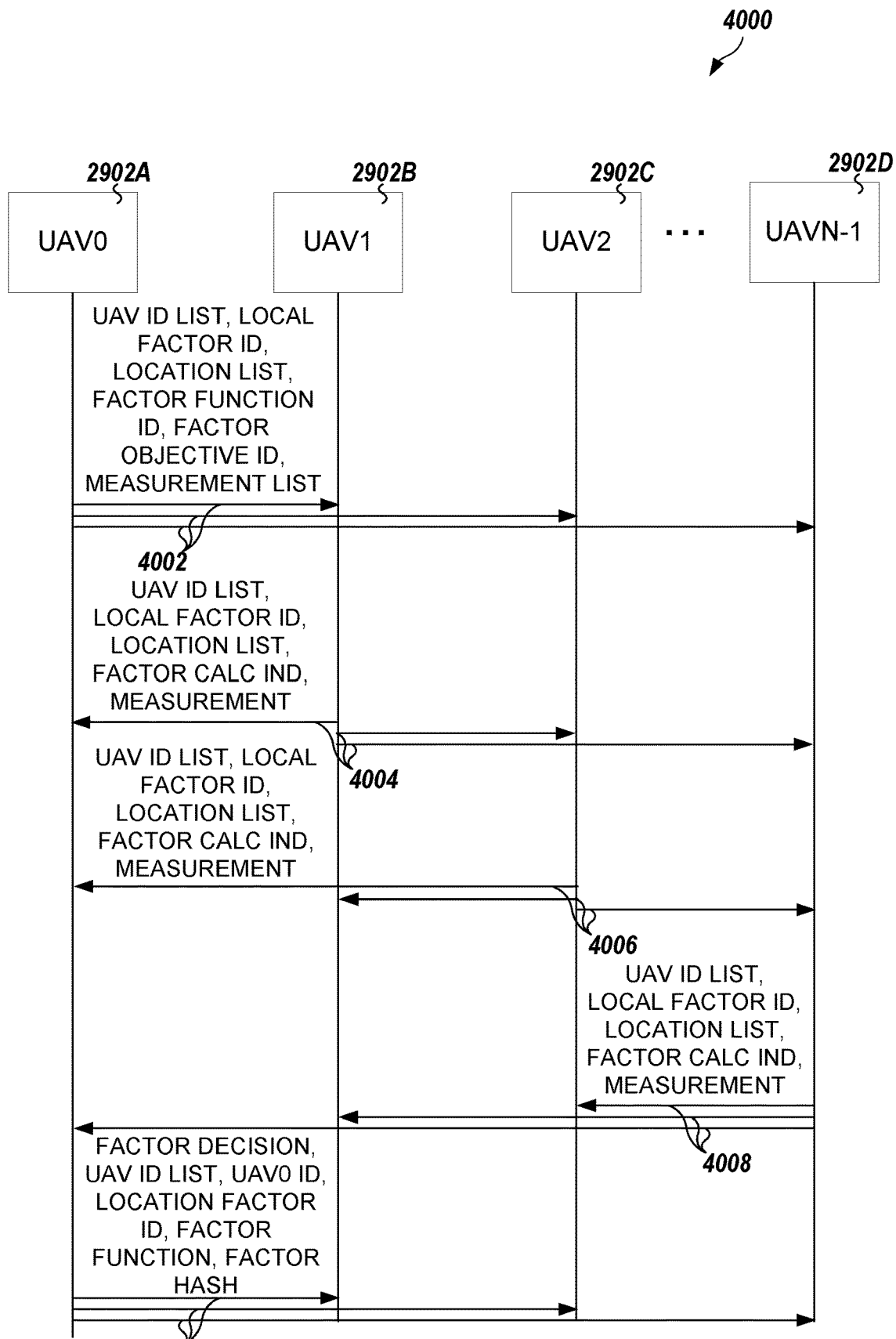
FIG. 31 illustrates, by way of example, a diagram of an aspect of a technique for factor initialization.

FIG. 31 illustrates, by way of example, a diagram of an aspect of a technique 4000 for factor initialization. The technique as illustrated includes communications between the UAVs 2902A-2902D. The UAV0 2902A can issue a communication 4002 indicating a UAV ID list, a local factor ID, a location list (of its potential locations), a factor function ID, a factor objective ID, or a measurement list (indicating measurements to be performed during the collaboration). Then each UAV, in an order indicated by the UAV ID list, can respond to indicate its location list, factor calculation indication, or a measurement. The communications 4004, 4006, 4008 are from the UAVs 2902B, 2902C, 2902D in order, and include that information plus optional UAV ID list, and a local factor ID. The UAV ID list or the local factor ID can indicate to which factor the calculations or measurements correspond. The UAV0 2902A can issue a communication 4010 indicating a factor decision (proceed or abort), a final UAV ID list, the UAV0 ID, the location factor ID, a factor function, or a factor hash value.

The UAV ID list can include a list of IDs (e.g., MAC address, IP address, service set identifier (SSID), or the like), depending on the layer on which the protocol is implemented. When the UAV0 2902A is transmitting, this list can include IDs of all UAVs, when any other UAV in the collaboration is transmitting the UAV ID list, the ID of UAV0 and the ID of transmitting UAV can be the only IDs in the UAV ID list.

The local factor ID is the factor ID assigned by UAV0. The location list includes possible locations to which UAVj can move in the near future. If there is no location provided by UAVj, that can mean UAVj is refusing to collaborate because it cannot perform the desired operation. If there is only one location provided, then UAVj can perform the desired operation but it cannot adjust its position based on the collaboration.

The factor function ID is an enumeration representation of a function which is mapping the location information to a utility from a set of supported functions that are (possibly) known by all UAVs. If a UAV does not support a function initiated by UAV0, then that UAV can indicate that it is not capable of computing the utility.

The factor objective ID provides additional information that will help UAVs uniquely identify the objective of the factor formation among possible objectives. For example, in case of rate improvement, the factor faction ID can be the rate of a user as a function of location of UAVs and the factor objective ID can be the MAC address of this user. This can be used to update an existing factor and to prevent additional factors from being formed about the same UE in the future by other initiator network devices.

A factor calculation indicator indicates whether the UAVj is capable (or not) of calculating a described factor function. If not, then that UAVj can wait for UAV0 to calculate and share the result after a location list of all UAVs have been shared by UAV0.

The measurement is a measurement available to UAVj about the collaboration. The factor function indicates calculated values of the factor function at the candidate locations. This is optional as not all UAVs are capable of calculating the function.

Factor hash can include a cyclic-redundancy-check (CRC) or the like calculated based on factor function values.

Abort factor indicates the factor formation is not needed anymore or unnecessary given set of possible locations of each UAV. The factor formation can be aborted at any stage.

Figure 32:
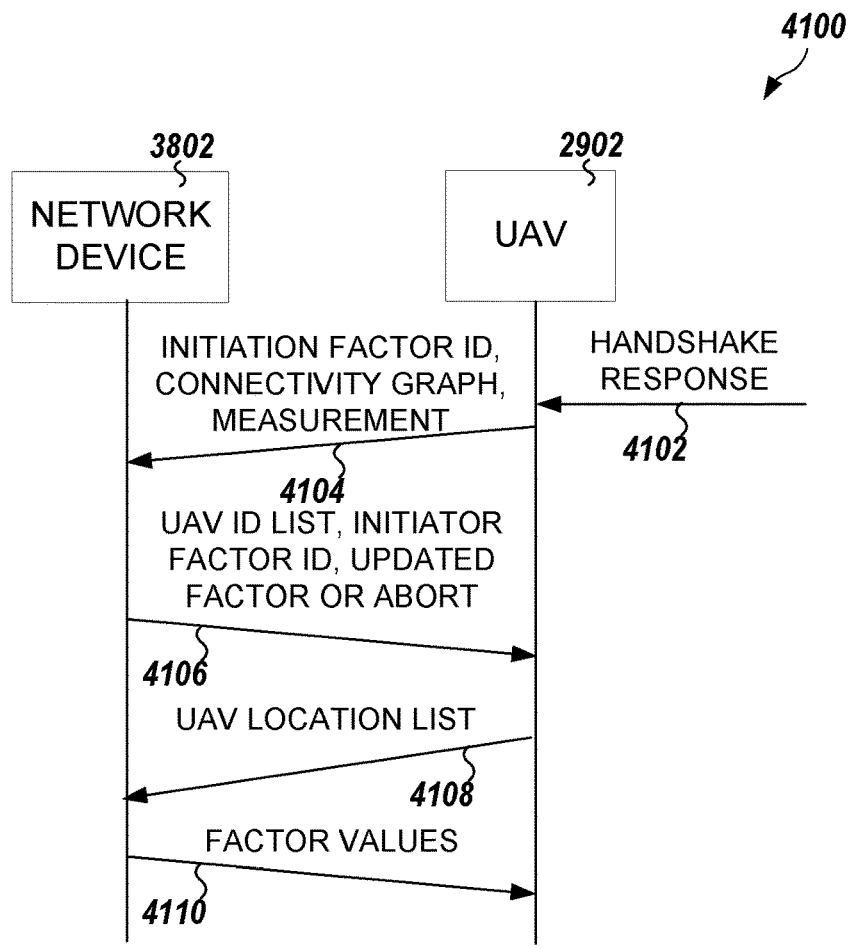
FIG. 32 illustrates, by way of example, a diagram of an aspect of a technique for factor confirmation for network-assisted initiation.

The collaboration handshake protocol can be followed by factor value confirmation protocol. FIG. 32 illustrates, by way of example, a diagram of an aspect of a technique 4100 for factor confirmation for network-assisted initiation. As mentioned earlier, if UAV0 2902A had started handshake procedure with the help of a network device 3802, then it might benefit from assistance when confirming the factors. If this is the case, then UAV0 2902A can either form a connectivity matrix for each UAV pair and send it to the initiator (the network device 3802) or directly send the connectable list of UAVs for each UAV to the initiator to form the matrix. The UAV0 2902A can, additionally or alternatively, send any relevant and updated measurements to the initiator. If the factor formation is not necessary under new connectivity information, then the initiator can issue an abort factor communication. If it is possible to form a new factor, then the initiator can update the list and/or the factor and send it to UAV0 2902A. If UAV0 2902A is not capable of translating symbolic representation of factor to function values, then it can ask for the calculated values from the initiator at this confirmation stage by sending all candidate positions of all UAVs that are in the factor.

A UAV 2902 can receive a handshake response communication 4102, such as from an initiator UAV 2902A. The UAV 2902 can issue a communication 4104 to the network device 3802. The communication 4104 can indicate an initiation factor ID, a connectivity graph (indicating P2P connections between UAVs), or a measurement. The network device 3802 can issue a communication 4106 to the UAV 2902. The communication 4106 can indicate a UAV ID list, an initiator factor ID, or whether the communication 4106 regards an update to a factor or to abort the factor.

The UAV 2902 can provide a UAV location list in a communication 4108 (such as if the UAV 2902 is incapable of determining the factor values). The network device 3802 can determine the factor values and provide them in a communication 4110 to the UAV 2902.

After a couple of iterations using the belief propagation technique, such as when the locations of UAVs 2902 do not change any further (which is detectable by UAV0), the UAV0 2902A can initiate collaborator handshake again in order to let participating UAVs to update their candidate location sets.

Figure 33:
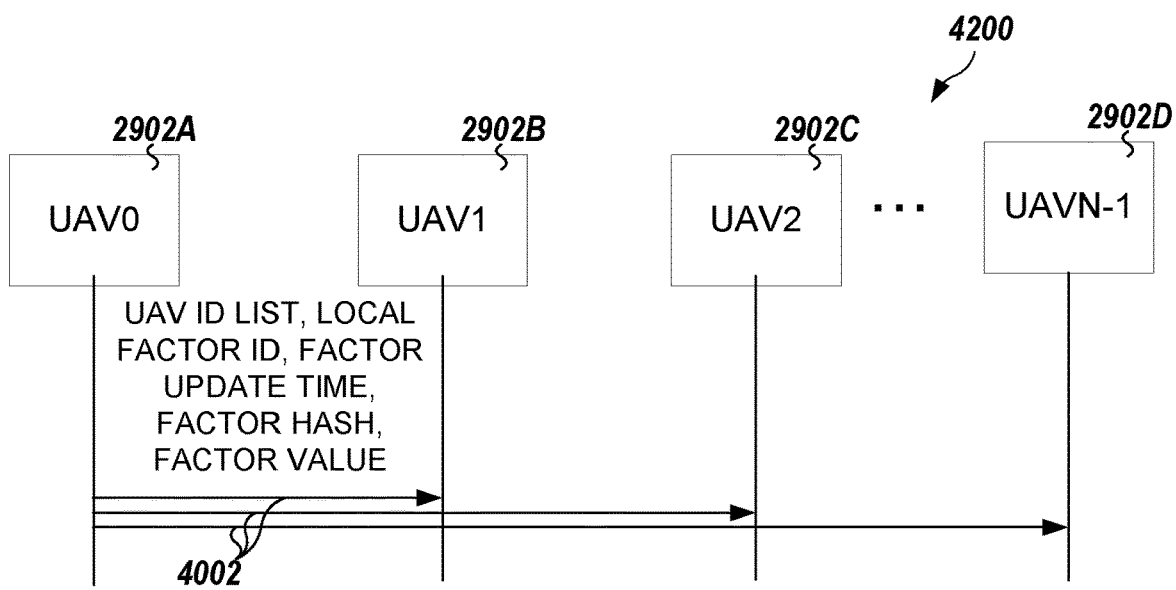
FIG. 33 illustrates, by way of example, a diagram of an aspect of a technique or a factor value update.

FIG. 33 illustrates, by way of example, a diagram of an aspect of a technique 4200 for a factor value update. Depending on the measurements collected and shared between UAVs, UAV0 2902a can initiate a recalculation of the factor function at each UAV. For example, in case of wireless coverage problem, the movement of a UA can change the SNR estimates on the links between the UEs and UAVs. However, the change in the factor value can be simultaneous among all collaborating UAVs. The UAV0 2902A can determine a time (iteration number) to let all UAVs 2902 update their factor function values. A communication 4202 from the UAV0 2902A to the other UAVs 2902 can include the UAV ID list, local factor ID, factor update time, factor hash, or factor value. The UAV ID list can include the ID of only the UAV0 2902A since the message can be broadcast and since the local factor ID along with UAV0 ID are enough to determine target recipients. The factor value may be omitted if all collaborating UAVs are capable of calculating the new function.

A factor value confirmation can include, after update (or initialization) of the factor value by UAV0 2902A, other UAVs 2902 can respond with factor value confirmation, such as can be heard by all other UAVs. This communication can include a field indicating whether the hash value matches with the locally estimated factor function. If the factor value does not match or the factor value was not sent earlier, then UAV0 2902A can resend the factor value update communication to all UAVs 2902 again, such as can include the factor value this time.

Figure 34:
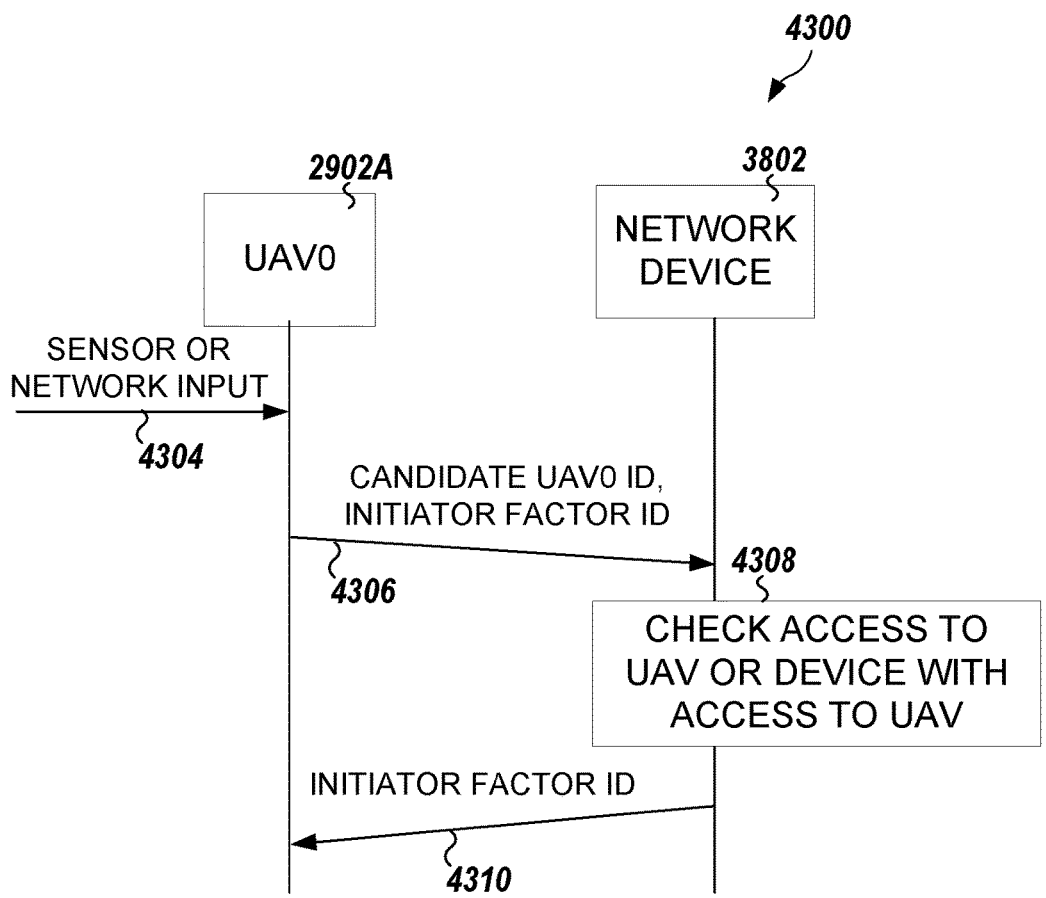
FIG. 34 illustrates, by way of example, a diagram of an aspect of a technique for a factor UAV list update.

FIG. 34 illustrates, by way of example, a diagram of an aspect of a technique 4300 for a factor UAV List update. There can be a case where UAV0 2902A wants to transfer its duties in managing the factor to another UAV in the collaboration. Depending on whether the factor was initiated by UAV0 2902A or an initiator network device 3802, and whether the new UAV candidate requires an initiator network device 3802 or not, the transfer process may differ. In case that the factor has been initiated by an initiator network device, the UAV0 can notify its initiator network device 3802.

The UAV0 2902A can receive a sensor or network input 4304 that causes the UAV0 2902A to decide it no longer wants to be the initiator UAV. The UAV0 2902A can issue a communication 4306 indicating a candidate UAV ID to take over the initiator role or an initiator factor ID. The network device 3802 can check whether it has access to the UAV associated with the ID in the communication 4306 (or a device that communicates with the UAV) at operation 4308. The network device 3802 can issue a communication 4310 indicating an initiator factor ID for the updated factor.

In case the factor was initiated by UAV0 2902A, then the UAV0 2902A can check access to candidate UAVs and its capability of factor initiation. If this check is successful, then UAV0 2902A can terminate the factor as described elsewhere, then give a network input to either the new UAV or its initiator network device 3802 telling the need of initiating the factor, and the new factor is initiated as described previously.

For self-removal, such as when a UAV in the collaboration group does not want to collaborate on a factor at a certain point, it can send an empty list in the next location list update, which is described previously. If it is the UAV0 2902A, then it can first transfer its duties as described elsewhere, and then send the UAV ID list.

When UAV0 2902A needs to invite a new UAV to the collaboration, it can reinitiate the factor with a new list of UAVs as described previously. When a UAV in the collaboration does not respond to a query or is not in the communication range of others, then UAV0 2902A can reinitiate the factor with a new UAV ID list that does not include the out-of-range or otherwise unresponsive UAV, as described elsewhere herein. If the UAV0 2902A drops out of the collaboration, then the UE can continue will continue to be served by its existing serving UAV until a new collaboration is formed.

Figure 35:
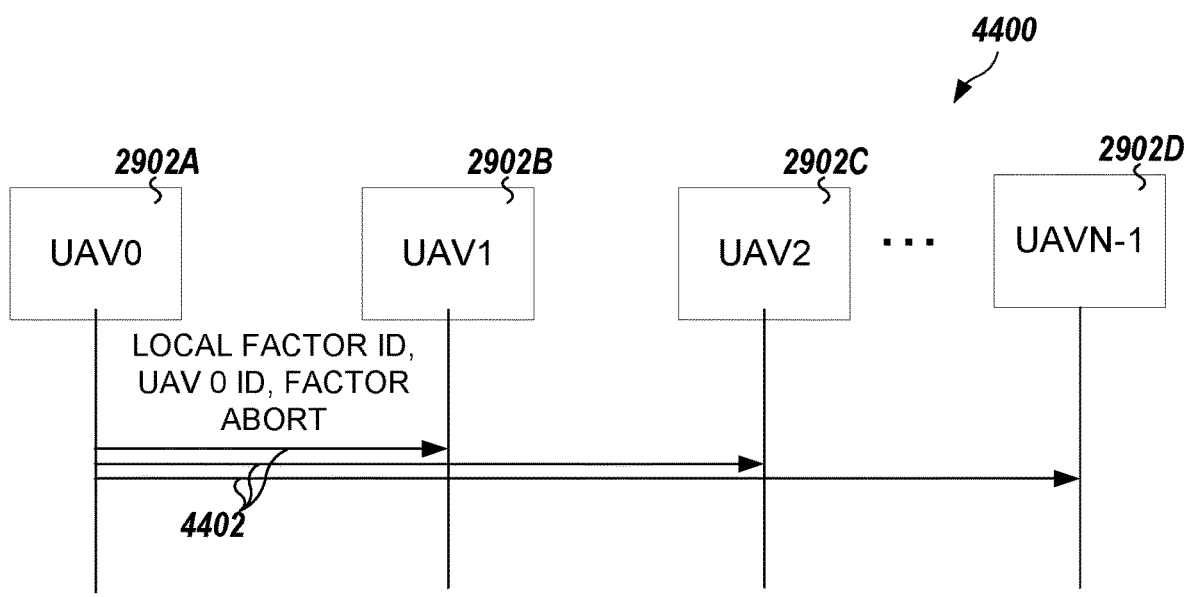
FIG. 35 illustrates, by way of example, a diagram of an aspect of a technique for factor termination.
Figure 36:
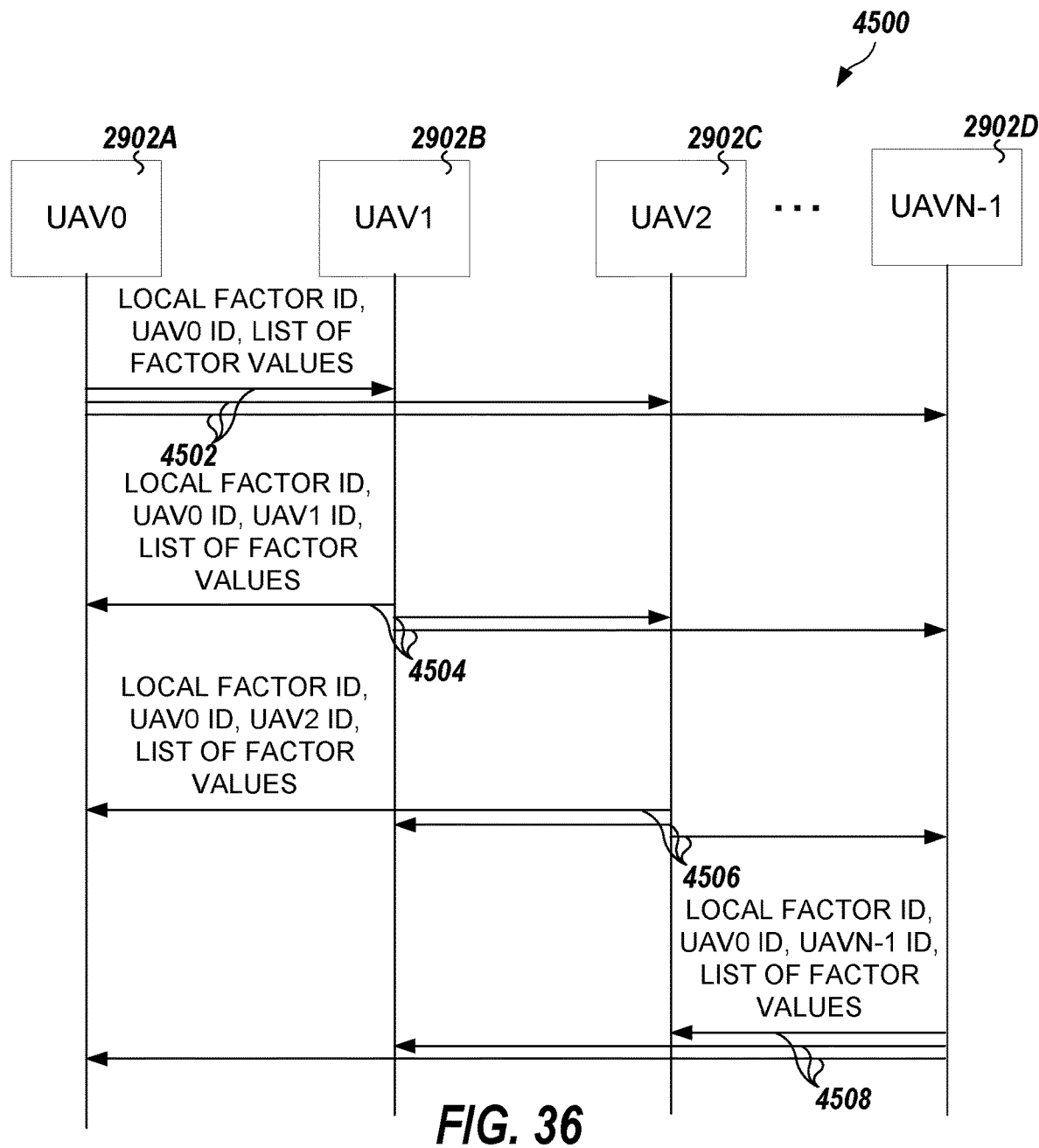
FIG. 36 illustrates, by way of example, a diagram of an aspect of a technique for exchanging factor values.

FIG. 35 illustrates, by way of example, a diagram of an aspect of a technique 4400 for factor termination. If the factor becomes incapable or unnecessary, either the initiator network device 3802 issues a communication to UAV0 2902A or UAV0 2902A itself determines the same. Then UAV0 2902A can issue a communication 4402 terminating the factor. The communication 4402 can include the local factor ID, UAV0 ID, or data indicating the factor is to be aborted.

FIG. 45 illustrates, by way of example, a diagram of an aspect of a technique 4500 for exchanging factor values. As the technique is operating, each UAV 2902 in the collaboration can send a communication to all other UAVs in the collaboration with a cumulative factor value (including other tasks of each UAV) corresponding to current list of locations. A communication 4502, 4504, 4506, 4508 is illustrated as originating from the UAV 2902A, 2902B, 2902C, 2902D, respectively. Each of the communications 4502, 4504, 4506, 4508 can include a local factor ID, UAV0 ID, or a list of factor values.

Wireless Communication for UAV Swarm Applications

Some aspects provide wireless communications for UAV swarms. These aspects enable collaboration within tightly coordinated groups of UAVs as well as cooperation between loose collections of UAVs without the need of a central gateway. Aspects allow different groups of UAVs to self-organize into "moving clusters" by providing well defined and low complexity methods for attachment/detachment and for merging/dissolving clusters. Clusters are synchronized, but there is no "base station" or central node that relays communication between nodes, i.e. all nodes communicate directly with each other.

Aspects also allow multiple simultaneous pairwise communication between group members without scheduled media access. Aspects further provide operation of UAVs in both indoors and outdoors spaces without restrictions to flight height beyond those posed by applicable regulations and physical limits of the UAVs.

Figure 37:
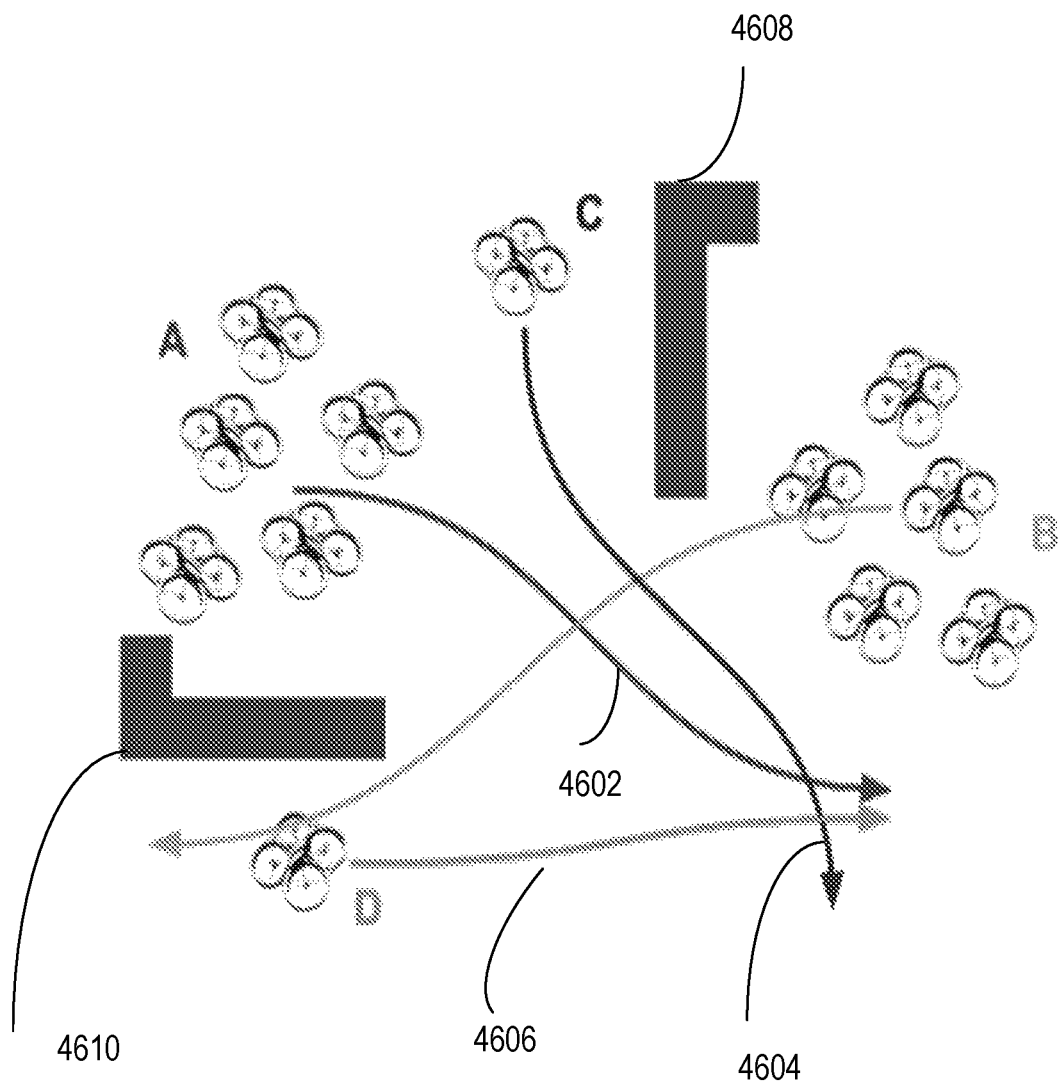
FIG. 37 illustrates a coordination problem that can result in collisions between members of two or more UAV swarms.

FIG. 37 illustrates a coordination problem. A coordination problem can occur when a swarm A is moving along path 5102 to a goal at the same time that another swarm (swarm C or swarm D) is moving toward the same goal (e.g., using path 5104 or path 5106). In at least these situations, collisions can occur among UAVs in the two or more swarms (e.g., in swarm A, swarm C or swarm D). In other scenarios, a UAV may be moving toward a same goal as a swarm of UAVs and it may be advantageous for that UAV to join such a swarm. In still further scenarios, stationary objects (e.g., building 4608 or building 4610) can become obstacles to swarms of UAVs and avoidance techniques may be undertaken. Aspects provide fast and reliable communication links for dealing with these and other scenarios.

Aspects provide swarm communication stacks applicable for different deployment scenarios such as indoor applications, outdoor applications in urban, suburban and rural areas, while UAVs fly at different heights within the applicable regulations and physical limits of the UAVs. Network diameters can be on the order of 100 m, with far/near power ratios lower than 10. Any agent or node in the swarm is assumed to be able to communicate with any other agent in the same swarm in a single hop. Moreover, because the cardinality of the swarm may be large and the maximum tolerable roundtrip latencies (request/response latency) for communication links between any pair of agents may be restricted, multiple pairwise communication links may be exercised simultaneously. The protocol according to aspects shall enable dynamic clusters sizes (i.e. the protocol services should enable attachment/detachment of agents and cluster merges). Clusters shall be synchronized, but there is no "base station" that relays communication between nodes. Similarly, there shall be no central scheduler to schedule pair-wise link execution.

Figure 38:
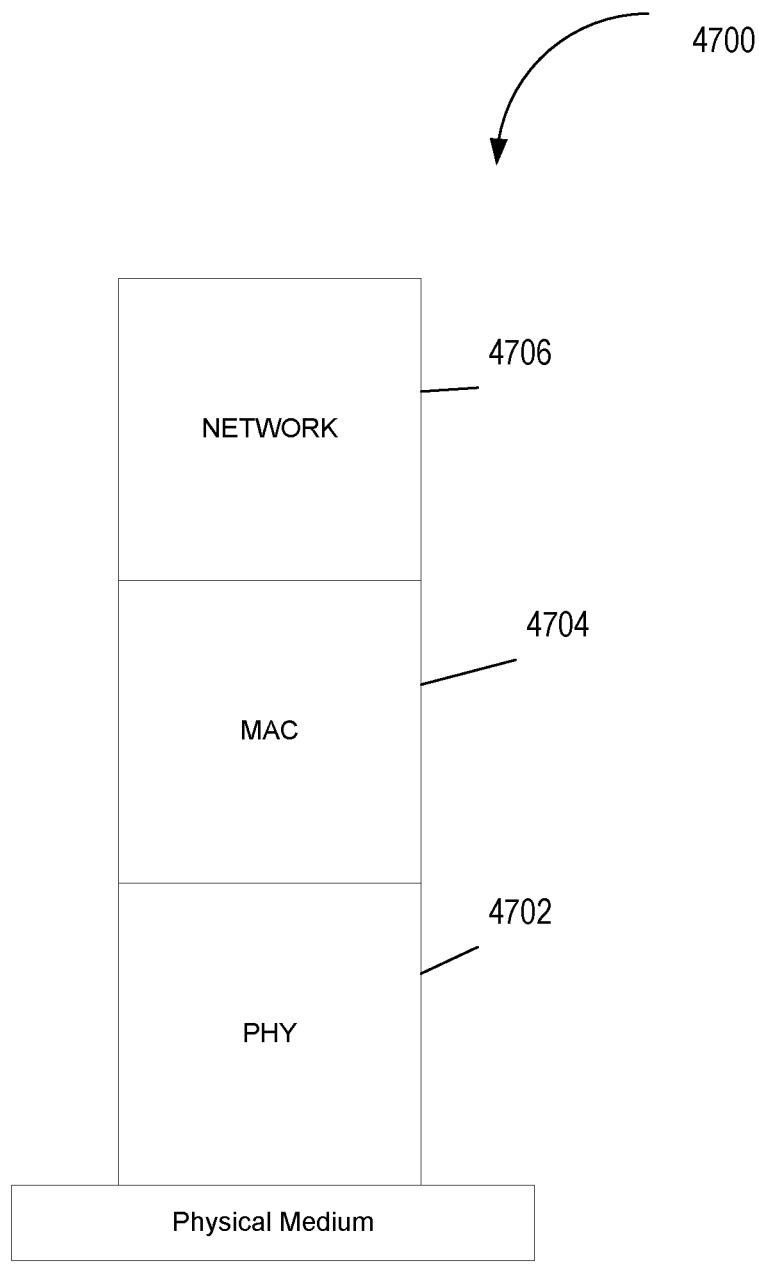
FIG. 38 illustrates a communication stack for swarm communication according to some aspects.

FIG. 38 illustrates a communication stack for swarm communication (hereinafter Swarm Communication Stack (SCS) 4700) may use CDMA (Code Division Multiple Access) to enable multiple pairwise links to communicate at the same time (without collisions) as long as the maximum number of simultaneous transmitters (depend on the cluster size) is not exceeded (which follows from CDMA capacity for a chosen code length and Tx power bounds). This is feasible since swarms have a limited size. A set of CDMA orthogonal codes are distributed in the swarm (e.g., one or more of swarms A, B, C, and D (FIG. 37)). The SCS may choose to preselect a set of CDMA codes for specific purposes (e.g. broadcasting, collision detection, random access channels, etc.). The SCS can be implemented in various portions of UAV software or firmware, electrical circuitry, or a combination thereof. For example, in a PHY chip of a UAV, MAC chip, etc.

As CDMA requires time synchronization, the SCS provides absolute synchronization between all elements in a swarm or across swarms by relying on external absolute synchronization source such as GPS or similar systems.

Figure 39:
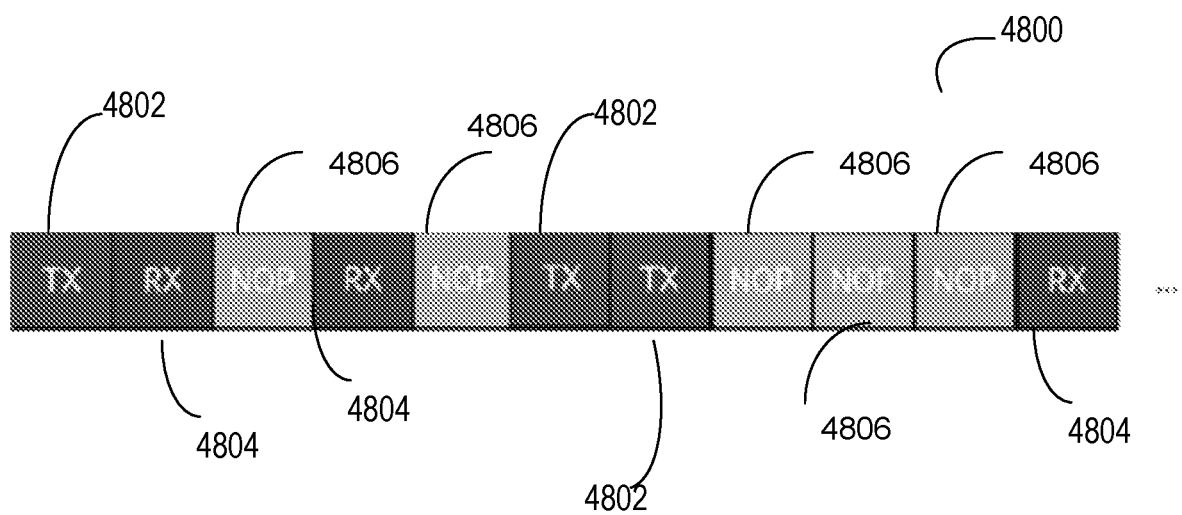
FIG. 39 illustrates an example Pseudo Random Time Division Duplexing (PR-TDD) pattern in accordance with some aspects.

The stack 4700 implement a Pseudo Random Time Division Duplexing (PR-TDD) as the means to enable pairwise duplex communication links between all agents in the swarm (e.g., swarm A, swarm B, swarm C, or swarm D, FIG. 37) without requiring a centralized scheduler. FIG. 39 illustrates an example PR-TDD pattern 4800 in accordance with some aspects.

In accordance with PR-TDD, each agent in a swarm will have assigned to that agent a pseudo-random repeatable pattern of TX slots 4802 and RX slots 4804. The assignment can be hard-coded into each agent, assigned by a leader agent (a leader agent is described in further detail below), changeable by a leader agent, manufacturer, or vendor, etc. Accordingly, each pair of agents can have multiple opportunities to exchange information in each direction without the explicit scheduling of each opportunity. PR-TDD tracking for every pairwise link is implemented; accordingly, each peer's PR-TDD slots is tracked to find the next available TX-communication opportunity. Optionally, the PR-TDD pattern may include no-operation (NOP) slots 4806 (neither TX not RX) for power reduction purposes. PR-TDD patterns may be described by a discrete set of parameters which can be used to generate the pattern. Some codes with corresponding PR-TDD patterns may be reserved for non-connection oriented communications (broadcast, random access channels, etc.). These codes and patterns can be used by any agent.

Referring again to FIG. 38, the SCS 4700 enables non-connection oriented transmissions using these CDMA codes and PR-TDD patterns, and non-connection oriented reception by continuous scanning these same codes and patterns. Continuous scanning allows for the reception of unsolicited messages from nearby agents or clusters.

Connection parameters for a swarm agent can include a tuple of: 1.) a CDMA code and 2.) a PR-TDD pattern assigned to a respective swarm agent. The SCS 4700 provides a mechanism for connection parameter management including the tracking of available parameters in a cluster and the tracking of parameter assignments (with notifications and information regarding attach/detach events). In this way a detachment detection mechanism is provided using a timeout over certain parameters.

Aspects of agents implementing SCS 4700 allow transmission of user traffic using the assigned CDMA code only on the allowed slots according to the PR-TDD pattern to a swarm agent which has the opportunity to receive in the same slot according to its own PR-TDD pattern. However, simultaneous reception of user traffic from multiple agents is permitted on the RX slots according to the PR-TDD pattern, by de-spreading the CDMA codes of all the peer agents which have the opportunity to transmit in the same slot according to their PR-TDD pattern.

SCS 4700 implemented in an agent of a swarm can provide the services to the application layer of that agent (and to peer stacks in other devices (e.g., other agents in the same or different swarm). A proposed example architecture of SCS 4700 includes a mapping into layers of the service-set and feature-set. The architecture can be separated into PHY layer 4702, MAC layer 4704, and Network layer 4706. However, this separation is only one proposal and other organizations are possible as long as the architecture complies with the requirements as described herein, by means of the abstract feature-set and service-set detailed herein.

Some services provided by the SCS 4700 Network layer 4706 to the application layer of the same agent can include configuration of an external absolute synchronization source. This synchronization will be used for the time slotting required for PR-TDD and CDMA. Services of the Network layer 4706 can also include pre-configuration of a cluster, for example the providing of codes for the respective cluster. Other connection parameters can also be pre-assigned to a device (e.g., an agent of a swarm) prior to deployment of that device.

Other stack services (e.g., Network layer 4706 services, although aspects are not limited thereto) to the application layer can include: broadcast services (e.g., non-connection-based message exchange and negotiation); continuous scanning for unsolicited messages; non-continuous scanning for non-connection-oriented communications; implementation (receiving and accepting) of cluster connect requests (e.g., an application layer of one agent can request inclusion into a cluster managed by other agents); event reports (e.g., an application layer can receive notifications regarding events such as reception of solicited or unsolicited messages; handling user traffic transmitted to an agent; subscribing an agent to receive user traffic (or unsubscribing the agent from such reception); and other services. In some aspects, an application may subscribe multiple agents to receive connection-oriented messages from that application.

Services between peer SCSs can include providing non-connection oriented communications. This service can be provided by the PHY layer 4702 although aspects are not limited thereto. In such communications, certain broadcast codes (with default PR-TDD patterns) are used to exchange messages between agents that do not yet belong to the same swarm. A second service between peer SCSs can include receiving requests for connection parameters and providing assignment of connection parameters. In this service, during an attachment process (using non-connection oriented communications), a new agent being added to the cluster is assigned connection parameters by the agent that manages the available parameters in the cluster. A third service between peer SCSs can include connection oriented communications, in which communication occurs according to the assigned connection parameters. A fourth service (e.g., of the Network layer 4706) can include role assignment (e.g., to the role of gateway, swarm coordinator, swarm leader, member, etc.), either during attachment using non-connection oriented communications or during connected state use connection oriented communications.

Other services of the PHY layer 4702 can include CDMA physical implementation, de-spreading of multiple CDMA codes, and monitoring or listening on the medium for the code list. Other services and features of MAC layer 4704 can include user data transport, CDMA code sniffing, TDD requests, receiving CDMA code subscriptions, external synchronization signal configuration, PR-TDD generation, peer TDD slots tracking, absolute TDD slot synchronization, and TDD execution and role implementation. Other services of the Network layer 4706 can include ID/CDMA code table conversion.

Figure 40A:
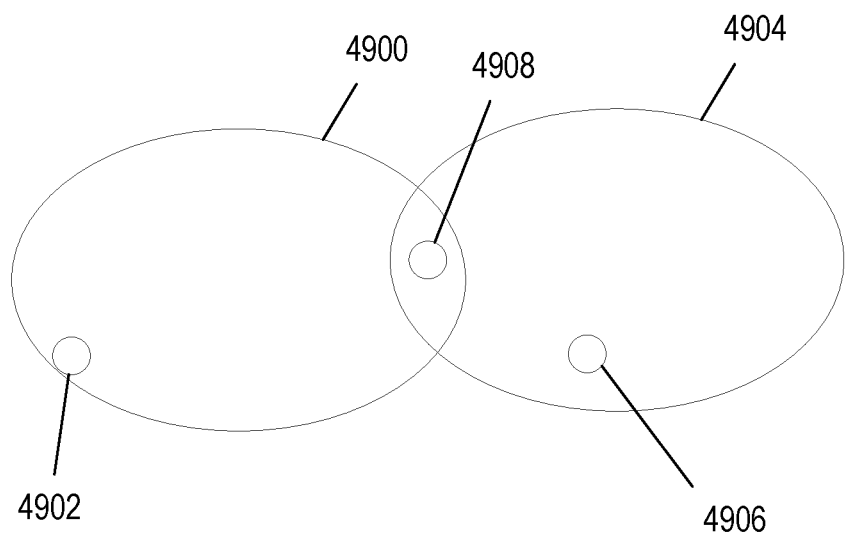
FIG. 40A illustrates a gateway role of a swarm member according to some aspects.
Figure 40B:
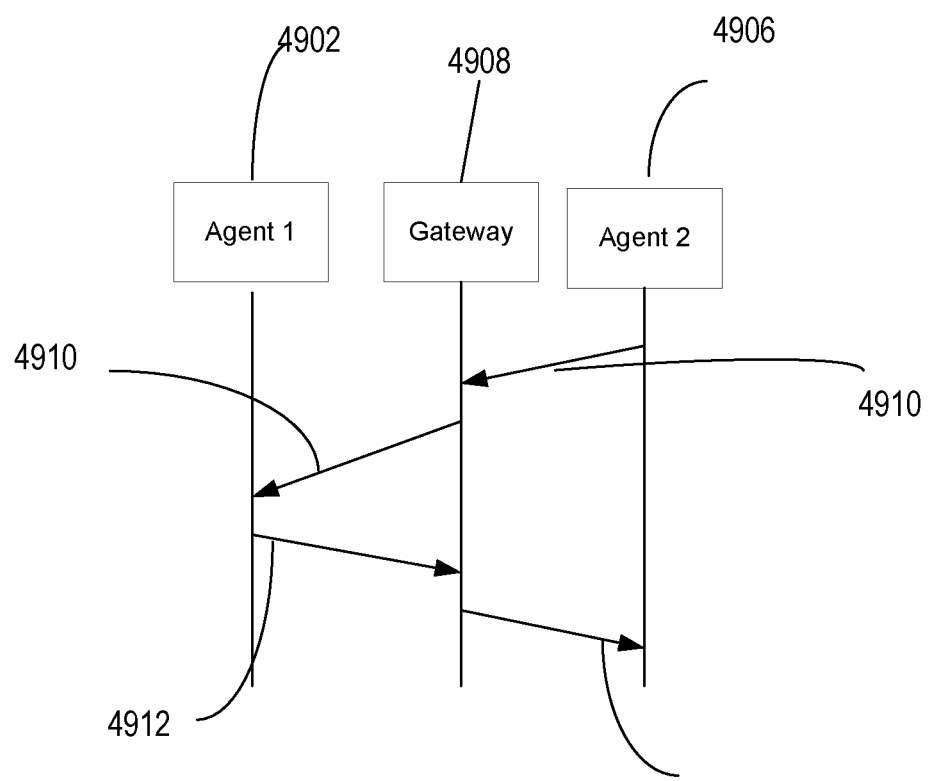
FIG. 40B illustrates messaging for fulfilling a gateway role according to some aspects.

FIG. 40A illustrates a gateway role of a swarm member according to some aspects. For example, if swarm 4900 (including at least agent 4902) and swarm 4904 (including at least agent 4906) are near each other, an agent 4908 can take the role of a getaway (as assigned, e.g., by the Network layer 4706 of a swarm leader or swarm coordinator) which communicates with another gateway in the other swarm through a special shared CDMA code.

Once these inter-cluster messages are received, as shown in FIG. messages can be propagated to interested cluster agents (within the destination cluster) either through a broadcast link or as a sequence through distinct point-to-point links. For example, Swarm B message 4910 could be propagated from agent 4906 through the gateway 4908 to agent 4902 and from there other agents of Swarm A can access the Swarm B message 4910. Likewise, a message 4912 can be propagated from Swarm A agent 4902 through the gateway 4908 and thence to Swarm B agent 4906.

Figure 41:
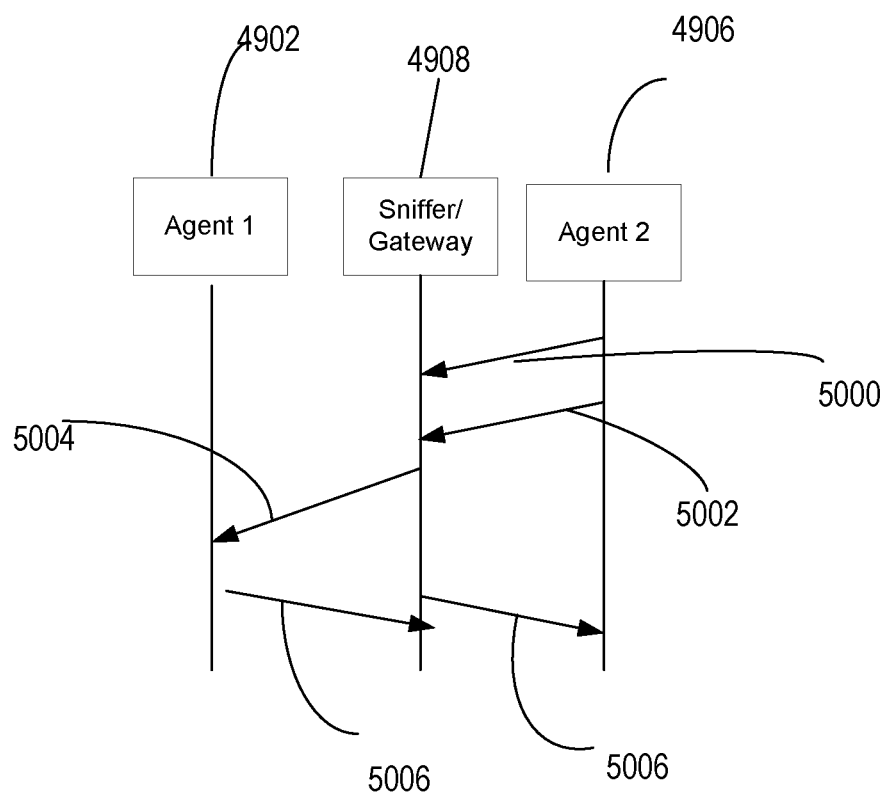
FIG. 41 illustrates messaging for a sniffer role according to some aspects.

Referring again to FIG. 40A in order to detect neighboring swarms, agent 4908 may take the role of a sniffer. FIG. 41 illustrates messaging for a sniffer role. Agent 4906 can broadcast swarm information through a CDMA code at messages 5000-5002. It will be appreciated that agent 4902 could also broadcast a message, not shown in FIG. 41. Agent 4908 can subscribe to this shared code and detect a neighboring swarm. Once swarms (e.g., swarm 4900 and swarm 4904 (FIG. 40A)) are detected by the agent 4908, coordination can be performed. For example, the agent 4908 (if a member of swarm 4900) can report (see message 5004) detected messages of swarm 4904 to another member of swarm 4900 (e.g., agent 4902, or an agent that has been designated a leader of swarm 4900, according to role assignment). Agent 4902 (or other agent of swarm 4900, such as a leader) can decide a coordination strategy based in the current state of both swarm 4900 and swarm 4904. Agent 4902 (or other agent of swarm 4900, such as a leader) can send coordination messages (e.g., message 5006) via, e.g., agent 4908. In this case, the sniffer and the gateway may be the same agent.

Referring again to FIG. 40A, in some example aspects, swarm 4900 and swarm 4904 may decide to merge if the merged swarm doesn not exceed a maximum agent count in a swarm given by the CDMA physical layer and if both swarms have goals in common. In other aspects, evasion can be coordinated to avoid physical collisions and to ensure good communication quality inside swarms if the swarms together exceed the maximum allowed agent count. In at least these examples, new agent attachment can be performed, since a single agent can be taken into account as a neighboring cluster. For detachment, a leader may decide the CDMA code distribution. Therefore, if an agent wishes to detach from a swarm, that agent must release its code by informing the leader that it wishes to leave the swarm. In some aspects, if an agent experiences mechanical, electrical or other failure, even if the agent has been assigned a leader role in other operations, coordination and communication can still occur at least because CDMA codes have been assigned to other agents of the respective swarm. In at least these aspects, other agents can coordinate to select a new leader to replace the failed leader.

Figure 42:
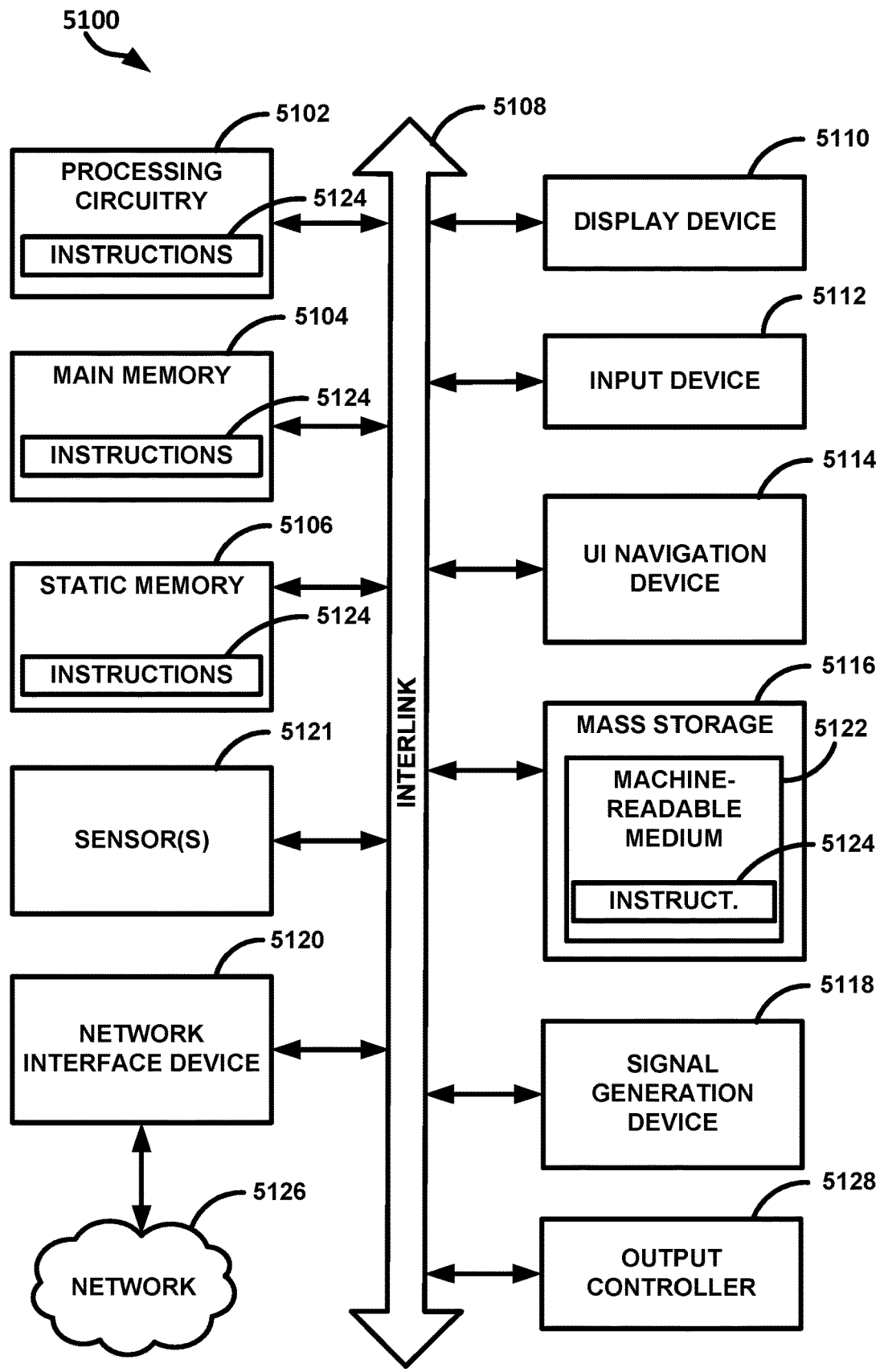
FIG. 42 illustrates a block diagram of an example machine upon which any one or more of the techniques (e.g., methodologies) discussed herein may perform. In alternative aspects, the machine may operate as a standalone device or may be connected (e.g., networked) to other machines.

FIG. 42 illustrates a block diagram of an example machine 5100 upon which any one or more of the techniques (e.g., methodologies) discussed herein may perform. In alternative aspects, the machine 5100 may operate as a standalone device or may be connected (e.g., networked) to other machines. In a networked deployment, the machine 5100 may operate in the capacity of a server machine, a client machine, or both in server-client network environments. In an example, the machine 5100 may act as a peer machine in peer-to-peer (P2P) (or other distributed) network environment. The machine 5100 may be, or be a part of, an Autonomous Vehicle, a communications network device, a cloud service, a personal computer (PC), a tablet PC, a personal digital assistant (PDA), a mobile telephone, a smart phone, or any machine capable of executing instructions (sequential or otherwise) that specify actions to be taken by that machine. For example, machine 5100 may be or be part of the circuitry on the circuit board 108, housed in the body 107 of the UAV 100, part of the base station 332, the UAV 600, the UAV 2102, the UE 2690, the aerial UE 3000, the master device 3202, the local controller 3302, the UAV array service controller 3304, the network device 3802, or other device discussed herein. One or more items of the UAV 100, 600, 2102, the UE 2690, the aerial UE 3000, the master device 3202, the local controller 3302, the UAV array service controller 3304, network device, the base station 332, or other device discussed herein, such as the beam control circuitry 460, location circuitry 470, modem 462, control circuitry 472, 474, RF power circuitry 680, the BS selection circuitry 3004, the swarm intelligence circuitry 3006, the control circuitry 3002, the schedule circuitry 3008, the location circuitry 3010, and the communications system 3012, can include one or more components of the machine 5100. In some aspects, the machine 5100 may be configured to implement a portion of the methods discussed herein. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" or "engine" is understood to encompass a tangible entity, be that an entity that is physically constructed, specifically configured (e.g., hardwired), or temporarily (e.g., transitorily) configured (e.g., programmed) to operate in a specified manner or to perform part, or all, of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a module at one instance of time and to constitute a different module at a different instance of time. A module or engine can be implemented using processing circuitry configured to perform the operations thereof.

Machine (e.g., computer system) 5100 may include a hardware processing circuitry 5102 (e.g., a central processing unit (CPU), a graphics processing unit (GPU), a hardware processor core, or any combination thereof), a main memory 5104 and a static memory 5106, some or all of which may communicate with each other via an interlink (e.g., bus) 5108. The machine 5100 may further include a display unit 4610, an alphanumeric input device 5112 (e.g., a keyboard), and a user interface (UI) navigation device 5114 (e.g., a mouse). In an example, the display unit 5110, input device 5112 and UI navigation device 5114 may be a touch screen display. The machine 5100 may additionally include a storage device (e.g., drive unit) 5116, a signal generation device 5118 (e.g., a speaker), a network interface device 5120, and one or more sensors 5121, such as a global positioning system (GPS) sensor, compass, accelerometer, or another sensor. The machine 5100 may include an output controller 5128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 5116 may include a machine readable medium 4622 on which is stored one or more sets of data structures or instructions 5124 (e.g., software) embodying or utilized by any one or more of the techniques or functions described herein. The instructions 5124 may also reside, completely or at least partially, within the main memory 5104, within static memory 5106, or within the hardware processing circuitry 5102 during execution thereof by the machine 5100. In an example, one or any combination of the hardware processing circuitry 5102, the main memory 5104, the static memory 5106, or the storage device 5116 may constitute machine readable media.

While the machine readable medium 5122 is illustrated as a single medium, the term "machine readable medium" may include a single medium or multiple media (e.g., a centralized or distributed database, and/or associated caches and servers) configured to store the one or more instructions 5124.

The term "machine readable medium" may include any medium that is capable of storing, encoding, or carrying instructions for execution by the machine 5100 and that cause the machine 5100 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 5124 may further be transmitted or received over a communications network 5126 using a transmission medium via the network interface device 5120. The machine 5100 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 5120 may include one or more physical jacks (e.g., Ethernet, coaxial, or phone jacks) or one or more antennas to connect to the communications network 5126. In an example, the network interface device 5120 may include a plurality of antennas to wirelessly communicate using at least one of single-input multiple-output (SIMO), multiple-input multiple-output (MIMO), or multiple-input single-output (MISO) techniques. In some examples, the network interface device 5120 may wirelessly communicate using Multiple User MIMO techniques.

Other Notes and Examples

Example 1 includes an unmanned aerial vehicle (UAV) comprising a modem comprising an antenna port, antennas configured to generate a directional transmission pattern connected to the antenna port, the antennas including (a) an array of omni-directional antennas and (b) multiple directional antennas, beam control circuitry to provide control signals to the antennas to control a direction of the directional transmission pattern, first control circuitry to provide data to the modem indicating signals to be transmitted by the antennas, and second control circuitry to identify a direction to which to provide the directional transmission pattern and provide data indicating the direction to the first control circuitry.

In Example 2, Example 1 can further include a memory including data indicating a parameter of a respective base stations of a communications network through which the UAV modem is configured to communicate.

In Example 3, Example 2 can further include location circuitry to determine a location of the UAV and wherein the beam control circuitry is to control the direction of the directional transmission pattern based on the determined location and a location of the locations in the memory.

In Example 4, Example 3 can further include, wherein the location circuitry is further to determine an orientation of the UAV, and the beam control circuitry is to control the direction of the directional transmission pattern further based on the determined orientation of the UAV.

In Example 5, Example 4 can further include, wherein the beam control circuitry is to power off one or more antennas of the antennas that are not used to form the directional transmission pattern.

In Example 6, at least one of Examples 1-5 can further include, wherein the beam control circuitry further includes power detection circuitry to provide data indicating a strength of a signal incident thereon to the second control circuitry.

In Example 7, Example 6 can further include, wherein the second control circuitry is to adjust the direction based on the data indicating the strength.

In Example 8, at least one of Examples 1-7 can further include, wherein the modem is further to provide data indicating a strength of a signal from at least one antenna of the antennas to the second control circuitry.

In Example 9, Example 8 can further include, wherein the second control circuitry is to adjust the direction based on the data indicating the strength.

Example 10 includes an unmanned aerial vehicle (UAV) comprising a modem comprising an antenna port, antennas configured to generate a directional transmission pattern connected to the antenna port, the antennas including (a) an array of omni-directional antennas and (b) multiple directional antennas, beam control circuitry to provide control signals to the antennas to control a direction of the directional transmission pattern, and a memory including data indicating a parameter of a respective base stations of a communications network through which the UAV modem is configured to communicate.

In Example 11, Example 10 can further include, wherein the parameter indicates a signal strength of a base station within transmission range of a location associated with a cell of a three-dimensional grid of cells.

In Example 12, Example 11 can further include, wherein the parameter is quantized.

In Example 13, Example 12 can further include, wherein the parameter indicates whether the signal strength is below a threshold signal strength value.

In Example 14, Example 13 can further include, wherein the memory further includes a base station identification indicating a base station associated with the parameter.

In Example 15, Example 14 can further include, wherein the memory further includes data indicating a relative angle from the cell of the grid cells to the base station.

In Example 16, at least one of Examples 11-15 can further include, wherein the memory further includes data indicating a second base station that interferes with communication to the base station from the cell of the grid of cells.

In Example 17, Example 16 can further include, wherein the data indicates whether the second base station interferes with an uplink or a downlink communication to/from the base station.

In Example 18, at least one of Examples 11-17 can further include, wherein the memory further includes data indicating, for the cell of the grid of cells, a second base station to which the UAV can perform a handover operation.

In Example 19, Example 18 can further include, wherein the memory further includes data indicating, respective base stations to which the UAV can perform the handover operation for different speeds of travel.

Example 20 includes an antenna device comprising a driver structure, a first director situated a first distance away from the driver structure in a first direction and configured to guide signals at a first range of frequencies from the driver structure, a first reflector situated about the first distance away from the driver structure in a second, opposite direction, the first reflector to direct signals from the driver structure at the first range of frequencies towards the first director, a second director a second distance away from the driver structure in the first direction and configured to guide signals at a second range from of frequencies from the driver structure, and a second reflector situated about the first distance away from the driver structure in the second direction, the second reflector to direct signals from the driver structure at the second range of frequencies towards the first director.

In Example 21, Example 20 can further include, wherein the driver structure includes a dielectric material with a first driver of a first length on a first side thereof and a second driver of a second, different length on a second, opposite side thereof.

In Example 22, at least one of Examples 20-21 can further include, a ground plane under the driver structure, first and second directors, and first and second reflectors.

In Example 23, Example 22 can further include, wherein the first and second drivers are monopoles.

In Example 22, at least one of Examples 22-23 can further include, wherein the first and second drivers are connected to a same feed line.

In Example 25, at least one of Examples 21-24 can further include, wherein the first distance is about $⅛^{th}$ of a wavelength of signals produced by the first driver and the second distance is about $⅛^{th}$ of a wavelength of signals produced by the second driver.

In Example 26, at least one of Examples 21-25 can further include, wherein the first length is about a $¼^{th}$ of a wavelength of signals produced by the first driver and the second length is about $¼^{th}$ of a wavelength of signals produced by the second driver.

In Example 27, at least one of Examples 21-26 can further include, wherein the first driver is a bent monopole antenna.

In Example 28, at least one of Examples 20-27 can further include, wherein the driver structure, first and second reflectors, and first and second detectors form a first antenna and wherein the antenna device includes at least two antennas situated to generate signals in orthogonal directions.

Example 29 includes a device of a wireless communication network, the device comprising input circuitry to receive flight path information regarding an expected location of an unmanned aerial vehicle (UAV), a memory including data indicating a signal parameter of a signal between the UAV and a serving station of the wireless communication network by location, processing circuitry to: identify, based on the data indicating the signal parameter and the flight path information, a communication protocol, and cause an antenna to provide signals indicating the identified communication protocol.

In Example 30, Example 29 can further include, wherein the communication protocol indicates a beam direction to which the UAV is to direct a transmission and a corresponding location for the beam direction.

In Example 31, at least one of Examples 29-30 can further include, wherein the input circuitry is further to receive information from the UAV regarding communication link quality of a current communication link between the UAV and the serving station and the processing circuitry is further to refine the communication protocol based on the information.

In Example 32, at least one of Examples 29-31 can further include, wherein the processing circuitry is to identify, based on the data in the memory and the flight path information, a dead zone in the flight path.

In Example 33, Example 32 can further include, wherein the processing circuitry is to identify the communication protocol only in response to identifying the UAV will enter the dead zone based on the flight path information.

In Example 34, at least one of Examples 32-33 can further include, wherein the input circuitry is to provide the flight path information to a second serving station within communication range and cause the second serving station to refrain from transmitting while the UAV is in the dead zone.

In Example 35, at least one of Examples 29-34 can further include, wherein the communication protocol includes data indicating a second serving station to which to perform a handover and a location at which to perform the handover.

In Example 36, at least one of Examples 29-35 can further include, wherein the data in the memory regards cells of a three-dimensional grid of cells, and wherein each cell is associated with a serving station identification if an estimated signal strength of the serving station at the location is above a specified threshold.

Example 37 includes an unmanned aerial vehicle (UAV) of a swarm of UAVs, the UAV comprising a communications system, processing circuitry to: receive data from the communications system, the data from other UAVs of the swarm and indicating one or more UAVs of the swarm to communicate with a device external to the swarm, and select a UAV of the swarm to communicate with the device based on the data.

In Example 48, Example 37 can further include, wherein the data further indicates at least one of a signal strength and interference with a transmission.

In Example 39, Example 38 can further include, wherein selecting the UAV of the swarm to communicate with the device based on the data includes minimizing a maximum transmit power of the swarm of nodes.

In Example 40, at least one of Examples 38-39 can further include, wherein selecting the UAV of the swarm to communicate with the device based on the data includes maximizing throughput of communications between the selected UAV and other UAVs of the swarm.

In Example 41, Example 40 can further include, wherein maximizing throughput further includes weighting the throughput inversely proportional to an amount of interference on the transmission.

In Example 42, at least one of Examples 37-41 can further include, wherein the processing circuitry is further to sum a number of UAVs that provided data indicating each UAV of the swarm, and in response to determining the UAV has the highest sum, powering on base station circuitry of the UAV to assume a base station role.

Example 43 can include a method for collaboration to fulfill a job by an unmanned aerial vehicle (UAV) of multiple UAVs, the method comprising providing, to other UAVs of the collaboration, first data indicating one or more possible locations for the UAV, providing, to other UAVs of the collaboration, second data indicating other UAVs of the collaboration with which the UAV is capable of communicating, using belief propagation, and based on data provided from all UAVs of the collaboration, determining locations of each UAV of the collaboration, and issuing a communication indicating the locations of each UAV to cause the UAVs of the collaboration to go to the locations.

In Example 44, Example 43 can further include, wherein the job includes servicing a plurality of user equipment.

In Example 45, at least one of Examples 43-44 can further include receiving from each other UAV of the collaboration, and in an order indicated in a list from an initiator UAV, the second data.

In Example 46, at least one of Examples 43-45 can further include receiving from each other UAV of the collaboration, and in an order indicated in a list from an initiator UAV, the first data.

In Example 47, at least one of Examples 43-46 can further include issuing a communication to each UAV indicating to abort the current job.

In Example 48, at least one of Examples 43-47 can further include receiving from a device external to the multiple UAVs a communication indicating the job.

In Example 49, Examples 48 can further include, wherein the communication indicates a list of UAVs to be used in the collaboration and a function to be used to determine position of the UAVs in the collaboration.

Example 50 includes a method comprising measuring, by an unmanned aerial vehicle (UAV) of a collaboration of UAVs, a parameter of an environment in which collaboration is being performed, issuing a communication indicating the parameter using an absorbing element of an operation of a belief propagation technique, and wherein the communication includes a bit indicating whether the absorbing element is included in the communication.

Example 51 includes a non-transitory machine-readable medium including instructions that, when executed by unmanned aerial vehicle (UAV) circuitry, cause the UAV circuitry to perform the operations of the method, processing circuitry or other item of Examples 1-50.

Example 52 includes a method of performing operations of the UAV of at least of Examples 1-50.

What is claimed is:

1. An unmanned aerial vehicle (UAV) comprising:
a modem comprising an antenna port;
antennas configured to generate a directional transmission pattern connected to the antenna port, the antennas including (a) an array of omni-directional antennas and (b) multiple directional antennas;
beam control circuitry to provide control signals to the antennas to control a direction of the directional transmission pattern;
first control circuitry to provide data to the modem indicating signals to be transmitted by the antennas; and
second control circuitry to identify a direction to which to provide the directional transmission pattern and provide data indicating the direction to the first control circuitry.

2. The UAV of claim 1, further comprising a memory including data indicating a parameter of a respective base stations of a communications network through which the UAV modem is configured to communicate.

3. The UAV of claim 2, further comprising location circuitry to determine a location of the UAV and wherein the beam control circuitry is to control the direction of the directional transmission pattern based on the determined location and a location of the locations in the memory.

4. The UAV of claim 3, wherein:
the location circuitry is further to determine an orientation of the UAV; and
the beam control circuitry is to control the direction of the directional transmission pattern further based on the determined orientation of the UAV.

5. The UAV of claim 4, wherein the beam control circuitry is to power off one or more antennas of the antennas that are not used to form the directional transmission pattern.

6. The UAV of claim 1, wherein the beam control circuitry further includes power detection circuitry to provide data indicating a strength of a signal incident thereon to the second control circuitry.

7. The UAV of claim 6, wherein the second control circuitry is to adjust the direction based on the data indicating the strength.

8. The UAV of claim 1, wherein the modem is further to provide data indicating a strength of a signal from at least one antenna of the antennas to the second control circuitry.

9. The UAV of claim 8, wherein the second control circuitry is to adjust the direction based on the data indicating the strength.

10. An unmanned aerial vehicle (UAV) comprising:
a modem comprising an antenna port;
antennas configured to generate a directional transmission pattern connected to the antenna port, the antennas including (a) an array of omni-directional antennas and (b) multiple directional antennas;
beam control circuitry to provide control signals to the antennas to control a direction of the directional transmission pattern; and
a memory storing parameter data corresponding to a signal strength of a base stations of a communications network through which the UAV modem is configured to communicate, wherein the base station is within transmission range of a location associated with a cell of a three-dimensional grid of cells.

11. The UAV of claim 10, wherein the parameter data is quantized.

12. The UAV of claim 11, wherein the parameter data indicates whether the signal strength is below a threshold signal strength value.

13. The UAV of claim 12, wherein the memory further includes a base station identification indicating a base station associated with the parameter data.

14. The UAV of claim 13, wherein the memory further includes data indicating a relative angle from the cell of the grid cells to the base station.

15. The UAV of claim 10, wherein the memory further includes data indicating a second base station that interferes with communication to the base station from the cell of the grid of cells.

16. The UAV of claim 15, wherein the data indicates whether the second base station interferes with an uplink or a downlink communication to/from the base station.

17. The UAV of claim 10, wherein the memory further includes data indicating, for the cell of the grid of cells, a second base station to which the UAV can perform a handover operation.

18. The UAV of claim 17, wherein the memory further includes data indicating, respective base stations to which the UAV can perform the handover operation for different speeds of travel.

19. The UAV of claim 10, wherein the memory further stores additional parameter data corresponding to additional base stations of the communication network.

* * * * *